US012421985B2

(12) United States Patent
Afshari

(10) Patent No.: US 12,421,985 B2
(45) Date of Patent: Sep. 23, 2025

(54) LINEAR ACTUATOR ASSEMBLY AND SYSTEM

(71) Applicant: Project Phoenix, LLC, Mesa, AZ (US)

(72) Inventor: Thomas Afshari, Mesa, AZ (US)

(73) Assignee: Project Phoenix, LLC, Mesa, AZ (US)

( * ) Notice: Subject to any disclaimer, the term of this patent is extended or adjusted under 35 U.S.C. 154(b) by 534 days.

(21) Appl. No.: 16/936,366

(22) Filed: Jul. 22, 2020

(65) Prior Publication Data

US 2020/0347854 A1 Nov. 5, 2020

Related U.S. Application Data

(62) Division of application No. 15/315,592, filed as application No. PCT/US2015/033776 on Jun. 2, 2015, now Pat. No. 10,738,799.

(Continued)

(51) Int. Cl.
*F15B 15/18* (2006.01)
*E02F 3/42* (2006.01)
(Continued)

(52) U.S. Cl.
CPC .............. *F15B 11/10* (2013.01); *E02F 3/425* (2013.01); *E02F 9/2271* (2013.01); *F04C 2/14* (2013.01);
(Continued)

(58) Field of Classification Search
CPC .... F15B 9/08; F15B 9/09; F15B 2211/20561; F16H 61/437; F16H 61/438
See application file for complete search history.

(56) References Cited

U.S. PATENT DOCUMENTS 337,551 A 3/1886 Berrenberg et al.
688,616 A 12/1901 Ferguson
(Continued)

FOREIGN PATENT DOCUMENTS

CA 2236535 A1 11/1999
CA 2878316 A1 3/2014
(Continued)

OTHER PUBLICATIONS

Esposito, Fluid Power with Applicators, 7th Ed., Chapter 5, pp. 154-162 (2009).

(Continued)

*Primary Examiner* — Matthew Wiblin
(74) *Attorney, Agent, or Firm* — Perkins Coie LLP

(57) ABSTRACT

A linear actuator system includes a linear actuator and an integrated pump assembly connected to the linear actuator to provide fluid to operate the linear actuator. The integrated pump assembly includes a pump with two fluid drivers, each fluid driver comprising a prime mover and a fluid displacement assembly to be driven by the prime mover such that fluid is transferred from a first port of the pump to a second port of the pump. The pump assembly also includes two valve assembles to isolate the pump from the system. The linear actuator system also includes a controller that establishes the pump in a normal mode of operation in which the prime movers are independently driven and switches to a fail-safe mode of operation in which only one prime mover is operated.

18 Claims, 25 Drawing Sheets

Related U.S. Application Data

(60) Provisional application No. 62/072,132, filed on Oct. 29, 2014, provisional application No. 62/066,261, filed on Oct. 20, 2014, provisional application No. 62/060,441, filed on Oct. 6, 2014, provisional application No. 62/054,176, filed on Sep. 23, 2014, provisional application No. 62/033,357, filed on Aug. 5, 2014, provisional application No. 62/033,329, filed on Aug. 5, 2014, provisional application No. 62/031,672, filed on Jul. 31, 2014, provisional application No. 62/031,597, filed on Jul. 31, 2014, provisional application No. 62/031,353, filed on Jul. 31, 2014, provisional application No. 62/017,413, filed on Jun. 26, 2014, provisional application No. 62/017,395, filed on Jun. 26, 2014, provisional application No. 62/017,362, filed on Jun. 26, 2014, provisional application No. 62/007,723, filed on Jun. 4, 2014, provisional application No. 62/007,719, filed on Jun. 4, 2014, provisional application No. 62/006,750, filed on Jun. 2, 2014.

(51) Int. Cl.

| | |
|---|---|
| ***E02F 9/22*** | (2006.01) |
| ***F04C 2/14*** | (2006.01) |
| ***F04C 2/18*** | (2006.01) |
| ***F04C 15/00*** | (2006.01) |
| ***F04C 15/06*** | (2006.01) |
| ***F04C 28/08*** | (2006.01) |
| ***F15B 1/26*** | (2006.01) |
| ***F15B 11/00*** | (2006.01) |
| ***F15B 11/10*** | (2006.01) |
| ***F15B 15/14*** | (2006.01) |

(52) U.S. Cl.
CPC .............. *F04C 2/18* (2013.01); *F04C 15/008* (2013.01); *F04C 15/06* (2013.01); *F04C 28/08* (2013.01); *F15B 1/26* (2013.01); *F15B 11/003* (2013.01); *F15B 15/14* (2013.01); *F15B 15/18* (2013.01); *F04C 2240/40* (2013.01); *F04C 2240/402* (2013.01); *F04C 2240/603* (2013.01); *F15B 2211/2053* (2013.01); *F15B 2211/275* (2013.01); *F15B 2211/3057* (2013.01); *F15B 2211/41563* (2013.01); *F15B 2211/41572* (2013.01); *F15B 2211/5157* (2013.01); *F15B 2211/5158* (2013.01); *F15B 2211/6306* (2013.01); *F15B 2211/632* (2013.01); *F15B 2211/6323* (2013.01); *F15B 2211/6343* (2013.01); *F15B 2211/6651* (2013.01); *F15B 2211/6652* (2013.01); *F15B 2211/6653* (2013.01); *F15B 2211/6654* (2013.01); *F15B 2211/6656* (2013.01); *F15B 2211/7053* (2013.01); *F15B 2211/7054* (2013.01); *F15B 2211/75* (2013.01); *F15B 2211/76* (2013.01)

(56) References Cited

U.S. PATENT DOCUMENTS

| | | | | |
|---|---|---|---|---|
| 1,341,846 | A | 6/1920 | Gollings | |
| 1,361,423 | A | 12/1920 | Waterous | |
| 1,407,496 | A | 2/1922 | Storey | |
| 1,418,741 | A | 6/1922 | Stallman | |
| 1,665,120 | A | 4/1928 | Wendell | |
| 1,681,796 | A | 8/1928 | Wendell | |
| 1,712,157 | A | 5/1929 | Morita | |
| 2,439,427 | A | 4/1948 | Guibert et al. | |
| 2,572,334 | A | 10/1951 | Guibert | |
| 2,601,397 | A | 6/1952 | Hill et al. | |
| 2,621,603 | A | 12/1952 | Thomas | |
| 2,918,209 | A * | 12/1959 | Schueller | F04C 18/126 417/338 |
| 2,927,429 | A | 3/1960 | Carlson | |
| 2,928,295 | A | 3/1960 | Boulanger | |
| 2,937,807 | A | 5/1960 | Lorenz | |
| 2,940,661 | A | 6/1960 | Lorenz | |
| 3,136,224 | A | 6/1964 | Escobosa | |
| 3,264,502 | A | 8/1966 | Lytle et al. | |
| 3,585,973 | A | 6/1971 | Klover | |
| 3,694,105 | A | 9/1972 | Martin | |
| 3,763,746 | A | 10/1973 | Walters | |
| 3,922,855 | A | 12/1975 | Bridwell et al. | |
| 3,932,993 | A | 1/1976 | Riedhammer | |
| 3,979,910 | A | 9/1976 | Leuenberger et al. | |
| 4,016,719 | A | 4/1977 | Yavnai | |
| 4,030,403 | A | 6/1977 | Elser | |
| 4,328,450 | A | 5/1982 | Gabor | |
| 4,345,436 | A | 8/1982 | Johnson | |
| 4,369,625 | A | 1/1983 | Izumi et al. | |
| 4,418,610 | A | 12/1983 | Holtrop | |
| 4,529,362 | A | 7/1985 | Ichiryu et al. | |
| 4,627,237 | A | 12/1986 | Hutson | |
| 4,630,441 | A | 12/1986 | Chamberlain | |
| 4,682,939 | A | 7/1987 | Petro | |
| 4,696,163 | A | 9/1987 | Glomeau | |
| 4,850,812 | A | 7/1989 | Voight | |
| 5,026,248 | A | 6/1991 | Hamilton | |
| 5,048,294 | A | 9/1991 | Oshina et al. | |
| 5,073,091 | A * | 12/1991 | Burgess | F04B 49/065 417/222.1 |
| 5,161,957 | A | 11/1992 | Ribaudo | |
| 5,197,861 | A | 3/1993 | Maruyama et al. | |
| 5,271,719 | A | 12/1993 | Abe et al. | |
| 5,295,798 | A | 3/1994 | Maruyama et al. | |
| 5,329,216 | A | 7/1994 | Hasegawa | |
| 5,417,551 | A | 5/1995 | Abe et al. | |
| 5,708,311 | A | 1/1998 | Claar et al. | |
| 5,709,537 | A | 1/1998 | Maruyama et al. | |
| 5,767,635 | A | 6/1998 | Steffens et al. | |
| 5,767,638 | A | 6/1998 | Wu et al. | |
| 5,778,671 | A | 7/1998 | Bloomquist et al. | |
| 5,836,746 | A | 11/1998 | Maruyama et al. | |
| 6,002,186 | A | 12/1999 | Coutu et al. | |
| 6,004,119 | A | 12/1999 | Yoshiaki et al. | |
| 6,042,095 | A | 3/2000 | Kuchta | |
| 6,048,235 | A | 4/2000 | Kai | |
| 6,053,717 | A | 4/2000 | Dixon | |
| 6,155,790 | A | 12/2000 | Pyötsiäet al. | |
| 6,247,906 | B1 | 6/2001 | Pijanowski | |
| 6,447,256 | B2 * | 9/2002 | Bussard | F04C 15/008 318/34 |
| 6,447,266 | B2 | 9/2002 | Antaki et al. | |
| 6,543,223 | B2 | 4/2003 | Muschong et al. | |
| 6,652,249 | B2 | 11/2003 | Kenney et al. | |
| 6,796,120 | B2 | 9/2004 | Franchet et al. | |
| 6,971,463 | B2 | 12/2005 | Shore et al. | |
| 6,979,185 | B2 | 12/2005 | Kaempe | |
| 7,000,386 | B1 | 2/2006 | Morgan | |
| 7,051,526 | B2 | 5/2006 | Geiger | |
| 7,148,635 | B1 | 12/2006 | Piefer et al. | |
| 7,155,910 | B2 | 1/2007 | Last | |
| 7,191,593 | B1 | 3/2007 | Ho | |
| 7,232,292 | B2 | 6/2007 | Lopatinsky et al. | |
| 7,240,893 | B2 | 7/2007 | Komaba et al. | |
| 7,281,372 | B2 | 10/2007 | Sakai et al. | |
| 7,434,395 | B2 | 10/2008 | He | |
| 7,537,441 | B2 | 5/2009 | Iwasaki | |
| 7,870,727 | B2 | 1/2011 | Mueller et al. | |
| 7,927,079 | B2 | 4/2011 | Suzuki et al. | |
| 8,157,539 | B2 | 4/2012 | Hidaka et al. | |
| 8,167,589 | B2 | 5/2012 | Hidaka et al. | |
| 8,206,134 | B2 | 6/2012 | Moldovan et al. | |
| 8,448,432 | B2 | 5/2013 | Bresie | |
| 8,869,924 | B2 | 10/2014 | Kim | |
| 8,959,905 | B2 | 2/2015 | Baltes et al. | |
| 9,234,532 | B2 | 1/2016 | Vanderlaan et al. | |
| 9,670,943 | B2 | 6/2017 | Gomm et al. | |

(56) References Cited

U.S. PATENT DOCUMENTS

| | | | |
|---|---|---|---|
| 2001/0036415 A1 | 11/2001 | Pijanowski | |
| 2002/0009368 A1 | 1/2002 | Bussard | |
| 2003/0077183 A1 | 4/2003 | Franchet et al. | |
| 2003/0091448 A1 | 5/2003 | Prampolini | |
| 2003/0126981 A1 | 7/2003 | Bridger et al. | |
| 2003/0151315 A1 | 8/2003 | Choi et al. | |
| 2003/0225396 A1 | 12/2003 | Cartledge et al. | |
| 2004/0060430 A1 | 4/2004 | Brinkman | |
| 2004/0089234 A1 | 5/2004 | Hagglund et al. | |
| 2004/0191103 A1 | 9/2004 | Gotschhofer | |
| 2004/0213680 A1 | 10/2004 | Suzuki et al. | |
| 2005/0022523 A1 | 2/2005 | Nagai et al. | |
| 2005/0050965 A1 | 3/2005 | Zaremba et al. | |
| 2005/0089414 A1* | 4/2005 | Ohman | F04B 35/045 417/410.4 |
| 2005/0112012 A1 | 5/2005 | Marheineie | |
| 2005/0144939 A1 | 7/2005 | Mentink et al. | |
| 2005/0254970 A1 | 11/2005 | Mayer et al. | |
| 2006/0001202 A1 | 1/2006 | Bauman | |
| 2006/0039804 A1 | 2/2006 | Jordan et al. | |
| 2006/0156713 A1 | 7/2006 | Kadlicko | |
| 2007/0074511 A1 | 4/2007 | Verkuilen | |
| 2007/0098576 A1 | 5/2007 | Horng et al. | |
| 2007/0101711 A1 | 5/2007 | Debus | |
| 2007/0157612 A1* | 7/2007 | He | F15B 1/265 60/413 |
| 2007/0166168 A1 | 7/2007 | Vigholm | |
| 2008/0010984 A1 | 1/2008 | Arbel et al. | |
| 2008/0190104 A1 | 8/2008 | Bresie | |
| 2009/0210120 A1 | 8/2009 | Stein | |
| 2009/0266934 A1 | 10/2009 | Makino | |
| 2009/0297370 A1 | 12/2009 | Moldovan et al. | |
| 2010/0226806 A1 | 9/2010 | Mellet et al. | |
| 2010/0247362 A1 | 9/2010 | Koizumi | |
| 2010/0264885 A1 | 10/2010 | Olsen et al. | |
| 2010/0322805 A1 | 12/2010 | Aregger | |
| 2010/0322806 A1 | 12/2010 | Aregger | |
| 2011/0000203 A1 | 1/2011 | Riedel et al. | |
| 2011/0017310 A1 | 1/2011 | Eriksson | |
| 2011/0030364 A1 | 2/2011 | Persson et al. | |
| 2011/0030505 A1 | 2/2011 | Hoyle et al. | |
| 2011/0089082 A1 | 4/2011 | Snawerdt | |
| 2011/0135516 A1 | 6/2011 | Oishi et al. | |
| 2011/0209471 A1 | 9/2011 | Vanderlaan et al. | |
| 2011/0250082 A1 | 10/2011 | Han et al. | |
| 2012/0141315 A1 | 6/2012 | Seto et al. | |
| 2012/0173027 A1 | 7/2012 | Cheng et al. | |
| 2012/0213657 A1 | 8/2012 | Kimberlin et al. | |
| 2012/0233997 A1 | 9/2012 | Andruch, III et al. | |
| 2012/0260641 A1 | 10/2012 | Opdenboch | |
| 2012/0260642 A1 | 10/2012 | Opdenboch | |
| 2012/0305603 A1* | 12/2012 | Kwok | F04C 2/084 222/251 |
| 2013/0074487 A1 | 3/2013 | Herold et al. | |
| 2013/0091833 A1 | 4/2013 | Zhan et al. | |
| 2013/0098015 A1 | 4/2013 | Opdenbosh | |
| 2013/0098017 A1 | 4/2013 | Knussman et al. | |
| 2013/0098464 A1 | 4/2013 | Knussman | |
| 2013/0183185 A1 | 7/2013 | Dirscheri | |
| 2013/0239558 A1 | 9/2013 | Shirao | |
| 2013/0298542 A1 | 11/2013 | Lowman et al. | |
| 2014/0105714 A1 | 4/2014 | Kim | |
| 2014/0130487 A1 | 5/2014 | Akiyama et al. | |
| 2014/0174549 A1 | 6/2014 | Dybing | |
| 2014/0260233 A1 | 9/2014 | Giovanardi | |
| 2014/0308103 A1 | 10/2014 | Pike | |
| 2014/0308106 A1 | 10/2014 | Beschorner | |
| 2014/0366519 A1 | 12/2014 | Sadamori | |
| 2015/0121860 A1 | 5/2015 | Hyon | |
| 2015/0275927 A1 | 10/2015 | Gomm et al. | |
| 2015/0308463 A1* | 10/2015 | Gomm | F15B 15/08 60/327 |
| 2015/0361743 A1 | 12/2015 | Mikkulainen | |
| 2016/0102685 A1 | 4/2016 | Chester | |
| 2016/0201694 A1 | 7/2016 | Vacca et al. | |
| 2019/0063431 A1 | 2/2019 | Kagawa | |
| 2021/0285442 A1 | 9/2021 | Kamada et al. | |
| 2022/0049696 A1 | 2/2022 | Jang et al. | |
| 2022/0128006 A1 | 4/2022 | Shimamura et al. | |
| 2023/0250820 A1 | 8/2023 | Afshari | |

FOREIGN PATENT DOCUMENTS

| | | | |
|---|---|---|---|
| CH | 625600 | A5 | 9/1981 |
| CN | 101994690 | A | 3/2011 |
| CN | 101655087 | A | 2/2018 |
| CN | 109779985 | A | 5/2019 |
| DE | 1258617 | | 1/1968 |
| DE | 1528965 | | 10/1969 |
| DE | 3230550 | A1 | 1/1984 |
| DE | 3247004 | A1 | 6/1984 |
| DE | 3821321 | A1 | 12/1989 |
| DE | 102008018407 | A1 | 10/2009 |
| DE | 102009027282 | A1 | 12/2010 |
| DE | 102009028095 | A1 | 2/2011 |
| DE | 102009045028 | A1 | 3/2011 |
| DE | 102011005831 | A1 | 9/2012 |
| DE | 102012102156 | A1 | 10/2012 |
| DE | 102011076127 | A1 | 11/2012 |
| EP | 0558921 | A1 | 9/1993 |
| EP | 0942173 | A1 | 9/1999 |
| EP | 1249608 | A1 | 10/2002 |
| EP | 1531269 | A1 | 5/2005 |
| EP | 1967745 | A1 | 9/2008 |
| EP | 2113666 | A2 | 11/2009 |
| EP | 2816237 | A1 | 12/2014 |
| FR | 2119294 | A5 | 8/1972 |
| FR | 2428771 | A1 | 1/1980 |
| GB | 270000 | A | 5/1927 |
| GB | 1081711 | A | 8/1967 |
| GB | 1284551 | A | 8/1972 |
| GB | 1284552 | A | 8/1972 |
| GB | 1284553 | A | 8/1972 |
| GB | 1450436 | A | 9/1976 |
| GB | 2123089 | A | 1/1984 |
| GB | 2259333 | A | 3/1993 |
| JP | S5920590 | A | 2/1984 |
| JP | H11166496 | A | 6/1999 |
| JP | H11336671 | A | 12/1999 |
| JP | 2001011899 | A | 1/2001 |
| JP | 2001153066 | A | 6/2001 |
| JP | 2002147370 | A | 6/2002 |
| JP | 2003088084 | A | 3/2003 |
| JP | 2003106304 | A | 4/2003 |
| JP | 2006316662 | A | 11/2006 |
| JP | 3154210 | U | 10/2009 |
| JP | 2010038316 | A | 2/2010 |
| JP | 2014009655 | A | 1/2014 |
| JP | 2014512495 | A | 5/2014 |
| RU | 2284424 | C1 | 9/2006 |
| RU | 2009149035 | A | 8/2011 |
| SU | 857550 | A1 | 8/1981 |
| SU | 1087705 | A1 | 4/1984 |
| WO | WO9113256 | A1 | 9/1991 |
| WO | WO01073295 | A1 | 10/2001 |
| WO | WO03069160 | A1 | 8/2003 |
| WO | WO2004071845 | A1 | 8/2004 |
| WO | WO2008060681 | A2 | 5/2008 |
| WO | WO2010083991 | A2 | 7/2010 |
| WO | WO2010097596 | A1 | 9/2010 |
| WO | WO2011035971 | A2 | 3/2011 |
| WO | WO2011048261 | A1 | 4/2011 |
| WO | WO2011072502 | A1 | 6/2011 |
| WO | WO2012122159 | A2 | 9/2012 |
| WO | WO2013006902 | A1 | 1/2013 |
| WO | WO2013027620 | A1 | 2/2013 |
| WO | WO2014060760 | A2 | 4/2014 |
| WO | WO2014074713 | A1 | 5/2014 |
| WO | WO2014135284 | A1 | 9/2014 |
| WO | WO2014176256 | A1 | 10/2014 |

(56) References Cited

FOREIGN PATENT DOCUMENTS

WO WO2017040825 A1 3/2017
WO WO2018206050 A1 11/2018

OTHER PUBLICATIONS

Marks' Standard Handbook for Mechanical Engineers, Eighth Ed., Section 14, pp. 14-1-14-31 (1978).
Yusof et al., "Slip flow coefficient analysis in water hydraulics gear pump for environmental friendly application," IOP Conf. Series: Materials Science and Engineering, 50:012016 (2013).
International Search Report and Written Opinion, International Application No. PCT/US2015/018342 (published as WO 2015/131196), 19 pages (Jul. 20, 2015).
International Search Report and Written Opinion, International Application No. PCT/US2015/022484, (published as WO 2015/148662), 9 pages (Jun. 9, 2015).
International Search Report and Written Opinion, International Application No. PCT/US2015/027003 (published as WO 2015/164453), 18 pages (Nov. 4, 2015).
International Search Report and Written Opinion, International Application No. PCT/US2015/033752 (published as WO 2015/187673), 15 pages (Sep. 29, 2015).
International Search Report and Written Opinion, International Application No. PCT/US2015/033764 (published as WO 2015/187681), 7 pages (Aug. 19, 2015).
International Search Report and Written Opinion, International Application No. PCT/US2015/033776 (published as WO 2015/187688), 31 pages (Oct. 28, 2015).
International Search Report and Written Opinion, International Application No. PCT/US2015/041612 (published as WO 2016/014715), 8 pages (Sep. 28, 2015).
International Search Report and Written Opinion, International Application No. PCT/US2015/053670 (published as WO 2015/057321), 10 pages (Dec. 16, 2015).
International Search Report and Written Opinion, International Application No. PCT/US2015/054145 (published as WO 2016/064569), 9 pages (Feb. 2, 2016).
International Search Report and Written Opinion, International Application No. PCT/US2015/050589 (published as WO 2016/048773), 10 pages (Dec. 7, 2015).
International Search Report and Written Opinion, International Application No. PCT/US2016/049918 (published as WO 2017/040792), 10 pages (Nov. 23, 2016).
International Search Report and Written Opinion, International Application No. PCT/US2016/049959 (published as WO 2017/040825), 10 pages (Dec. 9, 2016).
Supplementary European Search Report, EP Application No. 15802457.0, 24 pages (Mar. 14, 2018).
Supplementary European Search Report, EP Application No. 15803186.4, 9 pages (Dec. 19, 2017).
Supplementary European Search Report, EP Application No. 15803994.1, 7 pages (Jan. 22, 2018).
Supplemental European Search Report, European Application No. 18207568.9, 7 pages (Feb. 4, 2019).
Supplementary European Search Report, EP Application No. 20166746.6, 7 pages (May 6, 2020).
Supplementary European Search Report, EP Application No. 20168937.9, 8 pages (May 14, 2020).
Supplementary European Search Report, EP Application No. 20179980.6, 8 pages (Jul. 30, 2020).
Extended European Search Report, European Application No. 20197360.9, 8 pages (Nov. 10, 2020).
Extended European Search Report, European Application No. 201168887.4, 10 pages (May 21, 2021).
Examination Report for EP Application No. 20179980.6; 4 pages (May 26, 2021).
Examination European Search Report, EP Application No. 157219434.7; 4 pages (Aug. 30, 2021).
Extended European Search Report, EP Application No. 21201681.0; 8 pages (Jan. 24, 2022).
Extended European Search Report, EP Application No. 21203155.3; 8 pages (Feb. 23, 2022).
U.S. Appl. No. 14/637,064, filed Mar. 3, 2015, now U.S. Pat. No. 9,228,586, titled Pump Integrated With Two Independently Driven Prime Movers.
U.S. Appl. No. 14/862,608, filed Sep. 23, 2015, now U.S. Pat. No. 10,072,676, titled System To Pump Fluid and Control Thereof.
U.S. Appl. No. 14/944,368, filed Nov. 18, 2015, now U.S. Pat. No. 9,920,755, titled Pump Integrated With Two Independently Driven Prime Movers.
U.S. Appl. No. 15/128,269, filed Sep. 22, 2016, now U.S. Pat. No. 10,465,721, titled System To Pump Fluid and Control Thereof.
U.S. Appl. No. 15/305,579, filed Apr. 22, 2015, now U.S. Pat. No. 10,294,936, titled Fluid Delivery System With a Shaft Having a Through-Passage.
U.S. Appl. No. 15/315,560, filed Jun. 2, 2015, now U.S. Pat. No. 10,544,861, titled Hydrostatic Transmission Assembly and System.
U.S. Appl. No. 15/315,575, filed Jun. 2, 2015, now U.S. Pat. No. 10,544,810, titled Linear Actuator Assembly and System.
U.S. Appl. No. 15/315,592, filed Jun. 2, 2015, now U.S. Pat. No. 10,738,799, titled Linear Actuator Assembly and System.
U.S. Appl. No. 15/327,748, filed Jul. 22, 2015, now U.S. Pat. No. 10,598,176, titled External Gear Pump Integrated With Two Independently Driven Prime Movers.
U.S. Appl. No. 15/517,356, filed Oct. 2, 2015, now U.S. Pat. No. 10,539,134, titled Linear Actuator Assembly and System.
U.S. Appl. No. 15/520,386, filed Oct. 6, 2015, now U.S. Pat. No. 10,677,352, titled Hydrostatic Transmission Assembly and System.
U.S. Appl. No. 15/756,928, filed Mar. 1, 2018, now U.S. Pat. No. 11,085,440, titled System To Pump Fluid and Control Thereof.
U.S. Appl. No. 15/756,942, filed Sep. 1, 2016, now U.S. Pat. No. 10,865,788, titled System To Pump Fluid and Control Thereof.
U.S. Appl. No. 15/887,856, filed Feb. 2, 2018, now U.S. Pat. No. 11,060,534, titled Pump Integrated With Two Independently Drive Prime Movers.
U.S. Appl. No. 16/118,167, filed Aug. 30, 2018, now U.S. Pat. No. 10,808,732, titled System To Pump Fluid and Control Thereof.
U.S. Appl. No. 16/374,456, filed Apr. 3, 2019, now U.S. Pat. No. 11,280,334, titled Fluid Delivery System With a Shaft Having a Through-Passage.
U.S. Appl. No. 16/698,566, filed Nov. 27, 2019, now U.S. Pat. No. 11,054,026, titled Hydrostatic Transmission Assembly and System.
U.S. Appl. No. 16/698,631, filed Nov. 27, 2019, now U.S. Pat. No. 11,242,851, titled Linear Actuator Assembly and System.
U.S. Appl. No. 16/714,504, filed Dec. 13, 2019, now U.S. Pat. No. 11,060,634, titled Linear Actuator Assembly and System.
U.S. Appl. No. 16/714,540, filed Dec. 13, 2019, now U.S. Pat. No. 11,067,170, titled Hydrostatic Transmission Assembly and System.
U.S. Appl. No. 16/787,876, filed Feb. 11, 2020, now U.S. Pat. No. 10,995,750, titled External Gear Pump Integrated With Two Independently Driven Prime Movers.
U.S. Appl. No. 17/022,059, filed Sep. 15, 2020, now U.S. Pat. No. 11,408,442, titled System To Pump Fluid and Control Thereof.
U.S. Appl. No. 17/092,159, filed Nov. 6, 2020, now U.S. Pat. No. 11,846,283, titled System To Pump Fluid and Control Thereof.
U.S. Appl. No. 17/243,483, filed Apr. 28, 2021, now U.S. Pat. No. 11,512,695, titled System To Pump Fluid and Control Thereof.
U.S. Appl. No. 17/358,410, filed Jun. 25, 2021, now U.S. Pat. No. 12,060,878, titled System To Pump Fluid and Control Thereof.
U.S. Appl. No. 17/364,097, filed Jun. 30, 2021, now U.S. Pat. No. 11,867,203, titled Linear Actuator Assembly and System.
U.S. Appl. No. 17/411,326, filed Aug. 25, 2021, now U.S. Pat. No. 11,713,757, titled Pump Integrated With Two Independently Driven Prime Movers.
U.S. Appl. No. 17/555,978, filed Dec. 20, 2021, now abandoned, titled Linear Actuator Assembly and System, now abandoned.
U.S. Appl. No. 17/842,453, filed Jun. 16, 2022, now abandoned, titled System To Pump Fluid and Control Thereof.
U.S. Appl. No. 18/004,539, filed Jan. 6, 2023, titled Dynamic Control of Gears in a Gear Pump Having a Drive-Drive Configuration.

(56) References Cited

OTHER PUBLICATIONS

U.S. Appl. No. 18/004,610, filed Jan. 6, 2023, titled Dynamic Control of Gears in a Gear Pump Having a Drive-Drive Configuration.
U.S. Appl. No. 18/331,430, filed Jun. 8, 2023, now U.S. Pat. No. 12,060,883, titled Pump Integrated With Two Independently Driven Prime Movers.
U.S. Appl. No. 18/655,806, filed May 6, 2024, titled System To Pump Fluid and Control Thereof.
U.S. Appl. No. 18/716,864, filed Jun. 5, 2024, titled Diagnostic Checks of a Gear Pump in a Fluid System.
U.S. Appl. No. 18/331,430, filed Jul. 11, 2024, titled Pump Integrated With Two Independently Driven Prime Movers.
Supplemental European Search Report, EP Application No. 15803186.4, 9 pages (Dec. 17, 2019).
Examination Report, EP Application No. 15709812.0, 5 pages (Jun. 17, 2019).
Examination Report for EP Application No. 15715589.6; 4 pages (Jun. 13, 2022).
Extended European Search Report, EP Application No. 22162029.7; 8 pages (Jul. 5, 2022).
Examination Report for EP Application No. 15784832.6, 7 pages (Jul. 5, 2022).
Examination Report for EP Application No. 20197360.9, 8 pages (Nov. 28, 2022).
Extended European Search Report for EP Application No. 22202305.3; 7 pages (Jan. 25, 2023).
Examination Report Search Report for EP Application No. 21151341.1; 5 pages (Mar. 10, 2023).
Examination Report for EP Application No. 15784832.6; 6 pages (Dec. 21, 2023).
Examination Report for EP Application No. 21201681.0; 4 pages (Mar. 13, 2024).
Examination Report for EP Application No. 21168887.4; 4 pages (Mar. 19, 2024).
Examination Report for EP Application No. 21748749.5; 5 pages (Feb. 2, 2025).

* cited by examiner

LINEAR ACTUATOR ASSEMBLY AND SYSTEM

PRIORITY

The present application claims priority to U.S. Provisional Patent Application Nos. 62/006,750 filed on Jun. 2, 2014; 62/007,719 and 62/007,723 filed on Jun. 4, 2014; 62/017,362, 62/017,395, and 62/017,413 filed on Jun. 26, 2014; 62/031,672, 62/031,353, and 62/031,597 filed on Jul. 31, 2014; 62/033,329 and 62/033,357 filed on Aug. 5, 2014; 62/054,176 filed on Sep. 23, 2014; 62/060,441 filed on Oct. 6, 2014; 62/066,261 filed on Oct. 20, 2014; and 62/072,132 filed on Oct. 29, 2014, which are incorporated herein by reference in their entirety.

TECHNICAL FIELD

The present invention relates generally to linear actuator assemblies and actuating methodologies thereof, and more particularly to a linear actuator assembly having a pump assembly and a linear actuator and control methodologies thereof in a fluid pumping system, including providing normal and fail-safe modes of operation.

BACKGROUND OF THE INVENTION

Linear actuator assemblies are widely used in a variety of applications ranging from small to heavy load applications. The linear actuators, e.g., a hydraulic cylinder, in linear actuator assemblies are used to cause linear movement, typically reciprocating linear movement, in systems such as, e.g., hydraulic systems. Often, one or more linear actuator assemblies are included in the system which can be subject to frequent loads in a harsh working environment, e.g., in the hydraulic systems of industrial machines such as excavators, front-end loaders, and cranes. Thus, it is strongly desirable that these linear actuator assemblies be durable and reliably function even in a harsh working environment.

However, in a conventional machine, the actuators components are provided separately and usually include numerous parts such as a hydraulic cylinder, a hydraulic pump, a motor, a fluid reservoir and appropriate valves that must be connected. The motor drives the hydraulic pump to provide pressurized fluid from the fluid reservoir to the hydraulic cylinder in a predetermined manner, which in turn causes the piston rod of the cylinder to move within the body of the cylinder. When the hydraulic cylinder is retracted, extra fluid is sent back to the fluid reservoir. To control the flow in the hydraulic system, the hydraulic pump can be a variable-displacement hydraulic pump and/or a directional flow control valve (or another type of flow control device) can be included in the system. In these types of systems, the motor that drives the operation of the hydraulic pump is often run at constant speed and the directional flow control valve, for example, can provide the appropriate porting to the hydraulic cylinder to extend or retract the hydraulic cylinder. Typically, the motor and hydraulic pump are run at a high speed, which builds up temperature in the hydraulic fluid. Thus, the reservoir also acts to keep the average fluid temperature down by increasing the fluid volume in the system. However, these hydraulic systems can be relatively large and complex. In addition, the various components are often located spaced apart from one another. To interconnect these parts, various additional components like connecting shafts, hoses, pipes, and/or fittings are used in a complicated manner. Moreover, these components are susceptible to damage or degradation in harsh working environments, thereby causing increased machine downtime and reduced reliability of the machine. In addition, when a hydraulic pump fails because its motor has failed, there may be no safe way to shut down the system or to operate the system until the current operation has completed.

Further limitation and disadvantages of conventional, traditional, and proposed approaches will become apparent to one skilled in the art, through comparison of such approaches with embodiments of the present invention as set forth in the remainder of the present disclosure with reference to the drawings.

SUMMARY OF THE INVENTION

Preferred embodiments of linear actuators and actuation methodologies provide for a compact and reliable design of a linear actuator. Exemplary embodiments are directed to a linear hydraulic actuator system and method in an industrial machine that provides for precise control of the hydraulic fluid flow and/or pressure in the system by using a variable-speed and/or a variable-torque pump. Exemplary embodiments are also directed to a linear hydraulic actuator system and method that provides for a normal mode of operation and a fail-safe mode of operation. The linear actuator system and method of control thereof discussed below are particularly advantageous in a closed-loop type system since system and method of control provides for a more compact configuration without increasing the risk of pump cavitation or high fluid temperatures as in conventional systems. In an exemplary embodiment, a hydraulic system includes an integrated linear hydraulic actuator assembly that controls a load. The integrated linear hydraulic actuator assembly includes a hydraulic cylinder and an integrated hydraulic pump assembly having a fluid driver assembly, at least one sensor assembly and two valve assemblies to provide hydraulic fluid to the linear hydraulic actuator to operate the load. The hydraulic system further includes a means for adjusting at least one of a flow and a pressure in the system to an operational set point. In some embodiments, the adjustment means exclusively uses the at least one hydraulic pump to adjust the flow and/or the pressure in the system, i.e., without the aid of another flow control device, to control the flow and/or pressure in the system to the operational set point.

In another exemplary embodiment, a fluid system includes a pump assembly having at least one variable-speed and/or a variable-torque pump, a linear actuator that is operated by the fluid to control a load, and a controller that establishes a speed and/or torque of the pump. As used herein, “fluid” means a liquid or a mixture of liquid and gas containing mostly liquid with respect to volume. The pump provides fluid to the linear actuator, which can be, e.g., a fluid-actuated cylinder that controls a load (e.g., a boom of an excavator or some other equipment or device that can be operated by a linear actuator). Each pump includes a prime mover and a fluid displacement assembly. The fluid displacement assembly can be driven by the prime mover such that fluid is transferred from the inlet port to the outlet port of the pump. In some embodiments, the controller controls a speed and/or a torque of the prime mover so as to exclusively adjust a flow and/or a pressure in the fluid system. “Exclusively adjust” means that the flow and/or the pressure in the system is adjusted by the prime mover (or prime movers depending on the pump configuration and number of pump assemblies) and without the aid of another flow control device, e.g., flow control valves, variable flow piston pumps, and directional flows valves to name just a few. That is, unlike a conventional fluid system, the pump is not run at a constant speed and/or use a separate flow control device (e.g., directional flow control valve) to control the flow and/or pressure in the system. In some embodiments, the hydraulic system includes two fluid drivers and the controller operates the system in a normal mode in which the prime movers of the fluid drivers are independently driven so as to synchronize contact between the respective fluid displacement members. The controller switches to a fail-safe mode of operation upon determination of an abnormal operation of a prime mover such that the pump assembly is operated using only the operative prime mover.

In some embodiments, the preferred linear actuators include a hydraulic cylinder assembly and at least one pump assembly, which form a closed-loop hydraulic system. Each pump assembly can include at least one storage device and at least one hydraulic pump with a corresponding set of valve assemblies. The hydraulic cylinder assembly includes a cylinder housing, a movable piston disposed in an actuator chamber inside the cylinder housing, and a piston rod fixedly attached to the piston. The piston rod is axially movable along with the piston which defines a retraction chamber and an extraction chamber within the actuator chamber. When installed in an industrial machine, the fluid-operated linear actuator or hydraulic cylinder is attached to two structural elements that require relative movement between them. The relative movement can be linear, rotational (when the structural elements are pivotally attached) or a combination of the two.

Exemplary embodiments of the pump in each pump assembly has at least one fluid driver. The fluid driver includes a prime mover and a fluid displacement assembly. The prime mover drives the fluid displacement assembly and the prime mover can be, e.g., an electric motor, a hydraulic motor or other fluid-driven motor, an internal-combustion, gas or other type of engine, or other similar device that can drive a fluid displacement member. In some embodiments, the pump includes at least two fluid drivers and each fluid displacement assembly includes a fluid displacement member. The prime movers independently drive the respective fluid displacement members such that the fluid displacement members transfer fluid (drive-drive configuration). The fluid displacement member can be, e.g., an internal or external gear with gear teeth, a hub (e.g. a disk, cylinder, or other similar component) with projections (e.g. bumps, extensions, bulges, protrusions, other similar structures or combinations thereof), a hub (e.g. a disk, cylinder, or other similar component) with indents (e.g., cavities, depressions, voids or similar structures), a gear body with lobes, or other similar structures that can displace fluid when driven.

In some embodiments, the pump includes one fluid driver and the fluid displacement assembly has at least two fluid displacement members. The prime mover drives a first displacement member, which then drives the other fluid displacement members in the pump (a driver-driven configuration). In both the drive-drive and driver-driven type of configurations, the fluid displacement member can work in combination with a fixed element, e.g., pump wall, crescent, or other similar component, and/or a moving element such as, e.g., another fluid displacement member when transferring the fluid. The configuration of the fluid displacement members in the pump need not be identical. For example, one fluid displacement member can be configured as an external gear-type fluid driver and another fluid driver can be configured as an internal gear-type fluid driver.

In some exemplary embodiments, at least one shaft of a fluid driver, e.g., a shaft of the prime mover and/or a shaft of the fluid displacement member and/or a common shaft of the prime mover/fluid displacement member (depending on the configuration of the pump), is of a flow-through configuration and has a through-passage that allows fluid communication between at least one port of the pump and at least one fluid storage device. In some embodiments, the fluid storage device or fluid storage devices are attached to the pump body such that they form one integrated device and the flow-through shaft(s) can be in direct fluid communication with the fluid reservoir(s) in the storage device(s). One end of the through-passage of the flow-through shaft is configured for fluid communication with either the inlet port or the outlet port of the pump. In some embodiments, the connection from the end of the through-passage to the port of the pump can be through a intervening device or structure. For example, the through-passage of the flow-through shaft can connect to a channel within the pump casing or connect to a hose, pipe or other similar device, which is then connected to a port of the pump. The other end of the through-passage can have a port for fluid communication with a fluid storage device, which can be a pressure vessel, an accumulator, or another device that is fluid communication with the fluid system and can store and release fluid. The configuration of the flow-through shaft and intervening device/structure assembly can also include valves that can be operated based on whether the through-passage function is desired and/or to select a desired pump port and/or a storage device.

The summary of the invention is provided as a general introduction to some embodiments of the invention, and is not intended to be limiting to any particular drive-drive configuration or drive-drive-type system, to any particular through-passage configuration or to any particular parallel or serial flow configuration for the linear actuator assembly. It is to be understood that various features and configurations of features described in the Summary can be combined in any suitable way to form any number of embodiments of the invention. Some additional example embodiments including variations and alternative configurations are provided herein.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the exemplary embodiments of the invention.

DETAILED DESCRIPTION OF THE PREFERRED EMBODIMENTS

Figure 1:
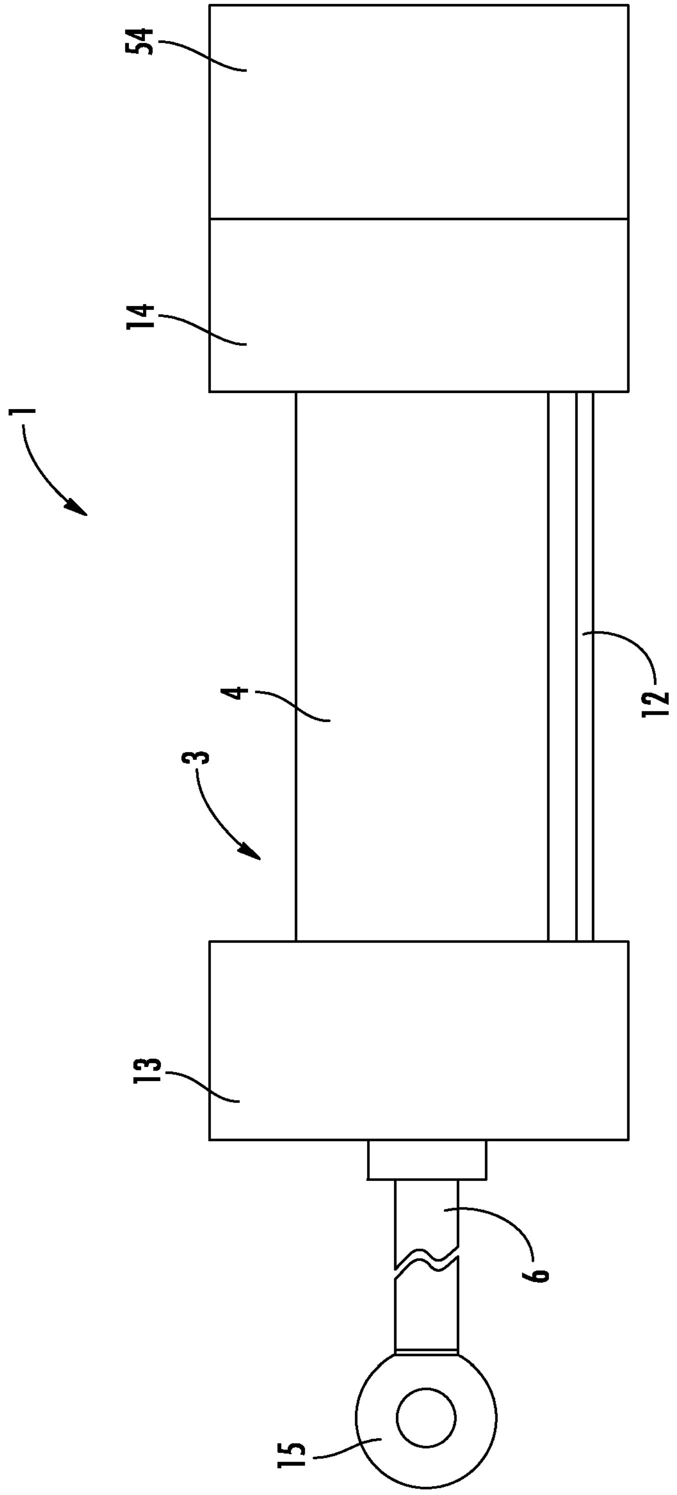
FIG. 1 is a side view of a preferred embodiment of a linear actuator assembly.

Exemplary embodiments of the present invention are directed to a linear actuator system with a linear actuator and at least one integrated pump assembly connected to the linear actuator to provide fluid to operate the linear actuator. The integrated pump assembly includes a pump with at least one fluid driver comprising a prime mover and a fluid displacement assembly to be driven by the prime mover such that fluid is transferred from a first port of the pump to a second port of the pump. The pump assembly also includes two valve assembles to isolate the pump from the system. The linear actuator system also includes a controller that establishes at least one of a speed and a torque of the at least one prime mover to exclusively adjust at least one of a flow and a pressure in the linear actuator system to an operational set point. The linear actuator system can include sensor assemblies to measure system parameters such as pressure, temperature and/or flow. When the linear actuator assembly contains more than one pump assembly, the pump assemblies can be connected in a parallel or serial configuration depending on, e.g., the requirements of the system.

In some embodiments, the pump includes at least one prime mover that is disposed internal to the fluid displacement member. In other exemplary embodiments of the fluid delivery system, at least one prime mover is disposed external to the fluid displacement member but still inside the pump casing, and in still further exemplary embodiments, the at least one prime mover is disposed outside the pump casing. In some exemplary embodiments of the linear actuator system, the pump includes at least two fluid drivers with each fluid driver including a prime mover and a fluid displacement member. In other exemplary embodiments of the linear actuator system, the pump includes one fluid driver with the fluid driver including a prime mover and at least two fluid displacement members. In some exemplary embodiments, at least one shaft of a fluid driver, e.g., a shaft of the prime mover and/or a shaft of the fluid displacement member and/or a common shaft of the prime mover/fluid displacement member (depending on the configuration of the pump), is a flow-through shaft that includes a through-passage configuration which allows fluid communication between at least one port of the pump and at least one fluid storage device.

The exemplary embodiments of the linear actuator system will be described using embodiments in which the pump in the pump assembly is an external gear pump with either one or two fluid drivers, the prime mover is an electric motor, and the fluid displacement member is an external spur gear with gear teeth. However, those skilled in the art will readily recognize that the concepts, functions, and features described below with respect to the electric-motor driven external gear pump can be readily adapted to external gear pumps with other gear configurations (helical gears, herringbone gears, or other gear teeth configurations that can be adapted to drive fluid), internal gear pumps with various gear configurations, to pumps with more than two fluid drivers, to prime movers other than electric motors, e.g., hydraulic motors or other fluid-driven motors, internal-combustion, gas or other type of engines or other similar devices that can drive a fluid displacement member, to pumps with more than two fluid displacement members, and to fluid displacement members other than an external gear with gear teeth, e.g., internal gear with gear teeth, a hub (e.g. a disk, cylinder, or other similar component) with projections (e.g. bumps, extensions, bulges, protrusions, other similar structures, or combinations thereof), a hub (e.g. a disk, cylinder, or other similar component) with indents (e.g., cavities, depressions, voids or similar structures), a gear body with lobes, or other similar structures that can displace fluid when driven.

Figure 1A:
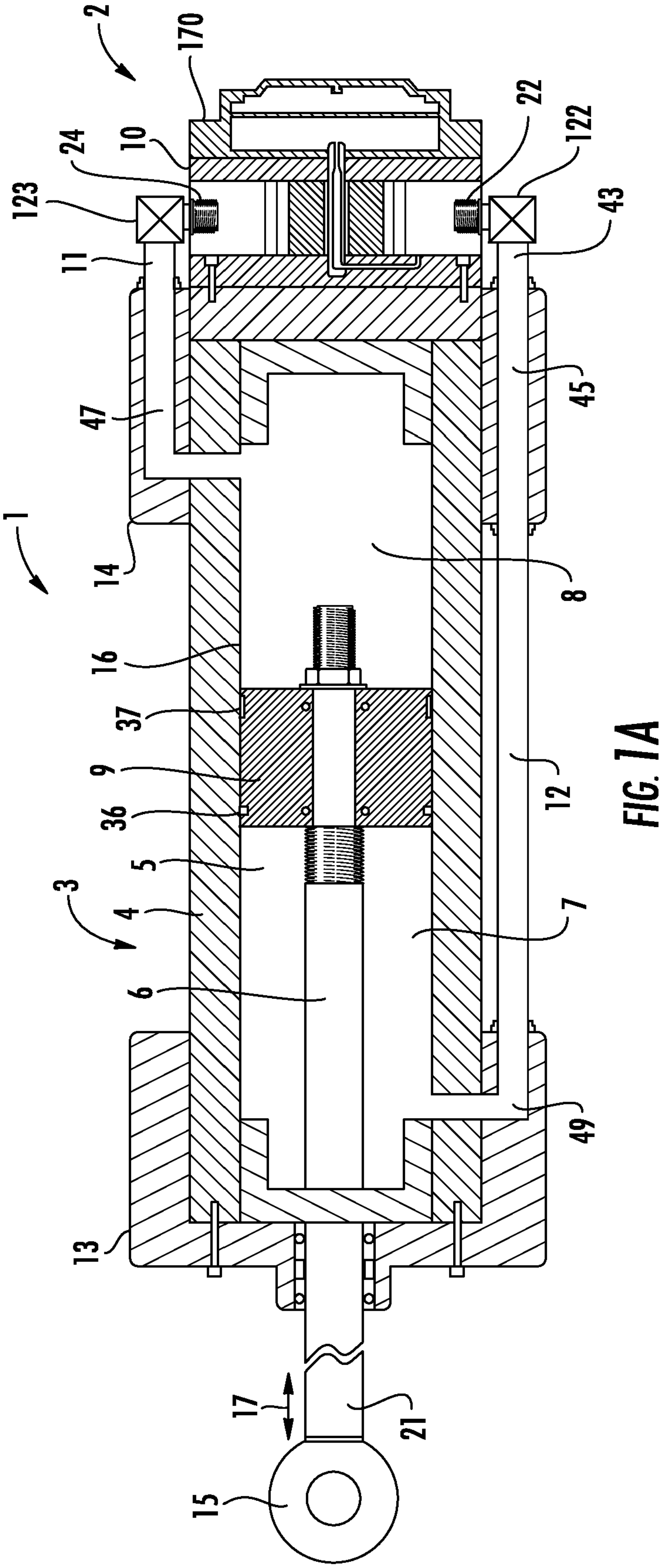
FIG. 1A shows a side cross-sectional view of the linear actuator assembly of FIG. 1.

FIG. 1 shows a preferred embodiment of a linear actuator assembly 1. FIG. 1A shows a cross-sectional view of the linear actuator assembly 1. With reference to FIGS. 1 and 1A, the linear actuator assembly 1 includes a linear actuator, which can be, e.g., a hydraulic cylinder 3 in the illustrated embodiment, and a fluid delivery system, e.g., hydraulic pump assembly 2 in the illustrated embodiment. The linear actuator assembly 1 can also include valve assemblies 122 and 123, which isolate the pump assembly 2 from the hydraulic cylinder 3. In some embodiments, the valve assemblies 122 and 123 can be part of the pump assembly 2. For clarity, description of the exemplary embodiments are given with respect to a hydraulic system. However, the inventive features of the present disclosure are applicable to other types of fluid systems. In addition, the linear actuator assembly 1 of the present disclosure is applicable to various types of hydraulic cylinders. Such hydraulic cylinders can include, but are not limited to, single or double acting telescopic cylinders, plunger cylinders, differential cylinders, and position-sensing smart hydraulic cylinders.

The hydraulic cylinder assembly 3 includes a cylinder housing 4, a piston 9, and a piston rod 6. A head flange 13 is mounted on end of the cylinder housing 4 and an end flange 14 is mounted on the other end of the cylinder housing 4. The cylinder housing 4 defines an actuator chamber 5 therein, in which the piston 9 and the piston rod 6 are movably disposed. The piston 9 is fixedly attached to the piston rod 6 on one end of the piston rod 6 in the actuator chamber 5. The piston 9 can slide along the interior wall 16 of the cylinder housing 4 in either direction 17. The piston may have one or more bearings 37 on its outer surface. The piston rod 6 can also slide in either direction 17 along with the piston 9. The piston 9 defines two sub-chambers within the actuator chamber 5. As seen in FIG. 1A, a retraction chamber 7 is provided on the left side of the piston 9 and an extraction chamber 8 is provided on the right side of the piston 9. One or more piston seals 36 are provided to prevent leakage between the two chambers 7, 8. The piston rod 6 extends from the piston 9 towards the retraction chamber 7 such that one end 21 of the piston rod 6 is disposed outside the cylinder housing 4. A clevis 15 may be disposed on the end 21 of the piston rod 6 such that a movable object can be secured to the clevis 15. As the piston 9 and the piston rod 6 slide either to the left or to the right, the respective volumes of the retraction and extraction chambers 7, 8 change. For example, as the piston 9 and the piston rod 6 slide to the right, the volume of the retraction chamber 7 expands whereas the volume of the extraction chamber 8 shrinks. Conversely, as the piston 9 and the piston rod 6 slide to the left, the volume of the retraction chamber 7 shrinks whereas the volume of the extraction chamber 8 expands. The respective change in the volume of the retraction and extraction chambers 7, 8 need not be the same. For example, the change in volume of the extraction chamber 8 may be greater than the corresponding change in volume of the retraction chamber 7 and, in such cases, the linear actuator assembly and/or the hydraulic system will need to account for the difference. For example, the linear actuator can include a storage device as discussed further below to store and release the hydraulic fluid as needed.

The pump assembly 2, including valve assemblies 122 and 123, is conjoined with the hydraulic cylinder assembly 3. "Conjoined with" means that the devices are fixedly connected or attached so as to form one integrated unit or module. The pump assembly 2 includes a pump 10 and a storage device 170. In the illustrated embodiment, the pump 10 is an external gear pump. However, as discussed below the present disclosure is not limited to an external gear pump. A port 22 of the pump 10 is in fluid communication with the retraction chamber 7 via valve assembly 122 and a port 24 of the pump 10 is in fluid communication with valve assembly 123 which in turn is in fluid communication with the extraction chamber 8 via a passage defined by pipe 43, flange passage 45, pipe 12, and flange passage 49. The port 24 of the pump 10 is in fluid communication with valve assembly 123 which in turn is in fluid communication with the extraction chamber 8 via a passage defined by pipe 11 and flange passage 47. The fluid passages between hydraulic cylinder 3, pump assembly 2, and valve assemblies 122 and 123 can be either internal or external depending on the configuration of the linear actuator assembly 1.

As seen in FIG. 1, a pump cover 54 covers the pump assembly 2 when fully assembled. Thus, in some exemplary embodiments, the linear actuator assembly 1 of the present disclosure is an integrated configuration that provides a compact design of a linear actuator assembly. The pump assembly 2, including valve assemblies 122 and 123, can be conjoined with the hydraulic cylinder assembly 3, e.g., by the use of screws, bolts or some other fastening means, thereby space occupied by the linear actuator assembly 1 is reduced. Components such as hoses and pipes that are needed for fluid communication among the pump 10, the storage device 170, valve assemblies 122 and 123, and the cylinder chambers 7, 8 are also reduced. Since the linear actuator assembly 1 has a modular design, it can be easily installed or replaced. For example, when the pump 10 needs to be replaced, it can be easily done by unfastening, e.g., unscrewing, it from the hydraulic cylinder assembly 3 and installing a new pump. In addition, hoses and pipes that are susceptible to damage or degradation in a harsh working environment are less exposed to the exterior environment, machine downtime can be reduced and reliability of a machine where the linear actuator assembly 1 of the present disclosure operates can be improved.

Figure 2:
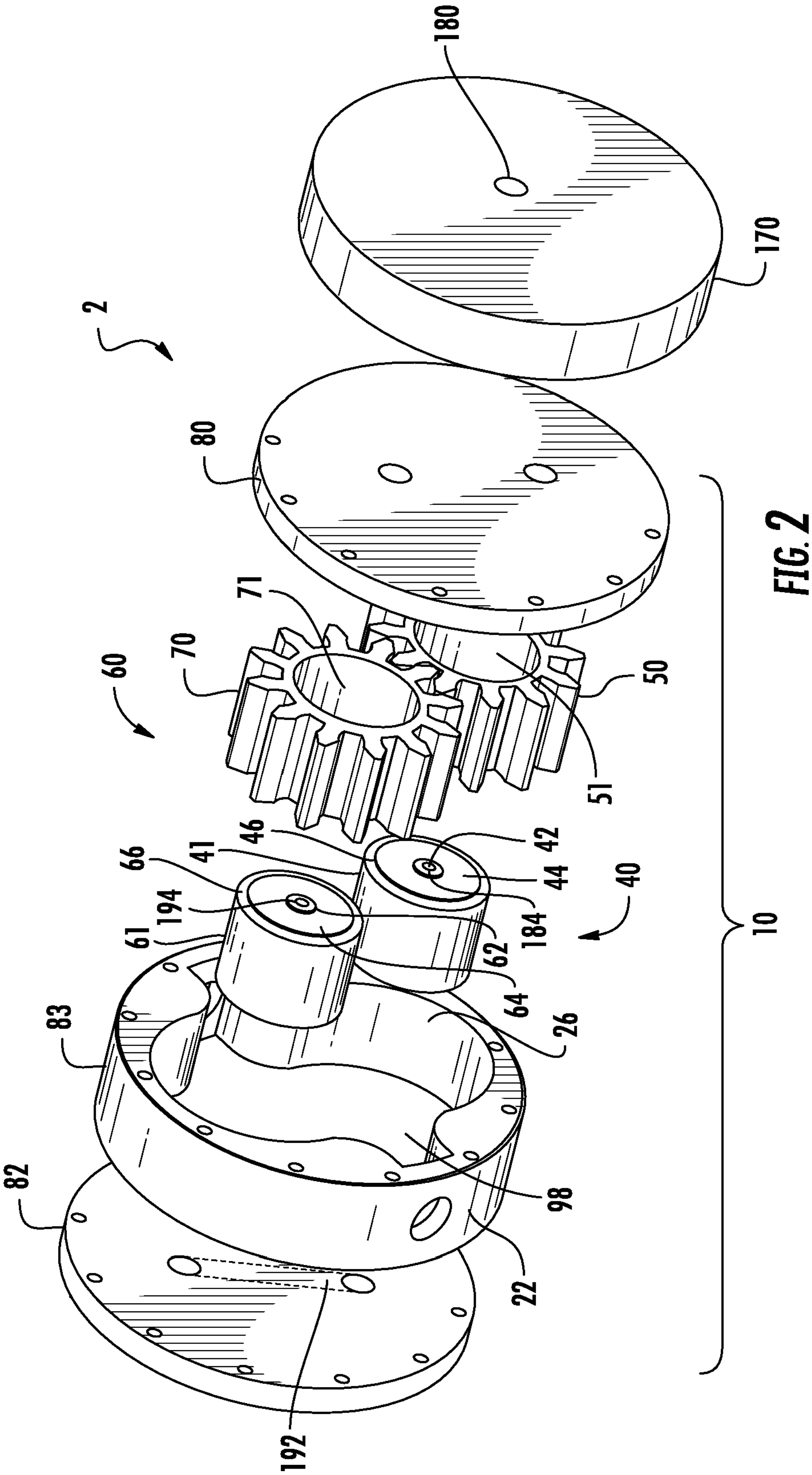
FIG. 2 shows an exploded view of an exemplary embodiment of a pump assembly having an external gear pump and storage device .

FIG. 2 shows an exploded view of an exemplary embodiment of a pump assembly, e.g., pump assembly 2 having the pump 10 and the storage device 170. The pump 10 includes two fluid drivers 40, 60 that respectively include prime movers and fluid displacement members. In the illustrated exemplary embodiment of FIG. 2, the prime movers are electric motors 41, 61 and the fluid displacement members are spur gears 50, 70. In this embodiment, both pump motors 41, 61 are disposed inside the gears 50, 70. As seen in FIG. 2, the pump 10 represents a positive-displacement (or fixed displacement) gear pump. The pump 10 has a casing 20 that includes end plates 80, 82 and a pump body 83. These two plates 80, 82 and the pump body 83 can be connected by a plurality of through bolts and nuts (not shown) and the inner surface 26 defines an inner volume 98. To prevent leakage, O-rings or other similar devices can be disposed between the end plates 80, 82 and the pump body 83. The casing 20 has a port 22 and a port 24 (see also FIG. 3), which are in fluid communication with the inner volume 98. During operation and based on the direction of flow, one of the ports 22, 24 is the pump inlet port and the other is the pump outlet port. In an exemplary embodiment, the ports 22, 24 of the casing 20 are round through-holes on opposing side walls of the casing 20. However, the shape is not limiting and the through-holes can have other shapes. In addition, one or both of the ports 22, 44 can be located on either the top or bottom of the casing. Of course, the ports 22, 24 must be located such that one port is on the inlet side of the pump and one port is on the outlet side of the pump.

As seen in FIG. 2, the pair of gears 50, 70 are disposed in the internal volume 98. Each of the gears 50, 70 has a plurality of gear teeth 52, 72 extending radially outward from the respective gear bodies. The gear teeth 52, 72, when rotated by, e.g., electric motors 41, 61, transfer fluid from the inlet to the outlet. In some embodiments, the pump 10 is bi-directional. Thus, either port 22, 24 can be the inlet port, depending on the direction of rotation of gears 50, 70, and the other port will be the outlet port. The gears 50, 70 have cylindrical openings 51, 71 along an axial centerline of the respective gear bodies. The cylindrical openings 51, 71 can extend either partially through or the entire length of the gear bodies. The cylindrical openings are sized to accept the pair of motors 41, 61. Each motor 41, 61 respectively includes a shaft 42, 62, a stator 44, 64, and a rotor 46, 66.

Figure 3:
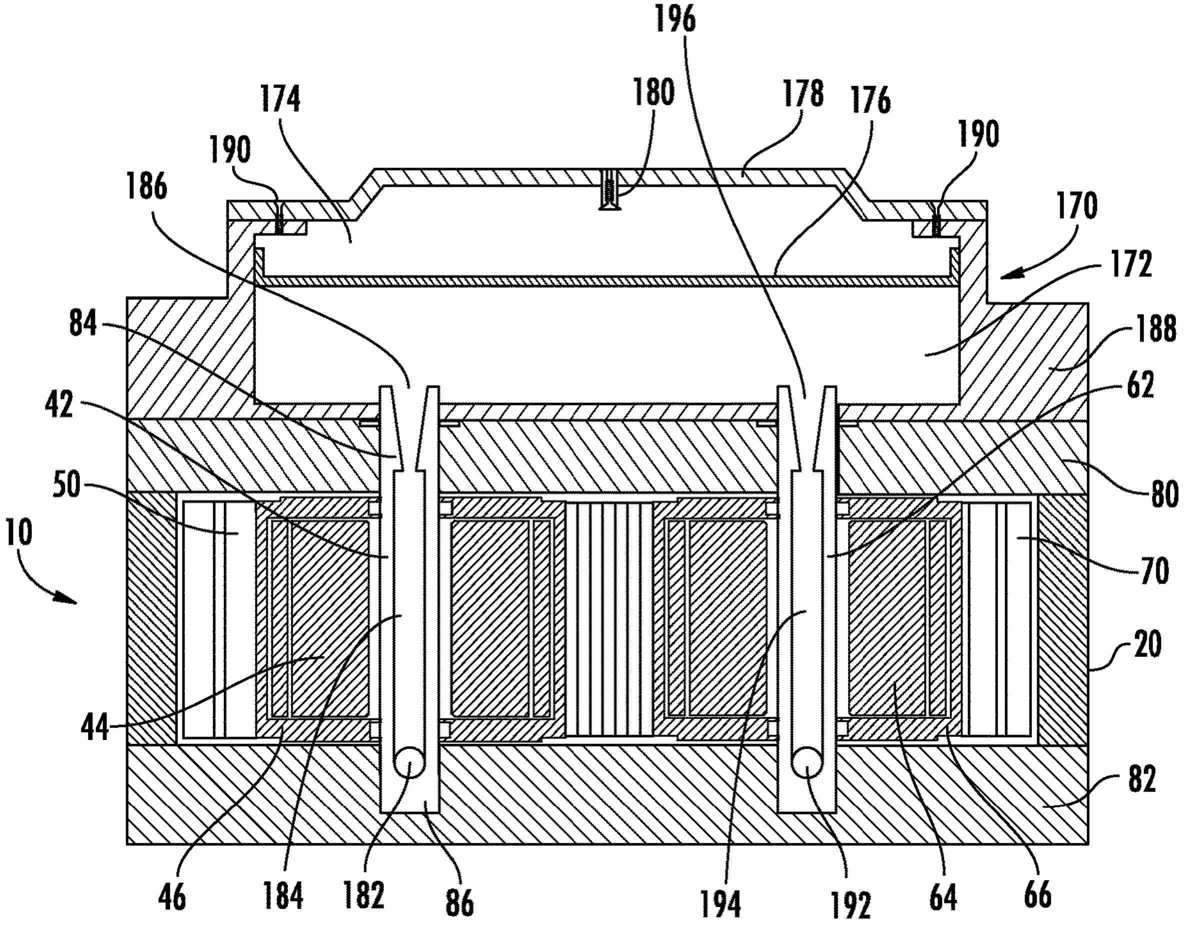
FIG. 3 shows a side cross-sectional view of the exemplary embodiment of FIG. 2.
Figure 3A:
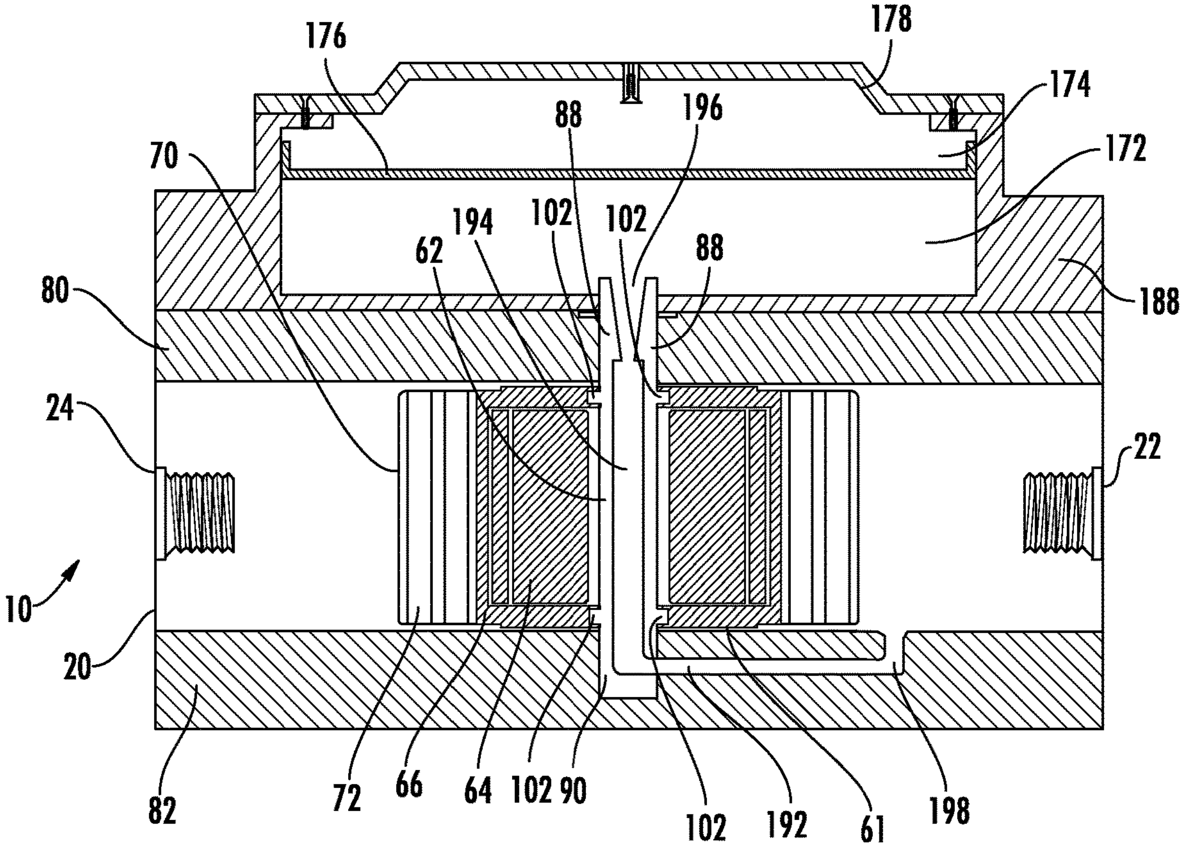
FIG. 3A shows another side cross-sectional view of the exemplary embodiment of FIG. 2.
Figure 5:
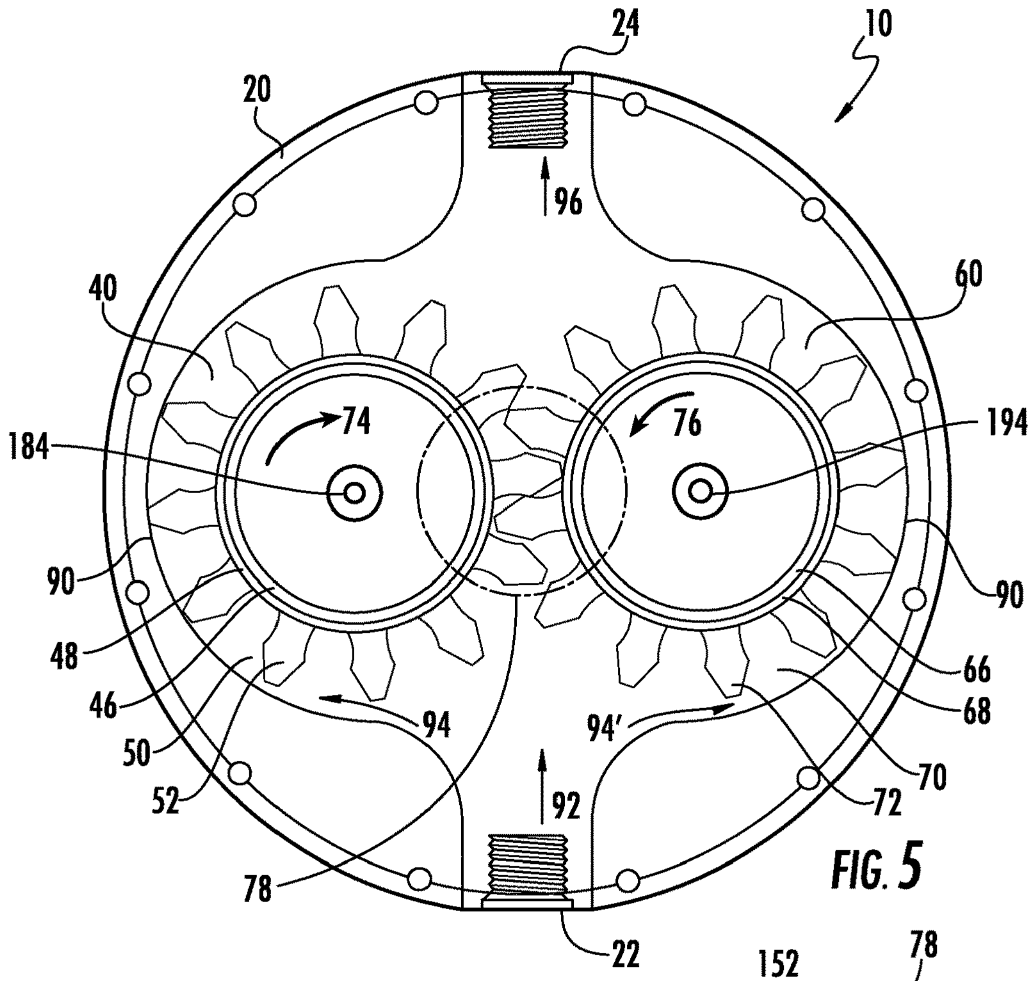
FIG. 5 illustrates an exemplary flow path of the external gear pump of FIG. 2.

FIG. 3 shows a side cross-sectional view of the external gear pump 10 of FIG. 2 but also includes the corresponding cross-sectional view of the storage device 170. FIG. 3A shows another side cross-sectional view of the external gear pump 10 but also includes the corresponding cross-sectional view of the storage device 170. FIG. 5 shows a top cross-sectional view of the external gear pump 10 of FIG. 2. As seen in FIGS. 3, 3A and 5, fluid drivers 40, 60 are disposed in the casing 20. The shafts 42, 62 of the fluid drivers 40, 60 are disposed between the port 22 and the port 24 of the casing 20 and are supported by the plate 80 at one end 84 and the plate 82 at the other end 86. However, the means to support the shafts 42, 62 and thus the fluid drivers 40, 60 are not limited to this arrangement and other configurations to support the shaft can be used. For example, one or both of the shafts 42, 62 can be supported by blocks that are attached to the casing 20 rather than directly by casing 20. The shaft 42 of the fluid driver 40 is disposed in parallel with the shaft 62 of the fluid driver 60 and the two shafts are separated by an appropriate distance so that the gear teeth 52, 72 of the respective gears 50, 70 contact each other when rotated. In the embodiment of FIG. 2, each of the shafts are flow-through type shafts with each shaft having a through-passage that runs axially through the body of the shafts 42, 62. One end of each shaft connects with an opening in the end plate 82 of a channel that connects to one of the ports 22, 24. For example, FIG. 2 illustrates a channel 192 (dotted line) that extends through the end plate 82. One opening of channel 192 accepts one end of the flow-through shaft 62 while the other end of channel 192 opens to port 22 of the pump 10. The other end of each flow-through shaft 42, 62 extends into the fluid chamber 172 (see FIG. 3) via openings in end plate 80. The configuration and function of the flow-through shafts are discussed further below.

As seen in FIGS. 3, 3A and 5, the stators 44, 64 of motors 41, 61 are disposed radially between the respective flow-through shafts 42, 62 and the rotors 46, 66. The stators 44, 64 are fixedly connected to the respective flow-through shafts 42, 62, which are fixedly connected to the openings in the casing 20. For example, the flow-through shafts 42, 62 can be attached to openings of the channels (e.g., channel 192) in the end plate 80 and the openings in end plate 82 for connection to the storage device 170. The flow-through shafts can be attached by threaded fittings, press fit, interference fit, soldering, welding, any appropriate combination thereof or by other known means. The rotors 46, 66 are disposed radially outward of the stators 44, 64 and surround the respective stators 44, 64. Thus, the motors 41, 61 in this embodiment are of an outer-rotor motor arrangement (or an external-rotor motor arrangement), which means that that the outside of the motor rotates and the center of the motor is stationary. In contrast, in an internal-rotor motor arrangement, the rotor is attached to a central shaft that rotates. In an exemplary embodiment, the electric motors 41, 61 are multi directional motors. That is, either motor can operate to create rotary motion either clockwise or counter-clockwise depending on operational needs. Further, in an exemplary embodiment, the motors 41, 61 are variable speed motors in which the speed of the rotor and thus the attached gear can be varied to create various volume flows and pump pressures.

As discussed above, the gear bodies can include cylindrical openings 51, 71 which receive motors 41, 61. In an exemplary embodiment, the fluid drivers 40, 60 can respectively include outer support members 48, 68 (see FIG. 5) which aid in coupling the motors 41,61 to the gears 50, 60 and in supporting the gears 50, 60 on motors 41,61. Each of the support members 48, 68 can be, for example, a sleeve that is initially attached to either an outer casing of the motors 41,61 or an inner surface of the cylindrical openings 51, 71. The sleeves can be attached by using an interference fit, a press fit, an adhesive, screws, bolts, a welding or soldering method, or other means that can attach the support members to the cylindrical openings. Similarly, the final coupling between the motors 41, 61 and the gears 50, 60 using the support members 48, 68 can be by using an interference fit, a press fit, screws, bolts, adhesive, a welding or soldering method, or other means to attach the motors to the support members. The sleeves can be of different thicknesses to, e.g., facilitate the attachment of motors 41, 61 with different physical sizes to the gears 50, 70 or vice versa. In addition, if the motor casings and the gears are made of materials that are not compatible, e.g., chemically or otherwise, the sleeves can be made of materials that are compatible with both the gear composition and motor casing composition. In some embodiments, the support members 48, 68 can be configured as a sacrificial piece. That is, support members 48, 68 are configured to be the first to fail, e.g., due to excessive stresses, temperatures, or other causes of failure, in comparison to the gears 50, 70 and motors 41, 61. This allows for a more economic repair of the pump 10 in the event of failure. In some embodiments, the outer support member 48, 68 is not a separate piece but an integral part of the casing for the motors 41, 61 or part of the inner surface of the cylindrical openings 51, 71 of the gears 50, 70. In other embodiments, the motors 41, 61 can support the gears 50, 60 (and the plurality of first gear teeth 52, 62) on their outer surfaces without the need for the outer support members 48, 68. For example, the motor casings can be directly coupled to the inner surface of the cylindrical opening 51, 71 of the gears 50, 70 by using an interference fit, a press fit, screws, bolts, an adhesive, a welding or soldering method, or other means to attach the motor casing to the cylindrical opening. In some embodiments, the outer casings of the motors 41, 61 can be, e.g., machined, cast, or other means to shape the outer casing to form a shape of the gear teeth 52, 72. In still other embodiments, the plurality of gear teeth 52, 72 can be integrated with the respective rotors 46, 66 such that each gear/rotor combination forms one rotary body.

As shown in FIG. 2, the storage device 170 can be mounted to the pump 10, e.g., on the end plate 80 to form one integrated unit. The storage device 170 can store fluid to be pumped by the pump 10 and supply fluid needed to perform a commanded operation. In some embodiments, the storage device 170 in the pump 10 is a pressurized vessel that stores the fluid for the system. In such embodiments, the storage device 170 is pressurized to a specified pressure that is appropriate for the system. As shown in FIG. 3A, the storage device 170 includes a vessel housing 188, a fluid chamber 172, a gas chamber 174, a separating element (or piston) 176, and a cover 178. The gas chamber 174 is separated from the fluid chamber 172 by the separating element 176. One or more sealing elements (not shown) may be provided along with the separating element 176 to prevent a leak between the two chambers 172, 174. At the center of the cover 178, a charging port 180 is provided such that the storage device 170 can be pressurized with a gas by way of charging the gas, nitrogen for example, through the charging port 180. Of course, the charging port 180 may be located at any appropriate location on the storage device 170. The cover 178 may be attached to the vessel housing 188 via a plurality of bolts 190 or other suitable means. One or more seals (not shown) may be provided between the cover 178 and the vessel housing 188 to prevent leakage of the gas.

In an exemplary embodiment, as shown in FIG. 3, the flow-through shaft 42 of fluid driver 40 penetrates through an opening in the end plate 80 and into the fluid chamber 172 of the pressurized vessel. The flow-through shaft 42 includes through-passage 184 that extends through the interior of shaft 42. The through-passage 184 has a port 186 at an end of the flow-through shaft 42 that leads to the fluid chamber 172 such that the through-passage 184 is in fluid communication with the fluid chamber 172. At the other end of flow-through shaft 42, the through-passage 184 connects to a fluid passage (not shown) that extends through the end plate 82 and connects to either port 22 or 24 such that the through-passage 184 is in fluid communication with either the port 22 or the port 24. In this way, the fluid chamber 172 is in fluid communication with a port of pump 10.

In some embodiments, a second shaft can also include a through-passage that provides fluid communication between a port of the pump and a fluid storage device. For example, as shown in FIGS. 2, 3 and 3A, the flow-through shaft 62 also penetrates through an opening in the end plate 80 and into the fluid chamber 172 of the storage device 170. The flow-through shaft 62 includes a through-passage 194 that extends through the interior of shaft 62. The through-passage 194 has a port 196 at an end of flow-through shaft 62 that leads to the fluid chamber 172 such that the through-passage 194 is in fluid communication with the fluid chamber 172. At the other end of flow-through shaft 62, the through-passage 194 connects to a fluid channel 192 that extends through the end plate 82 and connects to either port 22 or 24 (e.g., FIGS. 2 and 3A illustrate a connection to port 22) such that the through-passage 194 is in fluid communication with a port of the pump 10. In this way, the fluid chamber 172 is in fluid communication with a port of the pump 10.

In the exemplary embodiment shown in FIG. 3, the through-passage 184 and the through-passage 194 share a common storage device 170. That is, fluid is provided to or withdrawn from the common storage device 170 via the through-passages 184, 194. In some embodiments, the through-passages 184 and 194 connect to the same port of the pump, e.g., either to port 22 or port 24. In these embodiments, the storage device 170 is configured to maintain a desired pressure at the appropriate port of the pump 10 in, for example, closed-loop fluid systems. In other embodiments, the passages 184 and 194 connect to opposite ports of the pump 10. This arrangement can be advantageous in systems where the pump 10 is bi-directional. Appropriate valves (not shown) can be installed in either type of arrangement to prevent adverse operations of the pump 10. For example, the valves (not shown) can be appropriately operated to prevent a short-circuit between the inlet and outlet of the pump 10 via the storage device 170 in configurations where the through-passages 184 and 194 go to different ports of the pump 10.

In an exemplary embodiment, the storage device 170 may be pre-charged to a commanded pressure with a gas, e.g., nitrogen or some other suitable gas, in the gas chamber 174 via the charging port 180. For example, the storage device 170 may be pre-charged to at least 75% of the minimum required pressure of the fluid system and, in some embodiments, to at least 85% of the minimum required pressure of the fluid system. However, in other embodiments, the pressure of the storage device 170 can be varied based on operational requirements of the fluid system. The amount of fluid stored in the storage device 170 can vary depending on the requirements of the fluid system in which the pump 10 operates. For example, if the system includes an actuator, such as, e.g., a hydraulic cylinder, the storage vessel 170 can hold an amount of fluid that is needed to fully actuate the actuator plus a minimum required capacity for the storage device 170. The amount of fluid stored can also depend on changes in fluid volume due to changes in temperature of the fluid during operation and due to the environment in which the fluid delivery system will operate.

As the storage device 170 is pressurized, via, e.g., the charging port 180 on the cover 178, the pressure exerted on the separating element 176 compresses any liquid in the fluid chamber 172. As a result, the pressurized fluid is pushed through the through-passages 184 and 194 and then through the channels in the end plate 82 (e.g., channel 192 for through-passage 194—see FIGS. 2 and 3A) into a port of the pump 10 (or ports—depending on the arrangement) until the pressure in the storage device 170 is in equilibrium with the pressure at the port (ports) of the pump 10. During operation, if the pressure at the relevant port drops below the pressure in the fluid chamber 172, the pressurized fluid from the storage device 170 is pushed to the appropriate port until the pressures equalize. Conversely, if the pressure at the relevant port goes higher than the pressure of fluid chamber 172, the fluid from the port is pushed to the fluid chamber 172 via through-passages 184 and 194.

Figure 4:
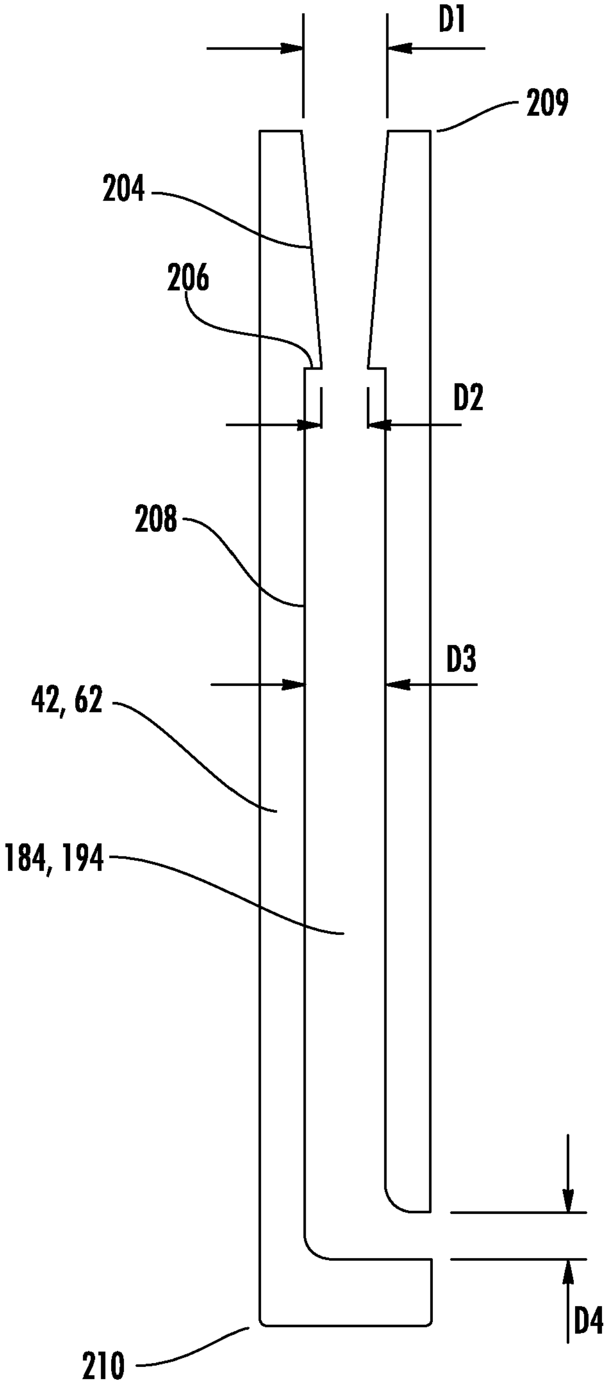
FIG. 4 shows an enlarged view of a preferred embodiment of a flow-through shaft with a through-passage.

FIG. 4 shows an enlarged view of an exemplary embodiment of the flow-through shaft 42, 62. The through-passage 184, 194 extend through the flow-through shaft 42, 62 from end 209 to end 210 and includes a tapered portion (or converging portion) 204 at the end 209 (or near the end 209) of the shaft 42, 62. The end 209 is in fluid communication with the storage device 170. The tapered portion 204 starts at the end 209 (or near the end 209) of the flow-through shaft 42, 62, and extends part-way into the through-passage 184, 194 of the flow-through shaft 42, 62 to point 206. In some embodiments, the tapered portion can extend 5% to 50% the length of the through-passage 184, 194. Within the tapered portion 204, the diameter of the through-passage 184, 194, as measured on the inside of the shaft 42, 62, is reduced as the tapered portion extends to end 206 of the flow-through shaft 42, 62. As shown in FIG. 4, the tapered portion 204 has, at end 209, a diameter D1 that is reduced to a smaller diameter D2 at point 206 and the reduction in diameter is such that flow characteristics of the fluid are measurably affected. In some embodiments, the reduction in the diameter is linear. However, the reduction in the diameter of the through-passage 184, 194 need not be a linear profile and can follow a curved profile, a stepped profile, or some other desired profile. Thus, in the case where the pressurized fluid flows from the storage device 170 and to the port of the pump via the through-passage 184, 194, the fluid encounters a reduction in diameter (D1→D2), which provides a resistance to the fluid flow and slows down discharge of the pressurized fluid from the storage device 170 to the pump port. By slowing the discharge of the fluid from the storage device 170, the storage device 170 behaves isothermally or substantially isothermally. It is known in the art that near-isothermal expansion/compression of a pressurized vessel, i.e. limited variation in temperature of the fluid in the pressurized vessel, tends to improve the thermal stability and efficiency of the pressurized vessel in a fluid system. Thus, in this exemplary embodiment, as compared to some other exemplary embodiments, the tapered portion 204 facilitates a reduction in discharge speed of the pressurized fluid from the storage device 170, which provides for thermal stability and efficiency of the storage device 170.

As the pressurized fluid flows from the storage device 170 to a port of the pump 10, the fluid exits the tapered portion 204 at point 206 and enters an expansion portion (or throat portion) 208 where the diameter of the through-passage 184, 194 expands from the diameter D2 to a diameter D3, which is larger than D2, as measured to manufacturing tolerances. In the embodiment of FIG. 4, there is step-wise expansion from D2 to D3. However, the expansion profile does not have to be performed as a step and other profiles are possible so long as the expansion is done relatively quickly. However, in some embodiments, depending on factors such the fluid being pumped and the length of the through-passage 184, 194, the diameter of the expansion portion 208 at point 206 can initially be equal to diameter D2, as measured to manufacturing tolerances, and then gradually expand to diameter D3. The expansion portion 208 of the through-passage 184, 194 serves to stabilize the flow of the fluid from the storage device 170. Flow stabilization may be needed because the reduction in diameter in the tapered portion 204 can induce an increase in speed of the fluid due to nozzle effect (or Venturi effect), which can generate a disturbance in the fluid. However, in the exemplary embodiments of the present disclosure, as soon as the fluid leaves the tapered portion 204, the turbulence in the fluid due to the nozzle effect is mitigated by the expansion portion 208. In some embodiments, the third diameter D3 is equal to the first diameter D1, as measured to manufacturing tolerances. In the exemplary embodiments of the present disclosure, the entire length of the flow-through shafts 42, 62 can be used to incorporate the configuration of through-passages 184, 194 to stabilize the fluid flow.

The stabilized flow exits the through passage 184, 194 at end 210. The through-passage 184, 194 at end 210 can be fluidly connected to either the port 22 or port 24 of the pump 10 via, e.g., channels in the end plate 82 (e.g., channel 192 for through-passage 194—see FIGS. 2 and 3A). Of course, the flow path is not limited to channels within the pump casing and other means can be used. For example, the port 210 can be connected to external pipes and/or hoses that connect to port 22 or port 24 of pump 10. In some embodiments, the through-passage 184, 194 at end 210 has a diameter D4 that is smaller than the third diameter D3 of the expansion portion 208. For example, the diameter D4 can be equal to the diameter D2, as measured to manufacturing tolerances. In some embodiments, the diameter D1 is larger than the diameter D2 by 50 to 75% and larger than diameter D4 by 50 to 75%. In some embodiments, the diameter D3 is larger than the diameter D2 by 50 to 75% and larger than diameter D4 by 50 to 75%.

The cross-sectional shape of the fluid passage is not limiting. For example, a circular-shaped passage, a rectangular-shaped passage, or some other desired shaped passage may be used. Of course, the through-passage in not limited to a configuration having a tapered portion and an expansion portion and other configurations, including through-passages having a uniform cross-sectional area along the length of the through-passage, can be used. Thus, configuration of the through-passage of the flow-through shaft can vary without departing from the scope of the present disclosure.

In the above embodiments, the flow-through shafts 42, 62 penetrate a short distance into the fluid chamber 172. However, in other embodiments, either or both of the flow-through shafts 42, 62 can be disposed such that the ends are flush with a wall of the fluid chamber 172. In some embodiments, the end of the flow-through shaft can terminate at another location such as, e.g., in the end plate 80, and suitable means such, e.g., channels, hoses, or pipes can be used so that the shaft is in fluid communication with the fluid chamber 172. In this case, the flow-through shafts 42, 62 may be disposed completely between the upper and lower plates 80, 82 without penetrating into the fluid chamber 172.

In the above embodiments, the storage device 170 is mounted on the end plate 80 of the casing 20. However, in other embodiments, the storage device 170 can be mounted on the end plate 82 of the casing 20. In still other embodiments, the storage device 170 may be disposed spaced apart from the pump 10. In this case, the storage device 170 may be in fluid communication with the pump 10 via a connecting medium, for example hoses, tubes, pipes, or other similar devices. An exemplary operation of the pump 10 is discussed below.

FIG. 5 illustrates an exemplary fluid flow path of an exemplary embodiment of the external gear pump 10. The ports 22, 24, and a contact area 78 between the plurality of first gear teeth 52 and the plurality of second gear teeth 72 are substantially aligned along a single straight path. However, the alignment of the ports are not limited to this exemplary embodiment and other alignments are permissible. For explanatory purpose, the gear 50 is rotatably driven clockwise 74 by motor 41 and the gear 70 is rotatably driven counter-clockwise 76 by the motor 61. With this rotational configuration, port 22 is the inlet side of the gear pump 10 and port 24 is the outlet side of the gear pump 10. In some exemplary embodiments, both gears 50, 70 are respectively independently driven by the separately provided motors 41, 61.

As seen in FIG. 5, the fluid to be pumped is drawn into the casing 20 at port 22 as shown by an arrow 92 and exits the pump 10 via port 24 as shown by arrow 96. The pumping of the fluid is accomplished by the gear teeth 52, 72. As the gear teeth 52, 72 rotate, the gear teeth rotating out of the contact area 78 form expanding inter-tooth volumes between adjacent teeth on each gear. As these inter-tooth volumes expand, the spaces between adjacent teeth on each gear are filled with fluid from the inlet port, which is port 22 in this exemplary embodiment. The fluid is then forced to move with each gear along the interior wall 90 of the casing 20 as shown by arrows 94 and 94'. That is, the teeth 52 of gear 50 force the fluid to flow along the path 94 and the teeth 72 of gear 70 force the fluid to flow along the path 94'. Very small clearances between the tips of the gear teeth 52, 72 on each gear and the corresponding interior wall 90 of the casing 20 keep the fluid in the inter-tooth volumes trapped, which prevents the fluid from leaking back towards the inlet port. As the gear teeth 52, 72 rotate around and back into the contact area 78, shrinking inter-tooth volumes form between adjacent teeth on each gear because a corresponding tooth of the other gear enters the space between adjacent teeth. The shrinking inter-tooth volumes force the fluid to exit the space between the adjacent teeth and flow out of the pump 10 through port 24 as shown by arrow 96. In some embodiments, the motors 41, 61 are bi-directional and the rotation of motors 41, 61 can be reversed to reverse the direction fluid flow through the pump 10, i.e., the fluid flows from the port 24 to the port 22.

To prevent backflow, i.e., fluid leakage from the outlet side to the inlet side through the contact area 78, contact between a tooth of the first gear 50 and a tooth of the second gear 70 in the contact area 78 provides sealing against the backflow. The contact force is sufficiently large enough to provide substantial sealing but, unlike driver-driven systems, the contact force is not so large as to significantly drive the other gear. In driver-driven systems, the force applied by the driver gear turns the driven gear. That is, the driver gear meshes with (or interlocks with) the driven gear to mechanically drive the driven gear. While the force from the driver gear provides sealing at the interface point between the two teeth, this force is much higher than that necessary for sealing because this force must be sufficient enough to mechanically drive the driven gear to transfer the fluid at the desired flow and pressure.

In some exemplary embodiments, however, the gears 50, 70 of the pump 10 do not mechanically drive the other gear to any significant degree when the teeth 52, 72 form a seal in the contact area 78. Instead, the gears 50, 70 are rotatably driven independently such that the gear teeth 52, 72 do not grind against each other. That is, the gears 50, 70 are synchronously driven to provide contact but not to grind against each other. Specifically, rotation of the gears 50, 70 are synchronized at suitable rotation rates so that a tooth of the gear 50 contacts a tooth of the second gear 70 in the contact area 78 with sufficient enough force to provide substantial sealing, i.e., fluid leakage from the outlet port side to the inlet port side through the contact area 78 is substantially eliminated. However, unlike a driver-driven configuration, the contact force between the two gears is insufficient to have one gear mechanically drive the other to any significant degree. Precision control of the motors 41, 61, will ensure that the gear positons remain synchronized with respect to each other during operation.

In some embodiments, rotation of the gears 50, 70 is at least 99% synchronized, where 100% synchronized means that both gears 50, 70 are rotated at the same rpm. However, the synchronization percentage can be varied as long as substantial sealing is provided via the contact between the gear teeth of the two gears 50, 70. In exemplary embodiments, the synchronization rate can be in a range of 95.0% to 100% based on a clearance relationship between the gear teeth 52 and the gear teeth 72. In other exemplary embodiments, the synchronization rate is in a range of 99.0% to 100% based on a clearance relationship between the gear teeth 52 and the gear teeth 72, and in still other exemplary embodiments, the synchronization rate is in a range of 99.5% to 100% based on a clearance relationship between the gear teeth 52 and the gear teeth 72. Again, precision control of the motors 41, 61, will ensure that the gear positons remain synchronized with respect to each other during operation. By appropriately synchronizing the gears 50, 70, the gear teeth 52, 72 can provide substantial sealing, e.g., a backflow or leakage rate with a slip coefficient in a range of 5% or less. For example, for typical hydraulic fluid at about 120 deg. F, the slip coefficient can be can be 5% or less for pump pressures in a range of 3000 psi to 5000 psi, 3% or less for pump pressures in a range of 2000 psi to 3000 psi, 2% or less for pump pressures in a range of 1000 psi to 2000 psi, and 1% or less for pump pressures in a range up to 1000 psi. Of course, depending on the pump type, the synchronized contact can aid in pumping the fluid. For example, in certain internal-gear georotor configurations, the synchronized contact between the two fluid drivers also aids in pumping the fluid, which is trapped between teeth of opposing gears. In some exemplary embodiments, the gears 50, 70 are synchronized by appropriately synchronizing the motors 41, 61. Synchronization of multiple motors is known in the relevant art, thus detailed explanation is omitted here.

Figure 5A:
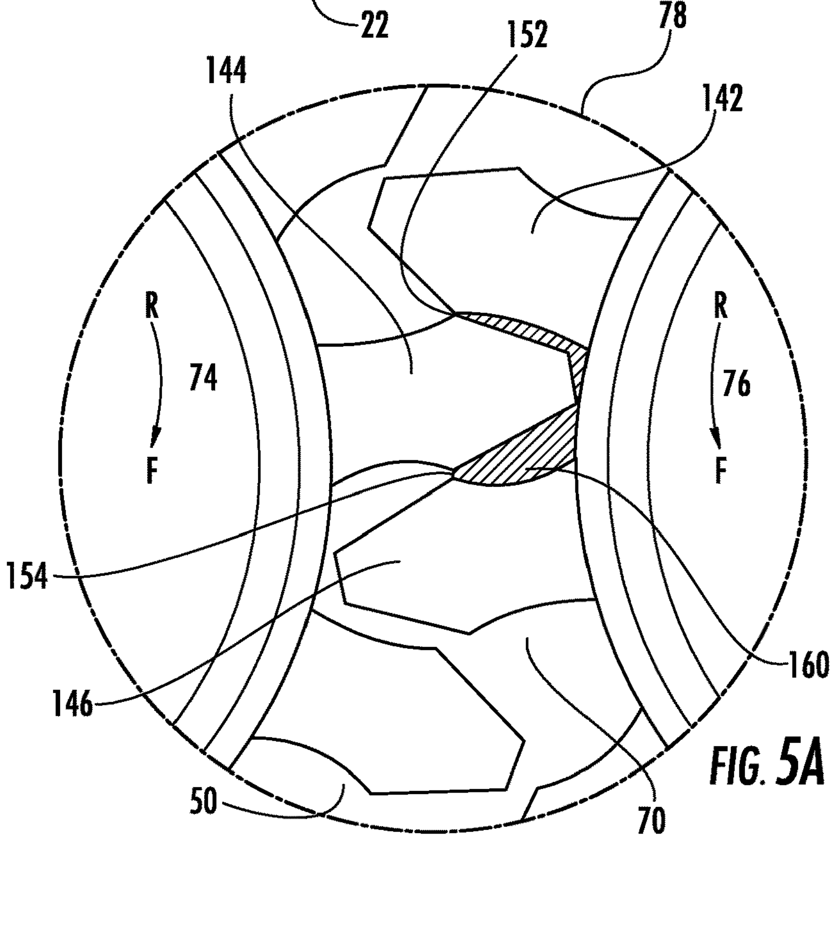
FIG. 5A shows a cross-sectional view illustrating one-sided contact between two gears in an overlapping area of FIG. 5.

In an exemplary embodiment, the synchronizing of the gears 50, 70 provides one-sided contact between a tooth of the gear 50 and a tooth of the gear 70. FIG. 5A shows a cross-sectional view illustrating this one-sided contact between the two gears 50, 70 in the contact area 78. For illustrative purposes, gear 50 is rotatably driven clockwise 74 and the gear 70 is rotatably driven counter-clockwise 76 independently of the gear 50. Further, the gear 70 is rotatably driven faster than the gear 50 by a fraction of a second, 0.01 sec/revolution, for example. This rotational speed difference between the gear 50 and gear 70 enables one-sided contact between the two gears 50, 70, which provides substantial sealing between gear teeth of the two gears 50, 70 to seal between the inlet port and the outlet port, as described above. Thus, as shown in FIG. 5A, a tooth 142 on the gear 70 contacts a tooth 144 on the gear 50 at a point of contact 152. If a face of a gear tooth that is facing forward in the rotational direction 74, 76 is defined as a front side (F), the front side (F) of the tooth 142 contacts the rear side (R) of the tooth 144 at the point of contact 152. However, the gear tooth dimensions are such that the front side (F) of the tooth 144 is not in contact with (i.e., spaced apart from) the rear side (R) of tooth 146, which is a tooth adjacent to the tooth 142 on the gear 70. Thus, the gear teeth 52, 72 are configured such that there is one-sided contact in the contact area 78 as the gears 50, 70 are driven. As the tooth 142 and the tooth 144 move away from the contact area 78 as the gears 50, 70 rotate, the one-sided contact formed between the teeth 142 and 144 phases out. As long as there is a rotational speed difference between the two gears 50, 70, this one-sided contact is formed intermittently between a tooth on the gear 50 and a tooth on the gear 70. However, because as the gears 50, 70 rotate, the next two following teeth on the respective gears form the next one-sided contact such that there is always contact and the backflow path in the contact area 78 remains substantially sealed. That is, the one-sided contact provides sealing between the ports 22 and 24 such that fluid carried from the pump inlet to the pump outlet is prevented (or substantially prevented) from flowing back to the pump inlet through the contact area 78.

In FIG. 5A, the one-sided contact between the tooth 142 and the tooth 144 is shown as being at a particular point, i.e. point of contact 152. However, a one-sided contact between gear teeth in the exemplary embodiments is not limited to contact at a particular point. For example, the one-sided contact can occur at a plurality of points or along a contact line between the tooth 142 and the tooth 144. For another example, one-sided contact can occur between surface areas of the two gear teeth. Thus, a sealing area can be formed when an area on the surface of the tooth 142 is in contact with an area on the surface of the tooth 144 during the one-sided contact. The gear teeth 52, 72 of each gear 50, 70 can be configured to have a tooth profile (or curvature) to achieve one-sided contact between the two gear teeth. In this way, one-sided contact in the present disclosure can occur at a point or points, along a line, or over surface areas. Accordingly, the point of contact 152 discussed above can be provided as part of a location (or locations) of contact, and not limited to a single point of contact.

In some exemplary embodiments, the teeth of the respective gears 50, 70 are configured so as to not trap excessive fluid pressure between the teeth in the contact area 78. As illustrated in FIG. 5A, fluid 160 can be trapped between the teeth 142, 144, 146. While the trapped fluid 160 provides a sealing effect between the pump inlet and the pump outlet, excessive pressure can accumulate as the gears 50, 70 rotate. In a preferred embodiment, the gear teeth profile is such that a small clearance (or gap) 154 is provided between the gear teeth 144, 146 to release pressurized fluid. Such a configuration retains the sealing effect while ensuring that excessive pressure is not built up. Of course, the point, line or area of contact is not limited to the side of one tooth face contacting the side of another tooth face. Depending on the type of fluid displacement member, the synchronized contact can be between any surface of at least one projection (e.g., bump, extension, bulge, protrusion, other similar structure or combinations thereof) on the first fluid displacement member and any surface of at least one projection(e.g., bump, extension, bulge, protrusion, other similar structure or combinations thereof) or an indent(e.g., cavity, depression, void or similar structure) on the second fluid displacement member. In some embodiments, at least one of the fluid displacement members can be made of or include a resilient material, e.g., rubber, an elastomeric material, or another resilient material, so that the contact force provides a more positive sealing area.

As the pump 10 operates, there can be pressure spikes at the inlet and outlet ports (e.g., ports 22 and 24, respectively, in the example) of the pump due to, e.g., operation of an actuator (e.g., a hydraulic cylinder, a hydraulic motor, or another type of fluid operated actuator), the load that is being operated by the actuator, valves that are being operated in the system or for some other reason. These pressure spikes can cause damage to components in the fluid system. In some embodiments, the storage device 170 can be used to smooth out or dampen the pressure spikes. For example, the storage device 170 can be pressurized to a desire pressure and, as discussed above, connected to either the inlet port or the outlet port (or both with appropriate valves). When a pressure spike occurs at the port, the pressure spike is transmitted to the storage device 170, which then dampens the pressure spike due to the compressibility of the gas in the gas chamber 174. In addition, the fluid system in which the pump 10 operates may need to either add or remove fluid from the main fluid flow path of the fluid system due to, e.g., operation of the actuator. For example, when a hydraulic cylinder operates, the fluid volume in a closed-loop system may vary during operation because the extraction chamber volume and the retraction chamber volume may not be the same due to, e.g., the piston rod or for some other reason. In addition, changes in fluid temperature can also necessitate the addition or removal of fluid in a closed-loop system. In such cases, any extra fluid in the system will need to be stored and any fluid deficiency will need to be replenished. The storage device 170 can store and release the required amount of fluid for stable operation.

For example, in situations where the fluid system needs additional fluid during the operation of the pump 10, e.g., extracting a hydraulic cylinder that is attached the pump 10, the pressure of the inlet port, which is port 22 in the embodiment of FIG. 5, will drop below the pressure of fluid chamber 172 in the storage device 170. The pressure difference will cause the pressurized fluid to flow from the storage device 170 to the port 22 via the through-passages 184, 194 and replenish the fluid in the system. Conversely, when fluid needs to be removed from the main fluid flow path, e.g., due to the pump 10 reversing direction and retracting the hydraulic cylinder or for some other reason, the pressure of the fluid at the port 22 will become higher than the pressure in fluid chamber 172. Due to the pressure difference, the fluid will flow from the port 22 to the storage device 170 via through-passages 184, 194 and be stored in the fluid chamber 172 until needed by the system.

In the above discussed exemplary embodiments, both fluid drivers, including the prime movers and fluid displacement members, are integrated into a single pump casing 20. In addition, as described above, exemplary embodiments of the pump include an innovative configuration for fluid communication between at least one storage device and at least one port of the pump. Specifically, the pump can include one or more fluid paths through at least one shaft in the pump to provide fluid communication between at least one port of the pump and at least one fluid storage device that can be attached to the pump. This innovative fluid delivery system configuration of the pump and storage device of the present disclosure enables a compact arrangement that provides various advantages. First, the space or footprint occupied by the exemplary embodiments of the fluid delivery system discussed above is significantly reduced by integrating necessary components pump into a single pump casing and by integrating the fluid communication configuration between a storage device and a port of the pump, when compared to conventional pump systems. In addition, the total weight of the pump system is also reduced by removing unnecessary parts such as hoses or pipes used in conventional pump systems for fluid communication between a pump and a fluid storage device. In addition, this configuration can provide a cooling effect to the prime mover (e.g., motor) that gets heated during the pumping operation, especially at the center when motors are the prime movers. Further, since the pump of the present disclosure has a compact and modular arrangement, it can be easily installed, even at locations where conventional gear pumps and storage devices cannot be installed, and can be easily replaced.

Figure 6:
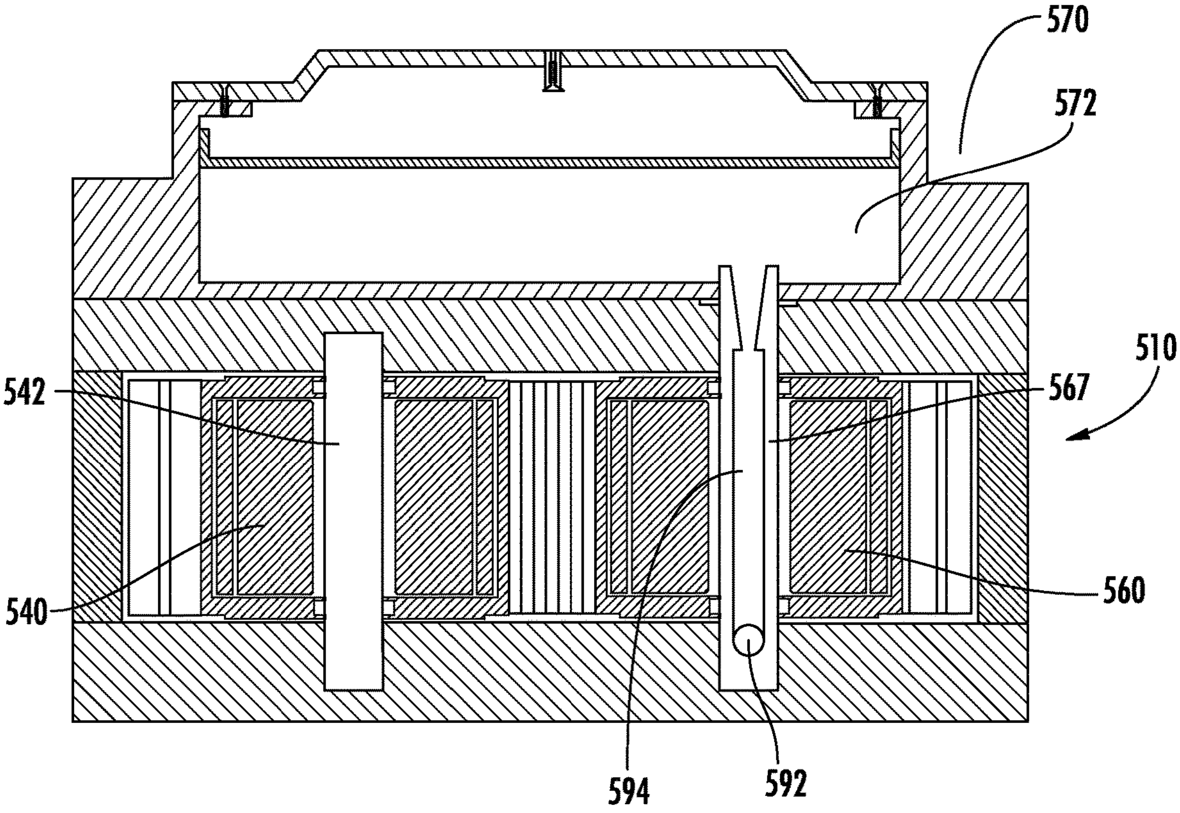
FIG. 6 shows a cross-sectional view of an exemplary embodiment of a pump assembly.

In the above exemplary embodiments, both shafts 42, 62 include a through-passage configuration. However, in some exemplary embodiments, only one of the shafts has a through-passage configuration. For example, FIG. 6 shows a side cross-sectional view of another embodiment of an external gear pump and storage device system. In this embodiment, pump 510 is substantially similar to the exemplary embodiment of the external gear pump 10 shown in FIG. 3A. That is, the operation and function of fluid driver 540 are similar to that of fluid driver 40 and the operation and function of fluid driver 560 are similar to that fluid driver 60. Further, the configuration and function of storage device 570 is similar to that of storage device 170 discussed above. Accordingly, for brevity, a detailed description of the operation of pump 510 and storage device 570 is omitted except as necessary to describe the present exemplary embodiment. As shown in FIG. 6, unlike shaft 42 of fluid driver 40 of pump 10, the shaft 542 of fluid driver 540 does not include a through-passage. Thus, only shaft 562 of fluid driver 560 includes a through-passage 594. The through-passage 594 permits fluid communication between fluid chamber 572 and a port of the pump 510 via a channel 582. Those skilled in the art will recognize that through-passage 594 and channel 592 perform similar functions as through-passage 194 and channel 192 discussed above. Accordingly, for brevity, a detailed description of through-passage 594 and channel 592 and their function within pump 510 are omitted.

Figure 6A:
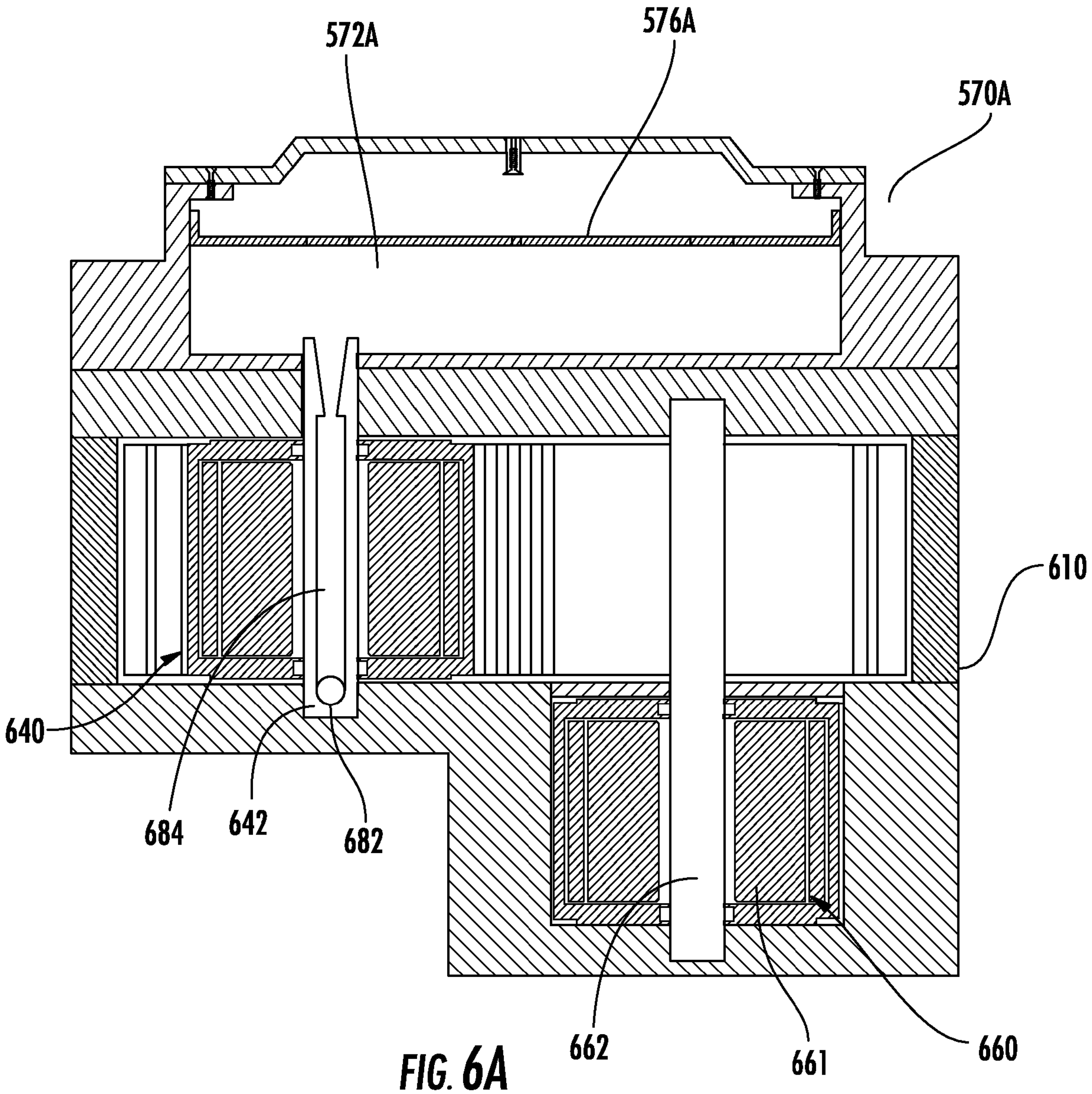
FIG. 6A shows a cross-sectional view of an exemplary embodiment of a pump assembly.

Another single, flow-through shaft pump configuration is shown in FIG. 6A, which shows a side cross-sectional view of another embodiment of an external gear pump and storage device system. In this embodiment, pump 610 is substantially similar to the exemplary embodiment of the external gear pump 10 shown in FIG. 3A, however, one of the fluid drivers is configured such that the motor is disposed adjacent to the gear rather than inside the gear body. As seen in FIG. 6A, the motor 661 of fluid driver 660 is disposed adjacent to gear 670, but the motor 641 for fluid driver 640 is disposed inside the gear 650, similar to configuration of fluid driver 40. In the embodiment of FIG. 6A, the configuration of fluid driver 660 is such that, unlike shaft 62 of fluid driver 60, the shaft 662 of fluid driver 660 rotates. That is, the motor 661 is an inner-rotor motor arrangement in which the stator is fixed to the pump casing and the rotor and shaft 662 are free to rotate. However, it is possible to use an outer-rotor arrangement for motor 661 with appropriate modifications to turn shaft 662. Although the motor 661 of fluid driver 660 is located adjacent to the gear 670 rather than inside the gear body, the operation and function of fluid drivers 640 and 660 are similar to that of fluid drivers 40 and 60. Further, the configuration and function of storage device 570A is similar to that of storage device 170 discussed above. Accordingly, for brevity, a detailed description of the operation of pump 610 and storage device 570A is omitted except as necessary to describe the present exemplary embodiment. As shown in FIG. 6A, unlike shaft 62 of fluid driver 60 of pump 10, the shaft 662 of fluid driver 660 does not include a through-passage. Thus, only shaft 642 of fluid driver 640 includes a through-passage 684. The through-passage 684 permits fluid communication between fluid chamber 572A and a port of the pump 610 via a channel 682. Those skilled in the art will recognize that through-passage 684 and channel 682 perform similar functions as through-passage 184 and channel 192 discussed above. Accordingly, for brevity, a detailed description of through-passage 684 and channel 682 and their function within pump 610 are omitted. Although the above-embodiment shows that the motor 661 is still inside the pump casing, in other embodiments, the motor 661 can be disposed outside the pump casing.

Figure 6B:
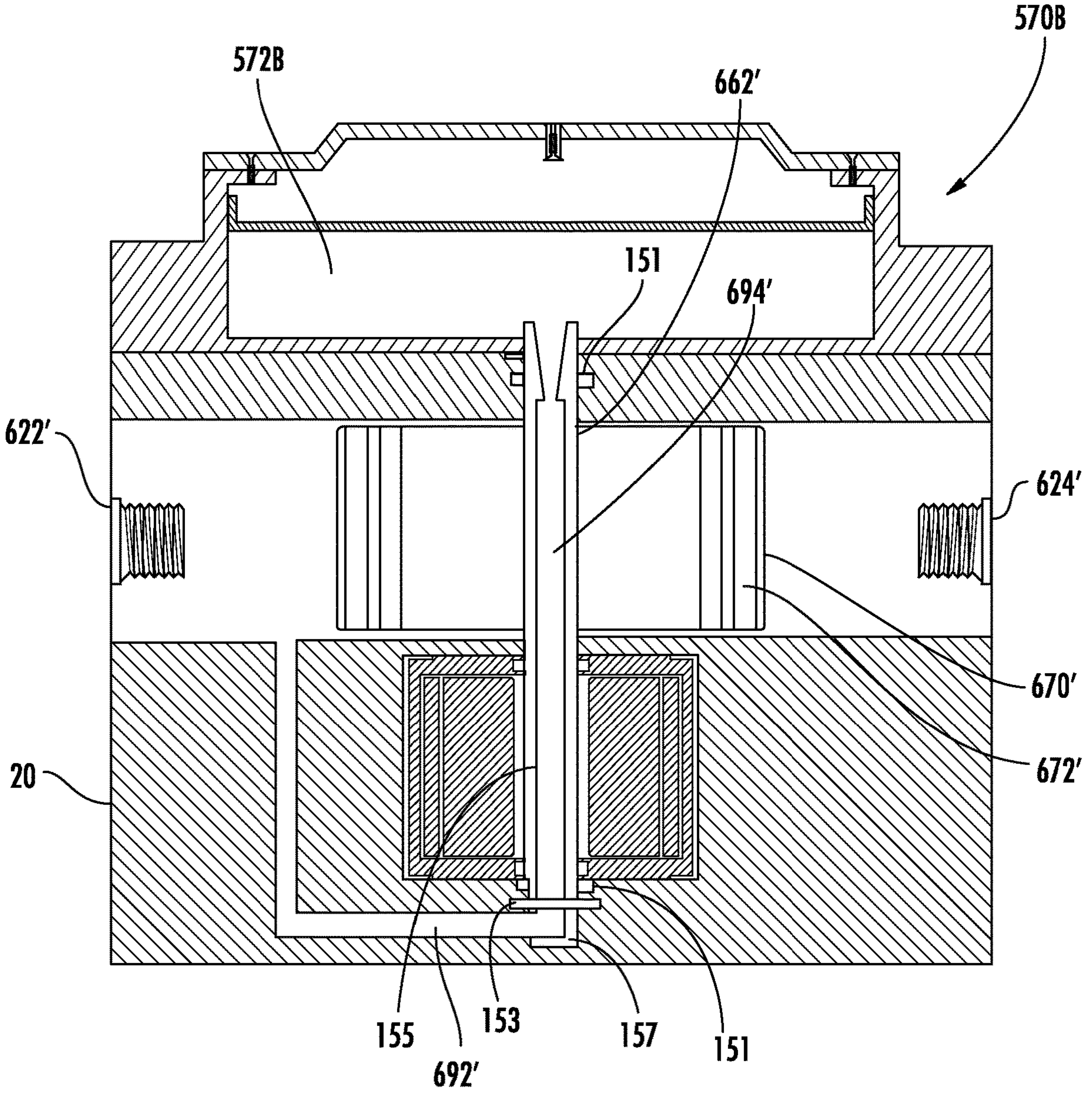
FIG. 6B shows a cross-sectional view of an exemplary embodiment of a pump assembly.

In the embodiment of FIG. 6A, the shaft 662, to which the gear 670 and the pump 610 are connected, does not include a through-passage. However, instead of or in addition to through-passage 684 of shaft 642, the shaft 662 of pump 610 can have a through-passage therein. As seen in FIG. 6B, the pump 610' includes a shaft 662' with a through-passage 694' that is in fluid communication with chamber 672 of storage device 570B and a port of the pump 610' via channel 692'. Thus, the fluid chamber 572B is in fluid communication with port 622' of pump 610' via through-passage 694' and channel 692'.

The configuration of flow-through shaft 662' is different from that of the exemplary shafts described above because, unlike the other shafts, the shaft 662' rotates. The flow-through shaft 662' can be supported by bearings 151 on both ends. In the exemplary embodiment, the flow-through shaft 662' has a rotary portion 155 that rotates with the motor rotor and a stationary portion 157 that is fixed to the motor casing. A coupling 153 can be provided between the rotary and stationary portions 155, 157 to allow fluid to travel between the rotary and stationary portions 155, 157 through the coupling 153 while the pump 610' operates. In some embodiments, the coupling 153 can include one or more seals to prevent leakage. Of course, the stationary portion 157 can be part of the pump casing rather than a part of the flow-through shaft.

While the above exemplary embodiments illustrate only one storage device, exemplary embodiments of the present disclosure are not limited to one storage device and can have more than one storage device. For example, in an exemplary embodiment shown in FIG. 7, a storage device 770 can be mounted to the pump 710, e.g., on the end plate 782. The storage device 770 can store fluid to be pumped by the pump 710 and supply fluid needed to perform a commanded operation. In addition, another storage device 870 can also be mounted on the pump 710, e.g., on the end plate 780. Those skilled in the art would understand that the storage devices 770 and 870 are similar in configuration and function to storage device 170. Thus, for brevity, a detailed description of storage devices 770 and 870 is omitted, except as necessary to explain the present exemplary embodiment.

Figure 7:
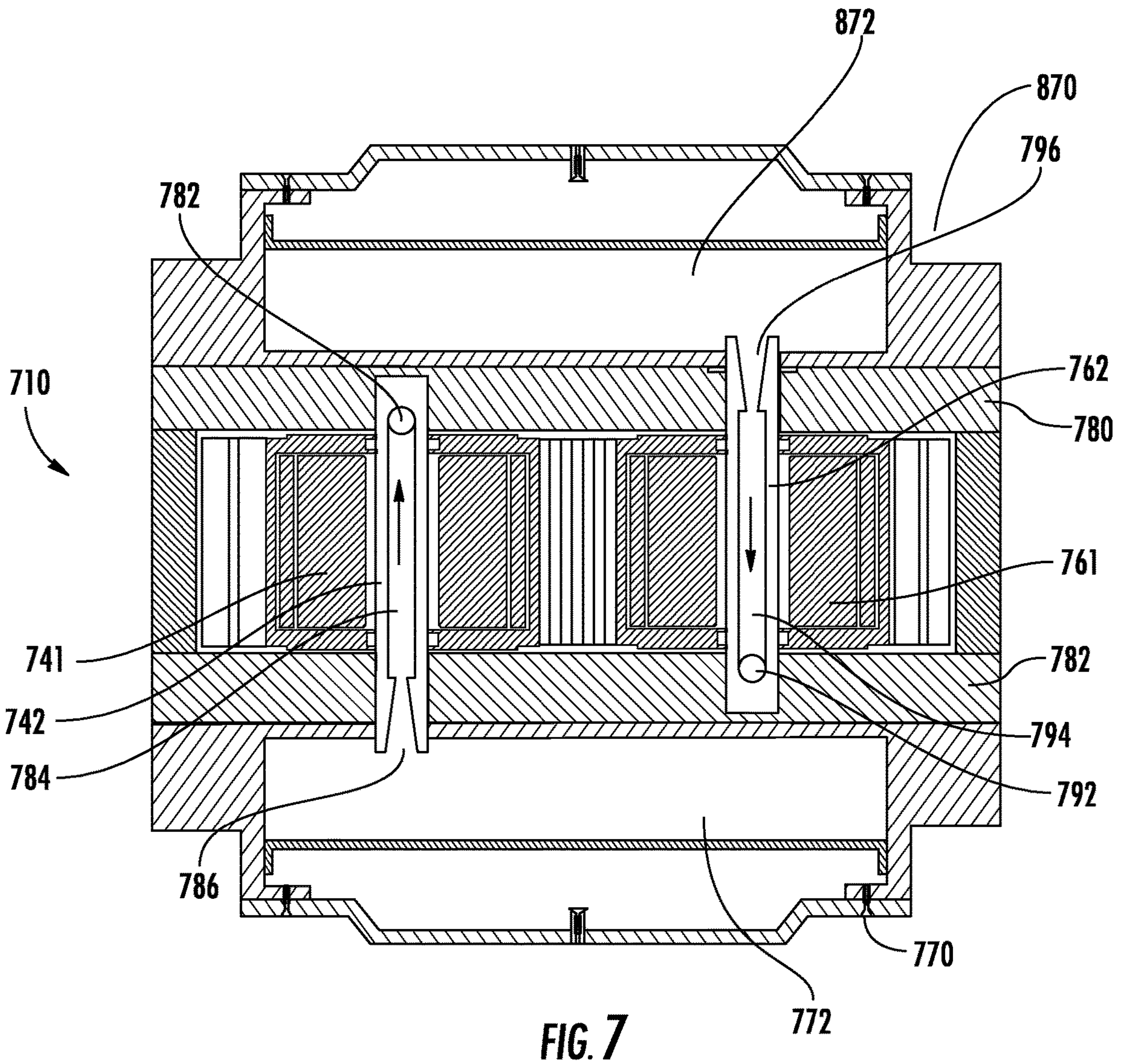
FIG. 7 shows a cross-sectional view of an exemplary embodiment of a pump assembly.

As seen in FIG. 7, motor 741 includes shaft 742. The shaft 742 includes a through-passage 784. The through-passage 784 has a port 786 which is disposed in the fluid chamber 772 such that the through-passage 784 is in fluid communication with the fluid chamber 772. The other end of through-passage 784 is in fluid communication with a port of the pump 710 via a channel 782. Those skilled in the art will understand that through-passage 784 and channel 782 are similar in configuration and function to through-passage 184 and channel 192 discussed above. Accordingly, for brevity, detailed description of through-passage 784 and its characteristics and function within pump 710 are omitted.

The pump 710 also includes a motor 761 that includes shaft 762. The shaft 762 includes a through-passage 794. The through-passage 794 has a port 796 which is disposed in the fluid chamber 872 such that the through-passage 794 is in fluid communication with the fluid chamber 872. The other end of through-passage 794 is in fluid communication with a port of the pump 710 via a channel 792. Those skilled in the art will understand that through-passage 794 and channel 792 are similar to through-passage 184 and channel 192 discussed above. Accordingly, for brevity, detailed description of through-passage 794 and its characteristics and function within pump 710 are omitted.

The channels 782 and 792 can each be connected to the same port of the pump or to different ports. Connection to the same port can be beneficial in certain circumstances. For example, if one large storage device is impractical for any reason, it might be possible to split the storage capacity between two smaller storage devices that are mounted on opposite sides of the pump as illustrated in FIG. 7. Alternatively, connecting each storage device 770 and 870 to different ports of the pump 710 can also be beneficial in certain circumstances. For example, a dedicated storage device for each port can be beneficial in circumstances where the pump is bi-directional and in situations where the inlet of the pump and the outlet of the pump experience pressure spikes that need to be smoothened or some other flow or pressure disturbance that can be mitigated or eliminated with a storage device. Of course, each of the channels 782 and 792 can be connected to both ports of the pump 710 such that each of the storage devices 770 and 870 can be configured to communicate with a desired port using appropriate valves (not shown). In this case, the valves would need to be appropriately operated to prevent adverse pump operation.

In the exemplary embodiment shown in FIG. 7, the storage devices 770, 870 are fixedly mounted to the casing of the pump 710. However, in other embodiments, one or both of the storage devices 770, 870 may be disposed space apart from the pump 710. In this case, the storage device or storage devices can be in fluid communication with the pump 710 via a connecting medium, for example hoses, tubes, pipes, or other similar devices.

In addition, the exemplary embodiments of the pump assembly of the present disclosure are not limited to the above exemplary embodiments of dual fluid driver (drive-drive) configurations. The flow-through shaft having the through-passage configuration can be used in other dual fluid driver pump configurations. For example, other configurations of a drive-drive system are discussed below in the context of exemplary embodiments of a pump assembly that do not have a flow-through shaft. However, based on the above disclosure, those skilled in the art would understand that the drive-drive configurations illustrated in FIGS. 11-11E can also include a flow through shaft if desired. In addition, the inventive flow-through shaft configuration is not limited to drive-drive configurations and can be used in pumps having a driver-driven configuration.

Figure 8:
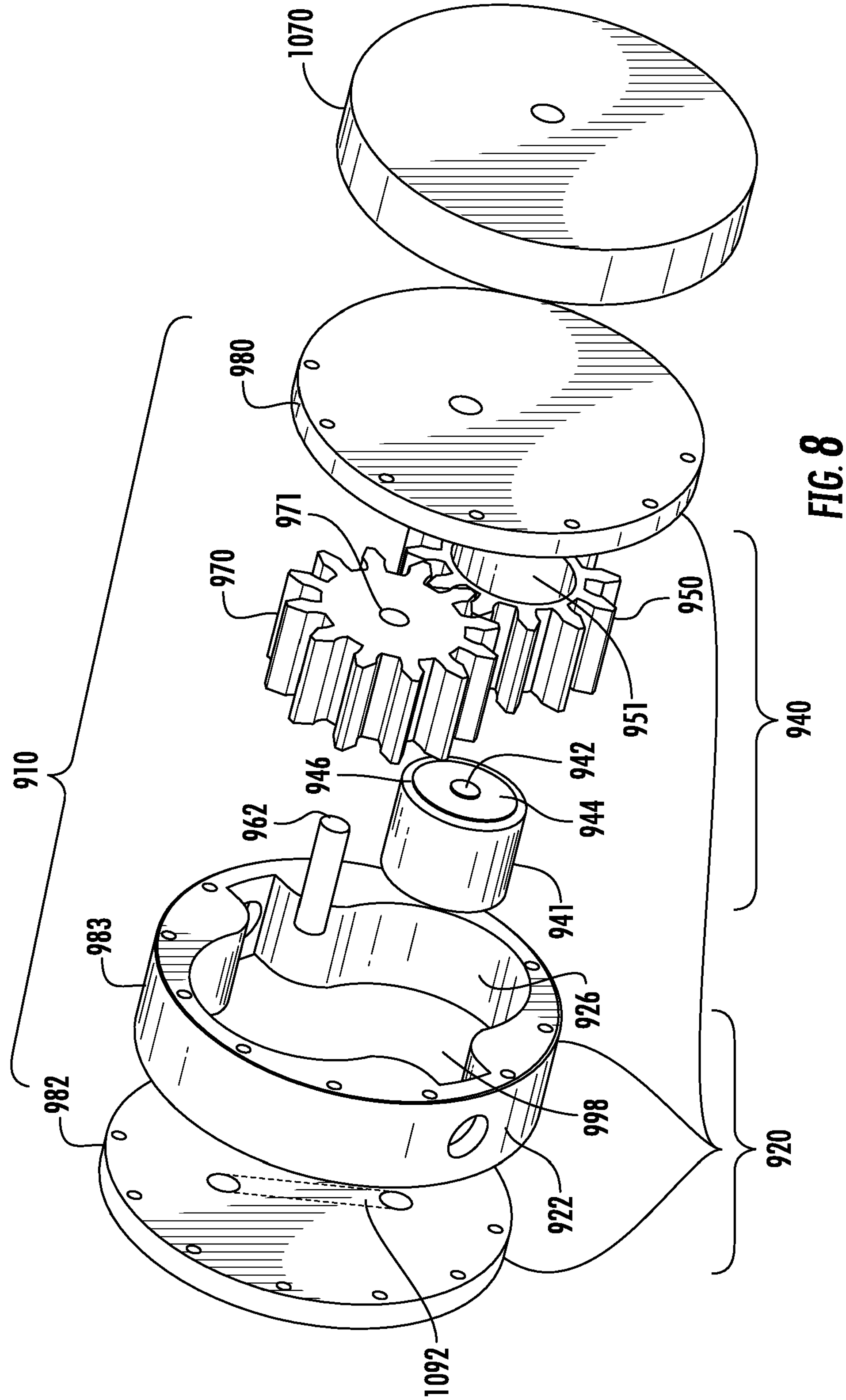
FIG. 8 shows an exploded view of an exemplary embodiment of a pump assembly having an external gear pump and storage device.

For example, FIG. 8 shows an exploded view of an exemplary embodiment of a pump assembly with a pump 910 and a storage device 1070. Unlike the exemplary embodiments discussed above, pump 910 includes one fluid driver, i.e., fluid driver 940. The fluid driver 940 includes motor 941 (prime mover) and a gear displacement assembly that incudes gears 950, 970 (fluid displacement members).

In this embodiment, pump motor 941 is disposed inside the pump gear 950. As seen in FIG. 8, the pump 910 represents a positive-displacement (or fixed displacement) gear pump. The pump 910 has a casing 920 that includes end plates 980, 982 and a pump body 983. These two plates 980, 982 and the pump body 983 can be connected by a plurality of through bolts and nuts (not shown) and the inner surface 926 defines an inner volume 998. To prevent leakage, O-rings or other similar devices can be disposed between the end plates 980, 982 and the pump body 983. The casing 920 has a port 922 and a port 924 (see also FIG. 9), which are in fluid communication with the inner volume 998. During operation and based on the direction of flow, one of the ports 922, 924 is the pump inlet port and the other is the pump outlet port. In an exemplary embodiment, the ports 922, 924 of the casing are round through-holes on opposing side walls of the casing. However, the shape is not limiting and the through-holes can have other shapes. In addition, one or both of the ports 922, 924 can be located on either the top or bottom of the casing. Of course, the ports 922, 924 must be located such that one port is on the inlet side of the pump and one port is on the outlet side of the pump.

As seen in FIG. 8, a pair of gears 950, 970 are disposed in the internal volume 998. Each of the gears 950, 970 has a plurality of gear teeth 952, 972 extending radially outward from the respective gear bodies. The gear teeth 952, 972, when rotated by, e.g., motor 941, transfer fluid from the inlet to the outlet, i.e., motor 941 rotates gear 950 which then rotates gear 970 (driver-driven configuration). In some embodiments, the pump 910 is bi-directional. Thus, either port 922, 924 can be the inlet port, depending on the direction of rotation of gears 950, 970, and the other port will be the outlet port. The gear 950 has a cylindrical opening 951 along an axial centerline of the gear body. The cylindrical opening 951 can extend either partially through or the entire length of the gear body. The cylindrical opening 951 is sized to accept the motor 941, which includes a shaft 942, a stator 944, and a rotor 946.

Figure 9:
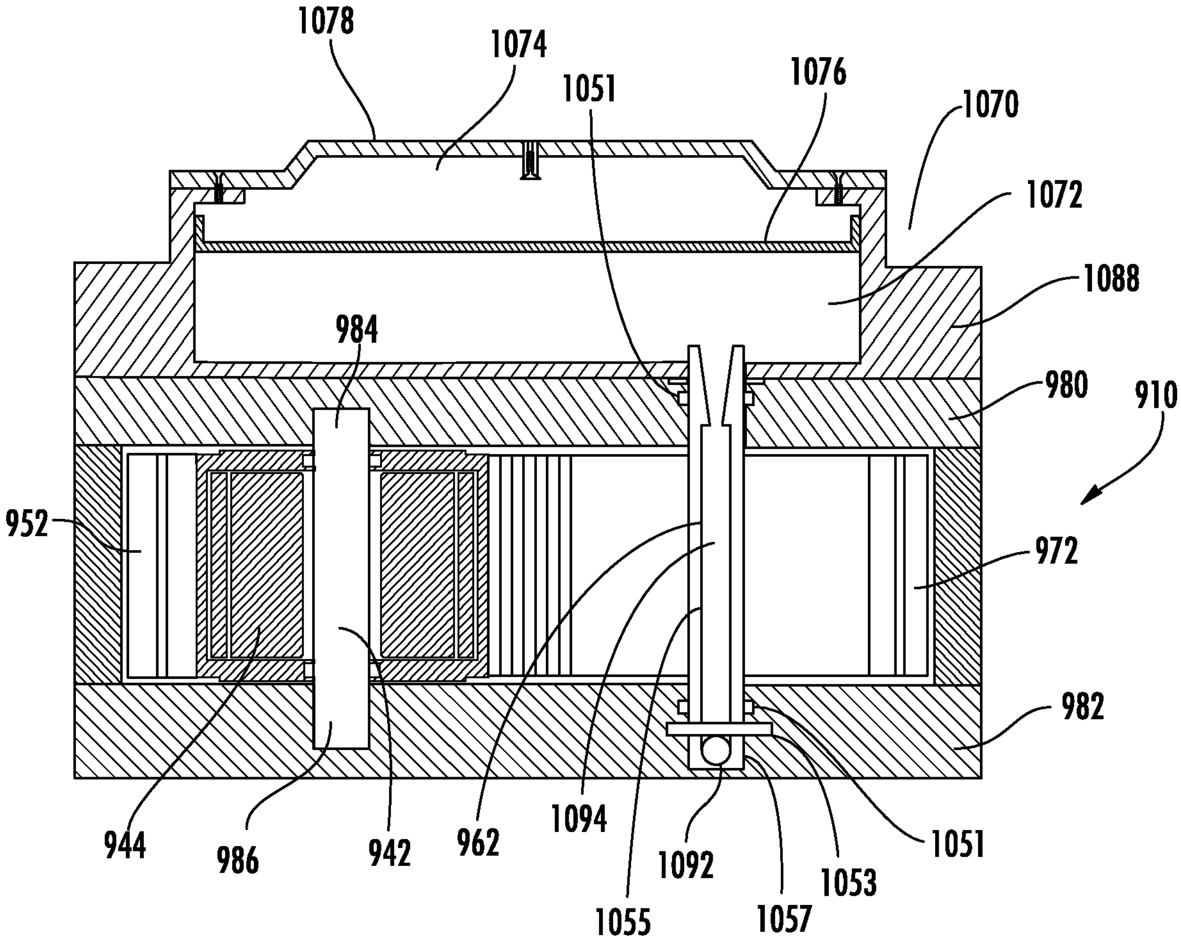
FIG. 9 shows a side cross-sectional view of the exemplary embodiment of FIG. 8.

FIG. 9 shows a side cross-sectional view of the external gear pump 910 and storage device 1070 of FIG. 8. As seen in FIGS. 8 and 9, fluid driver 940 is disposed in the casing 920. The shafts 942, 962 of the fluid driver 940 are disposed between the port 922 and the port 924 of the casing 920 and are supported by the end plate 980 at one end 984 and the end plate 982 at the other end 986. The shaft 942 supports the motor 941 and gear 950 when assembled. The shaft 962 supports gear 790 when assembled. The means to support the shafts 942, 962 and thus the fluid drivers 940, 960 are not limited to the illustrated configuration and other configurations to support the shaft can be used. For example, the either or both of shafts 942, 962 can be supported by blocks that are attached to the casing 920 rather than directly by casing 920. The shaft 942 is disposed in parallel with the shaft 962 and the two shafts are separated by an appropriate distance so that the gear teeth 952, 972 of the respective gears 950, 970 mesh with each other when rotated.

Figure 10:
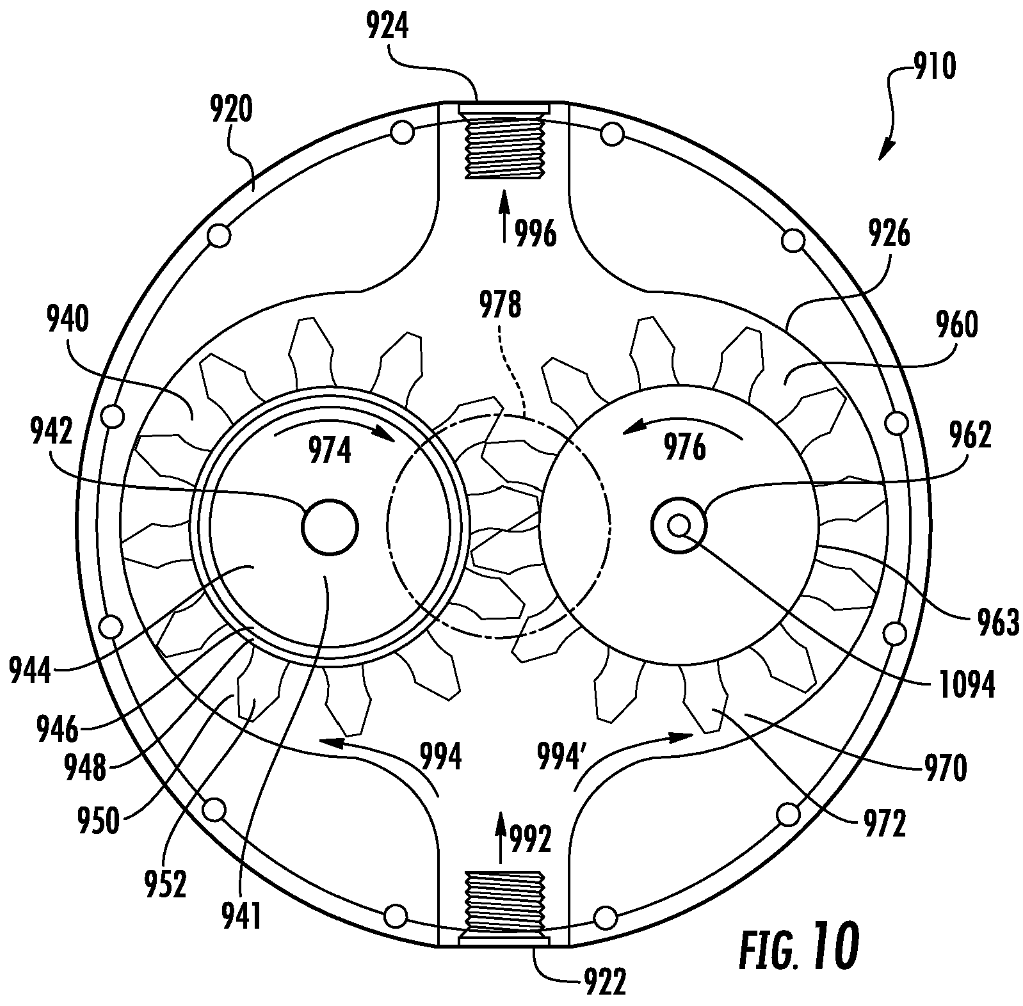
FIG. 10 illustrates an exemplary flow path of the external gear pump of FIG. 8.

As illustrated in FIGS. 8-10, the stator 944 of motor 941 is disposed radially between the shaft 942 and the rotor 946. The stator 944 is fixedly connected to the shaft 942, which is fixedly connected to the casing 920. The rotor 946 is disposed radially outward of the stator 944 and surrounds the stator 944. Thus, the motor 941 in this embodiment is of an outer-rotor motor arrangement (or an external-rotor motor arrangement). In an exemplary embodiment, the electric motor 941 is a multi-directional motor. Further, in an exemplary embodiment, the motor 941 is a variable-speed and/or a variable-torque motor in which the speed/torque of the rotor and thus that of the attached gear can be varied to create various volume flows and pump pressures, as desired.

As discussed above, the gear body 950 can include cylindrical opening 951, which receives motor 941. In an exemplary embodiment, the fluid driver 940 can include outer support member 948 which aids in coupling the motor 941 to the gear 950 and in supporting the gear 950 on motor 941. The support member 948 can be, for example, a sleeve that is initially attached to either an outer casing of the motor 941 or an inner surface of the cylindrical opening 951. The sleeves can be attached by using an interference fit, a press fit, an adhesive, screws, bolts, a welding or soldering method, or other means that can attach the support members to the cylindrical openings. Similarly, the final coupling between the motor 941 and the gear 950 using the support member 948 can be by using an interference fit, a press fit, screws, bolts, adhesive, a welding or soldering method, or other means to attach the motors to the support members. The sleeve can be made to different thicknesses as desired to, e.g., facilitate the attachment of motors with different physical sizes to the gear 950 or vice versa. In addition, if the motor casing and the gear are made of materials that are not compatible, e.g., chemically or otherwise, the sleeve can be made of materials that are compatible with both the gear composition and the motor casing composition. In some embodiments, the support member 948 can be configured as a sacrificial piece. That is, support member 948 is configured to be the first to fail, e.g., due to excessive stresses, temperatures, or other causes of failure, in comparison to the gear 950 and motor 941. This allows for a more economic repair of the pump 910 in the event of failure. In some embodiments, the outer support member 948 is not a separate piece but an integral part of the casing for the motor 941 or part of the inner surface of the cylindrical opening 951 of the gear 950. In other embodiments, the motor 941 can support the gear 950 (and the plurality of gear teeth 952) on its outer surface without the need for the outer support member 948. For example, the motor casing can be directly coupled to the inner surface of the cylindrical opening 951 of the gear 950 by using an interference fit, a press fit, screws, bolts, an adhesive, a welding or soldering method, or other means to attach the motor casing to the cylindrical opening. In some embodiments, the outer casing of the motor 941 can be, e.g., machined, cast, or other means to shape the outer casing to form a shape of the gear teeth 952. In still other embodiments, the plurality of gear teeth 952 can be integrated with the rotor 946 such that the gear/rotor combination forms one rotary body.

As shown in FIGS. 8 and 9, a storage device 1070 can be mounted to the pump 910, e.g., on the end plate 980. The storage device 1070 can store fluid to be pumped by the pump 910 and supply fluid needed to perform a commanded operation. In some embodiments, the storage device 1070 in the pump 910 is a pressurized vessel that stores the fluid for the system. In such embodiments, the storage device 1070 is pressurized to a specified pressure that is appropriate for the system. As shown in FIG. 9, the storage device 1070 includes a vessel housing 1088, a fluid chamber 1072, a gas chamber 1074, a separating element (or piston) 1076, and a cover 1078. The configuration and function of storage device 1070 is similar to that of storage device 170 discussed above. Accordingly, for brevity, a detailed description of the operation of the storage device 1070 is omitted except as necessary to describe the present exemplary embodiment.

In the embodiment of FIGS. 8 and 9, the shaft 962 is a flow-through type shaft having a through-passage that runs axially through the body of the shaft. One end of shaft 962 connects with an opening in the end plate 982 of a channel that connects to one of the port 922, 924. For example, FIG. 8 illustrates a channel 1092 (dotted line) that extends through the end plate 982. One opening of channel 1092 accepts one end of the flow-through shaft 962 while the other end of channel 1092 opens to port 922 of the pump 910. The other end of the flow-through shaft 962 extends into the fluid chamber 1072 of storage device 1070 (see FIG. 8) via an opening in end plate 980. As shown in FIG. 9, the gear 970 is fixedly mounted to shaft 962 such that the gear 970 and shaft 962 rotate when driven by gear 950. The flow-through shaft 962 is similar in configuration to shaft 662' discussed above with respect to a rotating shaft configuration. The shaft 962 can be supported by bearings 1051 on both ends. The shaft 962 can have a rotary portion 1055 that rotates with gear 970 and a stationary portion 1057 that is fixed to the pump casing. A coupling 1053 can be provided between the rotary and stationary portions 1055, 1057 to allow fluid to travel between the rotary and stationary portions 1055, 1057 through the coupling 1053 while the pump 910 operates. In some embodiments, the coupling 1053 can include one or more seals to prevent leakage. Of course, the stationary portion 1057 can be part of the pump casing rather than a part of the flow-through shaft.

The shaft 962 includes a through-passage 1094. The through-passage 1094 permits fluid communication between fluid chamber 1072 and a port of the pump 910 via a channel 1092. Those skilled in the art will recognize that through-passage 1094 and channel 1092 perform similar functions as through-passage 194 and channel 192 discussed above with respect to pump 10. Accordingly, for brevity, a detailed description of through-passage 1094 and channel 1092 and their function within pump 910 are omitted.

In the above discussed exemplary embodiments, fluid driver 940, including electric motor 941 and gears 950, 970, are integrated into a single pump casing 920. Thus, similar to the dual fluid-driver exemplary embodiments, the configuration of the external gear pump 910 and storage device 970 of the present disclosure enables a compact arrangement that provides various advantages. First, the enclosed configuration means that there is less likelihood of contamination from outside the pump, e.g., through clearances in the shaft seals as in conventional pumps or from remotely disposed storage devices. Also, the space or footprint occupied by the gear pump and storage device is significantly reduced by integrating necessary components into an integrated fluid delivery system, when compared to conventional gear pump and storage device configurations. In addition, the total weight of the exemplary embodiments of the fluid delivery system is reduced by removing unnecessary parts such as a shaft that connects a motor to a pump, separate mountings for a motor/gear driver, and external hoses and pipes to connect the storage device. Further, since the fluid delivery system of the present disclosure has a compact and modular arrangement, it can be easily installed, even at locations where conventional gear pumps could not be installed, and can be easily replaced. Detailed description of the driver-driven pump operation is provided next.

FIG. 10 shows a top cross-sectional view of the external gear pump 910 of FIG. 8. FIG. 10 illustrates an exemplary fluid flow path of an exemplary embodiment of the external gear pump 910. The ports 922, 924, and a meshing area 978 between the plurality of first gear teeth 952 and the plurality of second gear teeth 972 are substantially aligned along a single straight path. However, the alignment of the ports are not limited to this exemplary embodiment and other alignments are permissible. For explanatory purpose, the gear 950 is rotatably driven clockwise 974 by motor 941 and the gear 970 is rotatably driven counter-clockwise 976 by the motor 961. With this rotational configuration, port 922 is the inlet side of the gear pump 910 and port 924 is the outlet side of the gear pump 910. The gear 950 and the gear 970 are disposed in the casing 920 such that the gear 950 engages (or meshes) with the gear 970 when the rotor 946 is rotatably driven. More specifically, the plurality of gear teeth 952 mesh with the plurality of gear teeth 972 in a meshing area 978 such that the torque (or power) generated by the motor 941 is transmitted to the gear 950, which then drives gear 970 via gear meshing to carry the fluid from the port 922 to the port 924 of the pump 910.

As seen in FIG. 10, the fluid to be pumped is drawn into the casing 920 at port 922 as shown by an arrow 992 and exits the pump 910 via port 924 as shown by arrow 996. The pumping of the fluid is accomplished by the gear teeth 952, 972. As the gear teeth 952, 972 rotate, the gear teeth rotating out of the meshing area 978 form expanding inter-tooth volumes between adjacent teeth on each gear. As these inter-tooth volumes expand, the spaces between adjacent teeth on each gear are filled with fluid from the inlet port, which is port 922 in this exemplary embodiment. The fluid is then forced to move with each gear along the interior wall 990 of the casing 920 as shown by arrows 994 and 994'. That is, the teeth 952 of gear 950 force the fluid to flow along the path 994 and the teeth 972 of gear 970 force the fluid to flow along the path 994'. Very small clearances between the tips of the gear teeth 952, 972 on each gear and the corresponding interior wall 990 of the casing 920 keep the fluid in the inter-tooth volumes trapped, which prevents the fluid from leaking back towards the inlet port. As the gear teeth 952, 972 rotate around and back into the meshing area 978, shrinking inter-tooth volumes form between adjacent teeth on each gear because a corresponding tooth of the other gear enters the space between adjacent teeth. The shrinking inter-tooth volumes force the fluid to exit the space between the adjacent teeth and flow out of the pump 910 through port 924 as shown by arrow 996. In some embodiments, the motor 941 is bi-directional and the rotation of motor 941 can be reversed to reverse the direction fluid flow through the pump 910, i.e., the fluid flows from the port 924 to the port 922.

To prevent backflow, i.e., fluid leakage from the outlet side to the inlet side through the meshing area 978, the meshing between a tooth of the gear 950 and a tooth of the gear 970 in the meshing area 978 provides sealing against the backflow. Thus, along with driving gear 970, the meshing force from gear 950 will seal (or substantially seal) the backflow path, i.e., as understood by those skilled in the art, the fluid leakage from the outlet port side to the inlet port side through the meshing area 978 is substantially eliminated.

Figure 10A:
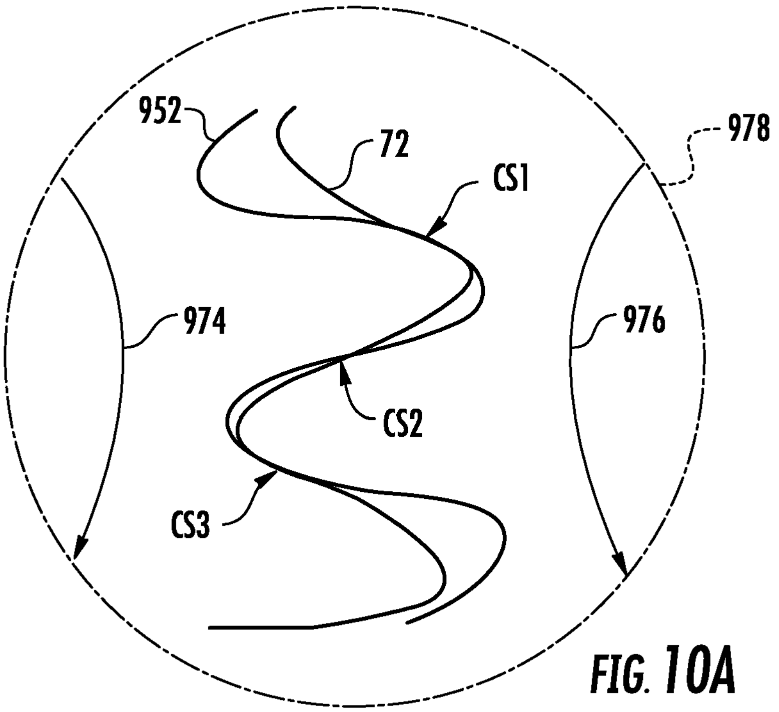
FIG. 10A shows a cross-sectional view illustrating gear meshing between two gears in an overlapping area of FIG. 10.

FIG. 10A schematically shows gear meshing between two gears 950, 970 in the gear meshing area 978 in an exemplary embodiment. As discussed above in reference to FIG. 9, it is assumed that the rotor 946 is rotatably driven clockwise 974 by the rotor 946. The plurality of first gear teeth 952 are rotatably driven clockwise 974 along with the rotor 946 and the plurality of second gear teeth 972 are rotatably driven counter-clockwise 976 via gear meshing. In particular, FIG. 10A exemplifies that the gear tooth profile of the first and second gears 950, 970 is configured such that the plurality of first gear teeth 952 are in surface contact with the plurality of second gear teeth 972 at three different contact surfaces CS1, CS2, CS3 at a point in time. However, the gear tooth profile in the present disclosure is not limited to the profile shown in FIG. 10A. For example, the gear tooth profile can be configured such that the surface contact occurs at two different contact surfaces instead of three contact surfaces, or the gear tooth profile can be configured such that a point, line or an area of contact is provided. In some exemplary embodiments, the gear teeth profile is such that a small clearance (or gap) is provided between the gear teeth 952, 972 to release pressurized fluid, i.e., only one face of a given gear tooth makes contact with the other tooth at any given time. Such a configuration retains the sealing effect while ensuring that excessive pressure is not built up. Thus, the gear tooth profile of the first and second gears 950, 970 can vary without departing from the scope of the present disclosure.

In addition, depending on the type of fluid displacement member, the meshing can be between any surface of at least one projection (e.g., bump, extension, bulge, protrusion, other similar structure or combinations thereof) on the first fluid displacement member and any surface of at least one projection(e.g., bump, extension, bulge, protrusion, other similar structure or combinations thereof) or an indent(e.g., cavity, depression, void or similar structure) on the second fluid displacement member. In some embodiments, at least one of the fluid displacement members can be made of or include a resilient material, e.g., rubber, an elastomeric material, or another resilient material, so that the meshing force provides a more positive sealing area.

In the embodiment of FIG. 8, the shaft 942 of the pump 910 does not include a through-passage. However, instead of or in addition to through-passage 1094 of shaft 962, the shaft 942 of pump 910 can have a through-passage therein. In this case, the through-passage configuration of the shaft 942 can be similar to that of through-passage 184 of shaft 42 of pump 10 discussed above. In addition, in the above exemplary driver-driven configurations, a single storage device is illustrated in FIGS. 8 and 9. However, those skilled in the art will understand that, similar to the drive-drive configurations discussed above, the driver-driven configurations can also include dual storage devices. Because the configuration and function of the shafts on the dual storage driver-driven embodiments will be similar to the configuration and function of the shafts of the drive-drive embodiments discussed above, for brevity, a detailed discussion of the dual storage driver-driven embodiment is omitted.

Further, in the embodiments discussed above, the prime mover is disposed inside the fluid displacement member, i.e., motor 941 is disposed inside the cylinder opening 951 of gear 950. However, like the dual fluid driver (drive-drive) configurations discussed above, advantageous features of the inventive pump configuration are not limited to a configuration in which the prime mover is disposed within the body of the fluid displacement member. Other configurations also fall within the scope of the present disclosure. For example, in the context of an exemplary embodiment that does not have a flow-through shaft, FIG. 12A discloses a driver-driven pump configuration in which the motor is disposed adjacent to the gear but still inside the pump casing. However, those skilled in the art would understand that, like pump 610' discussed above, the shaft of the motor 941 and gear 950 can be configured as a flow-through shaft. Of course, the prime mover can also be located outside the pump casing and one or both gears can include a flow-through shaft such as the through-passage embodiments discussed above.

In the embodiments discussed above, the storage devices were described as pressurized vessels with a separating element (or piston) inside. However, in other embodiments, a different type of pressurized vessel may be used. For example, an accumulator, e.g. a hydraulic accumulator, may be used as a pressurized vessel. Accumulators are common components in fluid systems such as hydraulic operating and control systems. The accumulators store potential energy in the form of a compressed gas or spring, or by a raised weight to be used to exert a force against a relatively incompressible fluid. It is often used to store fluid under high pressure or to absorb excessive pressure increase. Thus, when a fluid system, e.g., a hydraulic system, demands a supply of fluid exceeding the supply capacity of a pump system, typically within a relatively short responsive time, pressurized fluid can be promptly provided according to a command of the system. In this way, operating pressure and/or flow of the fluid in the system do not drop below a required minimum value. However, storage devices other than an accumulator may be used as long as needed fluid can be provided from the storage device or storage devices to the pump and/or returned from the pump to the storage device or storage devices.

The accumulator may be a pressure accumulator. This type of accumulator may include a piston, diaphragm, bladder, or member. Typically, a contained volume of a suitable gas, a spring, or a weight is provided such that the pressure of hydraulic fluid in the accumulator increases as the quantity of hydraulic fluid stored in the accumulator increases. However, the type of accumulator in the present disclosure is not limited to the pressure accumulator. The type of accumulator can vary without departing from the scope of the present disclosure.

Figure 11:
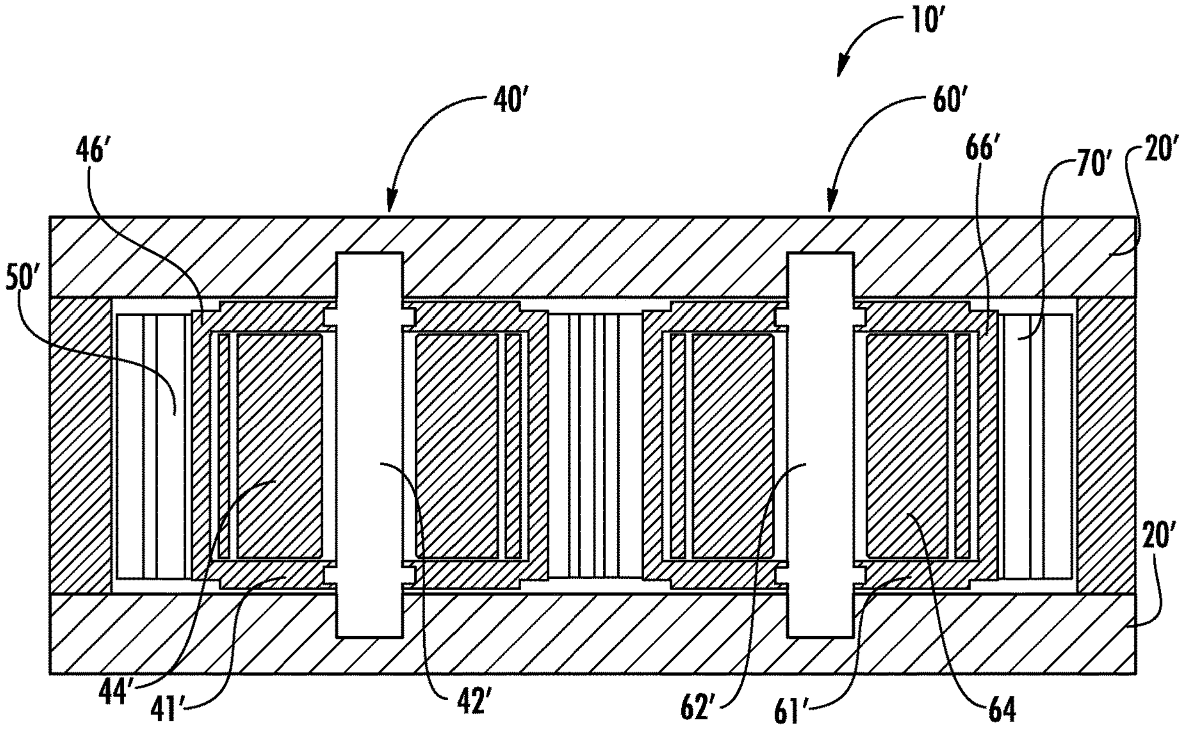
FIGS. 11 to 11E show cross-sectional views of exemplary embodiments of a pump with a drive-drive configuration.

In addition, exemplary embodiments of the present disclosure are not limited to pump assemblies having pumps with integrated storage devices and flow-through shafts. For example, the storage device can be separate from the pump assembly if desired (e.g., if a large amount of storage is required) or may even be eliminated depending on the configuration of the system. In such cases the pump will not have an attached storage device and/or a flow-through shaft. For example, FIG. 11 shows a side cross-sectional view of an exemplary embodiment of an external gear pump 10'. The pump 10' includes a casing 20', a fluid driver 40' with gear 50' and motor 41', and a fluid driver 60' with gear 70' and motor 61'. The motor 41' includes rotor 46', stator 44' and shaft 42' and the motor 61' includes rotor 66', stator 64' and shaft 62'. The embodiment of the pump 10' differs from pump 10 (FIGS. 2-3) in that because the storage device 170 is not integral to the pump assembly, neither shaft 42' of fluid drivers 40' nor shaft 62' of fluid driver 60' has a flow-through shaft configuration. In all other respects, the pump 10' is the same as pump 10. Thus, for brevity, the configuration and functions of pump 10' will not be further discussed.

As seen in FIGS. 2 and 11, the prime movers are disposed inside the respective fluid displacement members, i.e., motors 41, 41', 61, 61' are disposed inside the cylinder openings of the respective gears 50, 50', 70, 70'. However, advantageous features of the present disclosure are not limited to a configuration in which both prime movers are disposed within the bodies of the fluid displacement members. Both types of pumps (i.e., with and without flow-through shafts and integrated storage devices) can include other drive-drive configurations. For example 11A-11E show different drive-drive configurations. The pumps in these embodiments do not have flow-through shafts or integrated storage devices. However, the arrangement of the motors and gears will be similar for drive-drive configurations with flow-through shafts and thus, for brevity, will not be duplicated.

Figure 11A:
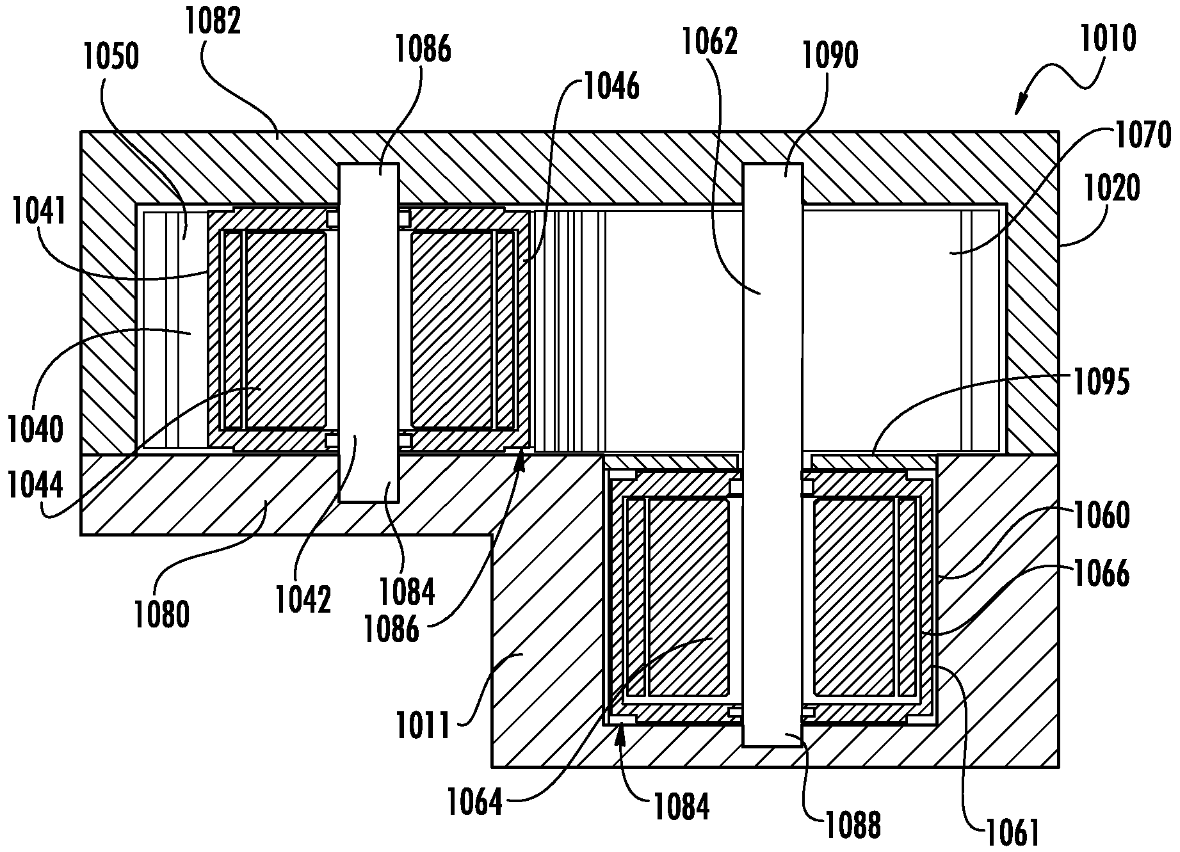

FIG. 11A shows a side cross-sectional view of another exemplary embodiment of an external gear pump 1010. The embodiment of the pump 1010 shown in FIG. 11A differs from pump 10 (FIG. 2) in that one of the two motors in this embodiment is external to the corresponding gear body but is still in the pump casing. In addition, like pump 10', the storage device 170 is not integral to the pump assembly and neither shaft 1042 of fluid drivers 1040 nor shaft 1062 of fluid driver 1060 has a flow-through shaft configuration. The pump 1010 includes a casing 1020, a fluid driver 1040, and a fluid driver 1060. The inner surface of the casing 1020 defines an internal volume that includes a motor cavity 1084 and a gear cavity 1086. The casing 1020 can include end plates 1080, 1082. These two plates 1080, 1082 can be connected by a plurality of bolts (not shown).

The fluid driver 1040 includes motor 1041 and a gear 1050. The motor 1041 is an outer-rotor motor design and is disposed in the body of gear 1050, which is disposed in the gear cavity 1086. The motor 1041 includes a rotor 1044 and a stator 1046. The gear 1050 includes a plurality of gear teeth 1052 extending radially outward from its gear body. It should be understood that those skilled in the art will recognize that fluid driver 1040 is similar to fluid driver 40 and that the configurations and functions of fluid driver 40, as discussed above, can be incorporated into fluid driver 1040. Accordingly, for brevity, fluid driver 1040 will not be discussed in detail except as necessary to describe this embodiment.

The fluid driver 1060 includes a motor 1061 and a gear 1070. The fluid driver 1060 is disposed next to fluid driver 1040 such that the respective gear teeth 1072, 1052 contact each other in a manner similar to the contact of gear teeth 52, 72 in contact area 78 discussed above with respect to pump 10. In this embodiment, motor 1061 is an inner-rotor motor design and is disposed in the motor cavity 1084. In this embodiment, the motor 1061 and the gear 1070 have a common shaft 1062. The rotor 1064 of motor 1061 is disposed radially between the shaft 1062 and the stator 1066. The stator 1066 is disposed radially outward of the rotor 1064 and surrounds the rotor 1064. The inner-rotor design means that the shaft 1062, which is connected to rotor 1064, rotates while the stator 1066 is fixedly connected to the casing 1020. In addition, gear 1070 is also connected to the shaft 1062. The shaft 1062 is supported by, for example, a bearing in the plate 1080 at one end 1088 and by a bearing in the plate 1082 at the other end 1090. In other embodiments, the shaft 1062 can be supported by bearing blocks that are fixedly connected to the casing 1020 rather than directly by bearings in the casing 1020. In addition, rather than a common shaft 1062, the motor 1061 and the gear 1070 can include their own shafts that are coupled together by known means.

As shown in FIG. 11A, the gear 1070 is disposed adjacent to the motor 1061 in the casing 1020. That is, unlike motor 1041, the motor 1061 is not disposed in the gear body of gear 1070. The gear 1070 is spaced apart from the motor 1061 in an axial direction on the shaft 1062. The rotor 1064 is fixedly connected to the shaft 1062 on one side 1088 of the shaft 1062, and the gear 1070 is fixedly connected to the shaft 1062 on the other side 1090 of the shaft 1062 such that torque generated by the motor 1061 is transmitted to the gear 1070 via the shaft 1062.

The motor 1061 is designed to fit into its cavity with sufficient tolerance between the motor casing and the pump casing 1020 so that fluid is prevented (or substantially prevented) from entering the cavity during operation. In addition, there is sufficient clearance between the motor casing and the gear 1070 for the gear 1070 to rotate freely but the clearance is such that the fluid can still be pumped efficiently. Thus, with respect to the fluid, in this embodiment, the motor casing is designed to perform the function of the appropriate portion of the pump casing walls of the embodiment of FIG. 2. In some embodiments, the outer diameter of the motor 1061 is less that the root diameter for the gear teeth 1072. Thus, in these embodiments, even the motor side of the gear teeth 1072 will be adjacent to a wall of the pump casing 1020 as they rotate. In some embodiments, a bearing 1095 can be inserted between the gear 1070 and the motor 1061. The bearing 1095, which can be, e.g., a washer-type bearing, decreases friction between the gear 1070 and the motor 1061 as the gear 1070 rotates. Depending on the fluid being pumped and the type of application, the bearing can be metallic, a non-metallic or a composite. Metallic material can include, but is not limited to, steel, stainless steel, anodized aluminum, aluminum, titanium, magnesium, brass, and their respective alloys. Non-metallic material can include, but is not limited to, ceramic, plastic, composite, carbon fiber, and nano-composite material. In addition, the bearing 1095 can be sized to fit the motor cavity 1084 opening to help seal the motor cavity 1084 from the gear cavity 1086, and the gears 1052, 1072 will be able to pump the fluid more efficiently. It should be understood that those skilled in the art will recognize that, in operation, the fluid driver 1040 and the fluid driver 1060 will operate in a manner similar to that disclosed above with respect to pump 10. Accordingly, for brevity, pump 1010 operating details will not be further discussed.

In the above exemplary embodiment, the gear 1070 is shown as being spaced apart from the motor 1061 along the axial direction of the shaft 1062. However, other configurations fall within the scope of the present disclosure. For example, the gear 1070 and motor 1061 can be completely separated from each other (e.g., without a common shaft), partially overlapping with each other, positioned side-by-side, on top of each other, or offset from each other. Thus, the present disclosure covers all of the above-discussed positional relationships and any other variations of a relatively proximate positional relationship between a gear and a motor inside the casing 1020. In addition, in some exemplary embodiments, motor 1061 can be an outer-rotor motor design that is appropriately configured to rotate the gear 1070.

Further, in the exemplary embodiment described above, the torque of the motor 1061 is transmitted to the gear 1070 via the shaft 1062. However, the means for transmitting torque (or power) from a motor to a gear is not limited to a shaft, e.g., the shaft 1062 in the above-described exemplary embodiment. Instead, any combination of power transmission devices, e.g., shafts, sub-shafts, belts, chains, couplings, gears, connection rods, cams, or other power transmission devices, can be used without departing from the spirit of the present disclosure.

Figure 11B:
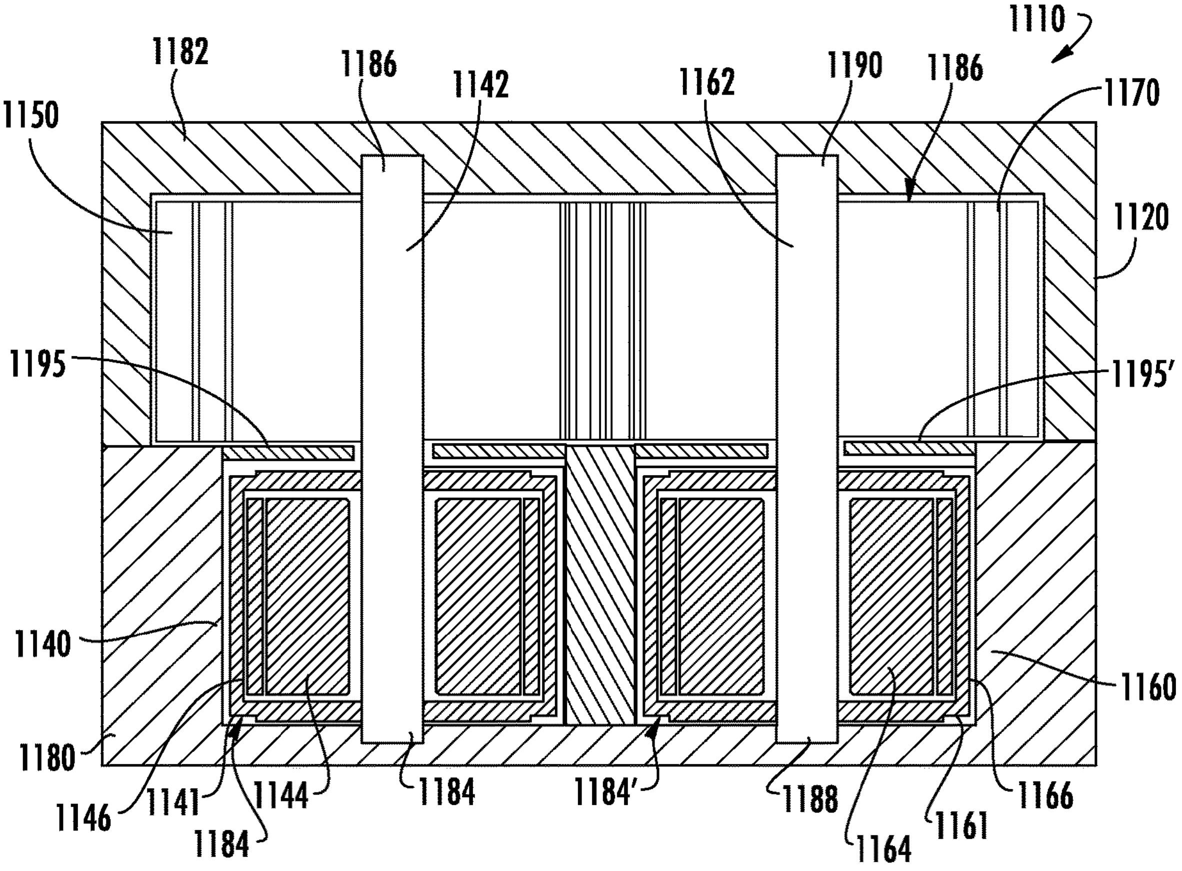

FIG. 11B shows a side cross-sectional view of another exemplary embodiment of an external gear pump 1110. The embodiment of the pump 1110 shown in FIG. 11B differs from pump 10 in that each of the two motors in this embodiment is external to the gear body but still disposed in the pump casing. In addition, like pump 10', the storage device 170 is not integral to the pump assembly and neither shaft 1142 of fluid drivers 1140 nor shaft 1162 of fluid driver 1160 has a flow-through shaft configuration. The pump 1110 includes a casing 1120, a fluid driver 1140, and a fluid driver 1160. The inner surface of the casing 1120 defines an internal volume that includes motor cavities 1184 and 1184' and gear cavity 1186. The casing 1120 can include end plates 1180, 1182. These two plates 1180, 1182 can be connected by a plurality of bolts (not shown).

The fluid drivers 1140, 1160 respectively include motors 1141, 1161 and gears 1150, 1170. The motors 1141, 1161 are of an inner-rotor design and are respectively disposed in motor cavities 1184, 1184'. The motor 1141 and gear 1150 of the fluid driver 1140 have a common shaft 1142 and the motor 1161 and gear 1170 of the fluid driver 1160 have a common shaft 1162. The motors 1141, 1161 respectively include rotors 1144, 1164 and stators 1146, 1166, and the gears 1150, 1170 respectively include a plurality of gear teeth 1152, 1172 extending radially outward from the respective gear bodies. The fluid driver 1140 is disposed next to fluid driver 1160 such that the respective gear teeth 1152, 1172 contact each other in a manner similar to the contact of gear teeth 52, 72 in contact area 78 discussed above with respect to pump 10. Bearings 1195 and 1195' can be respectively disposed between motors 1141, 1161 and gears 1150, 1170. The bearings 1195 and 1195' are similar in design and function to bearing 1095 discussed above. It should be understood that those skilled in the art will recognize that the fluid drivers 1140, 1160 are similar to fluid driver 1060 and that the configurations and functions of the fluid driver 1060, discussed above, can be incorporated into the fluid drivers 1140, 1160 within pump 1110. Thus, for brevity, fluid drivers 1140, 1160 will not be discussed in detail. Similarly, the operation of pump 1110 is similar to that of pump 10 and thus, for brevity, will not be further discussed. In addition, like fluid driver 1060, the means for transmitting torque (or power) from the motor to the gear is not limited to a shaft. Instead, any combination of power transmission devices, for example, shafts, sub-shafts, belts, chains, couplings, gears, connection rods, cams, or other power transmission devices can be used without departing from the spirit of the present disclosure. In addition, in some exemplary embodiments, motors 1141, 1161 can be outer-rotor motor designs that are appropriately configured to respectively rotate the gears 1150, 1170.

Figure 11C:
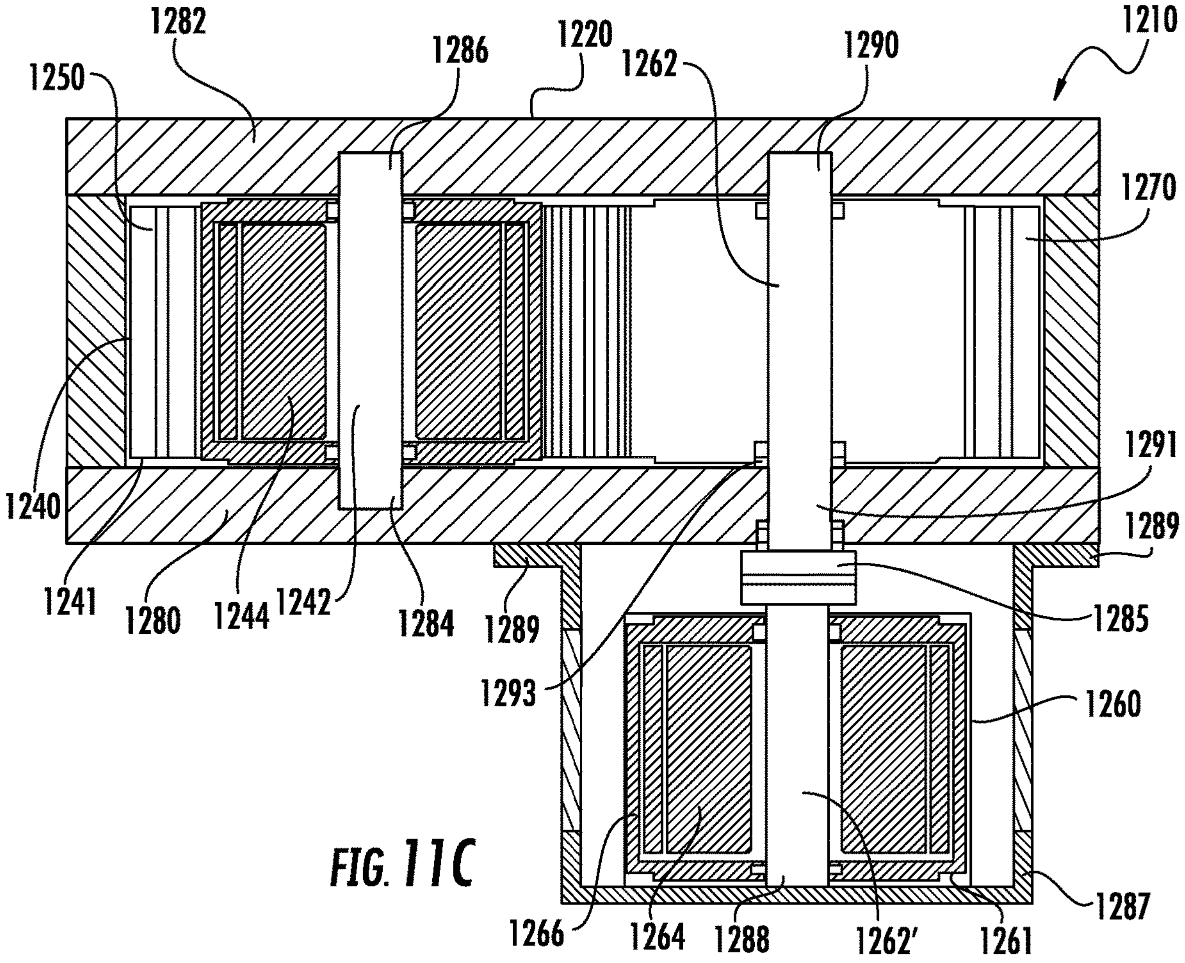

FIG. 11C shows a side cross-sectional view of another exemplary embodiment of an external gear pump 1210. The embodiment of the pump 1210 shown in FIG. 11C differs from pump 10 in that one of the two motors is disposed outside the pump casing. In addition, like pump 10', the storage device 170 is not integral to the pump assembly and neither shaft 1242 of fluid drivers 1240 nor shaft 1262 of fluid driver 1260 has a flow-through shaft configuration. The pump 1210 includes a casing 1220, a fluid driver 1240, and a fluid driver 1260. The inner surface of the casing 1220 defines an internal volume. The casing 1220 can include end plates 1280, 1282. These two plates 1280, 1282 can be connected by a plurality of bolts.

The fluid driver 1240 includes motor 1241 and a gear 1250. The motor 1241 is an outer-rotor motor design and is disposed in the body of gear 1250, which is disposed in the internal volume. The motor 1241 includes a rotor 1244 and a stator 1246. The gear 1250 includes a plurality of gear teeth 1252 extending radially outward from its gear body. It should be understood that those skilled in the art will recognize that fluid driver 1240 is similar to fluid driver 40 and that the configurations and functions of fluid driver 40, as discussed above, can be incorporated into fluid driver 1240. Accordingly, for brevity, fluid driver 1240 will not be discussed in detail except as necessary to describe this embodiment.

The fluid driver 1260 includes a motor 1261 and a gear 1270. The fluid driver 1260 is disposed next to fluid driver 1240 such that the respective gear teeth 1272, 1252 contact each other in a manner similar to the contact of gear teeth 52, 72 in contact area 78 discussed above with respect to pump 10. In this embodiment, motor 1261 is an inner-rotor motor design and, as seen in FIG. 6, the motor 1261 is disposed outside the casing 1220. The rotor 1264 of motor 1261 is disposed radially between the motor shaft 1262' and the stator 1266. The stator 1266 is disposed radially outward of the rotor 1264 and surrounds the rotor 1264. The inner-rotor design means that the shaft 1262', which is coupled to rotor 1264, rotates while the stator 1266 is fixedly connected to the pump casing 1220 either directly or indirectly via, e.g., motor housing 1287. The gear 1270 includes a shaft 1262 that can be supported by the plate 1282 at one end 1290 and the plate 1280 at the other end 1291. The gear shaft 1262, which extends outside casing 1220, can be coupled to motor shaft 1262' via, e.g., a coupling 1285 such as a shaft hub to form a shaft extending from point 1290 to point 1288. One or more seals 1293 can be disposed to provide necessary sealing of the fluid. Design of the shafts 1262, 1262' and the means to couple the motor 1261 to gear 1270 can be varied without departing from the spirit of the present invention.

As shown in FIG. 11C, the gear 1270 is disposed proximate the motor 1261. That is, unlike motor 1241, the motor 1261 is not disposed in the gear body of gear 1270. Instead, the gear 1270 is disposed in the casing 1220 while the motor 1261 is disposed proximate to the gear 1270 but outside the casing 1220. In the exemplary embodiment of FIG. 6, the gear 1270 is spaced apart from the motor 1261 in an axial direction along the shafts 1262 and 1262'. The rotor 1266 is fixedly connected to the shaft 1262', which is couple to shaft 1262 such that the torque generated by the motor 1261 is transmitted to the gear 1270 via the shaft 1262. The shafts 1262 and 1262' can be supported by bearings at one or more locations. It should be understood that those skilled in the art will recognize that the operation of pump 1210, including fluid drivers 1240, 1260, will be similar to that of pump 10 and thus, for brevity, will not be further discussed.

In the above embodiment gear 1270 is shown spaced apart from the motor 1261 along the axial direction of the shafts 1262 and 1262' (i.e., spaced apart but axially aligned). However, other configurations can fall within the scope of the present disclosure. For example, the gear 1270 and motor 1261 can be positioned side-by-side, on top of each other, or offset from each other. Thus, the present disclosure covers all of the above-discussed positional relationships and any other variations of a relatively proximate positional relationship between a gear and a motor outside the casing 1220. In addition, in some exemplary embodiments, motor 1261 can be an outer-rotor motor design that is appropriately configured to rotate the gear 1270.

Further, in the exemplary embodiment described above, the torque of the motor 1261 is transmitted to the gear 1270 via the shafts 1262, 1262'. However, the means for transmitting torque (or power) from a motor to a gear is not limited to shafts. Instead, any combination of power transmission devices, e.g., shafts, sub-shafts, belts, chains, couplings, gears, connection rods, cams, or other power transmission devices, can be used without departing from the spirit of the present disclosure. In addition, the motor housing 1287 can include a vibration isolator (not shown) between the casing 1220 and the motor housing 1287. Further, the motor housing 1287 mounting is not limited to that illustrated in FIG. 11C and the motor housing can be mounted at any appropriate location on the casing 1220 or can even be separate from the casing 1220.

Figure 11D:
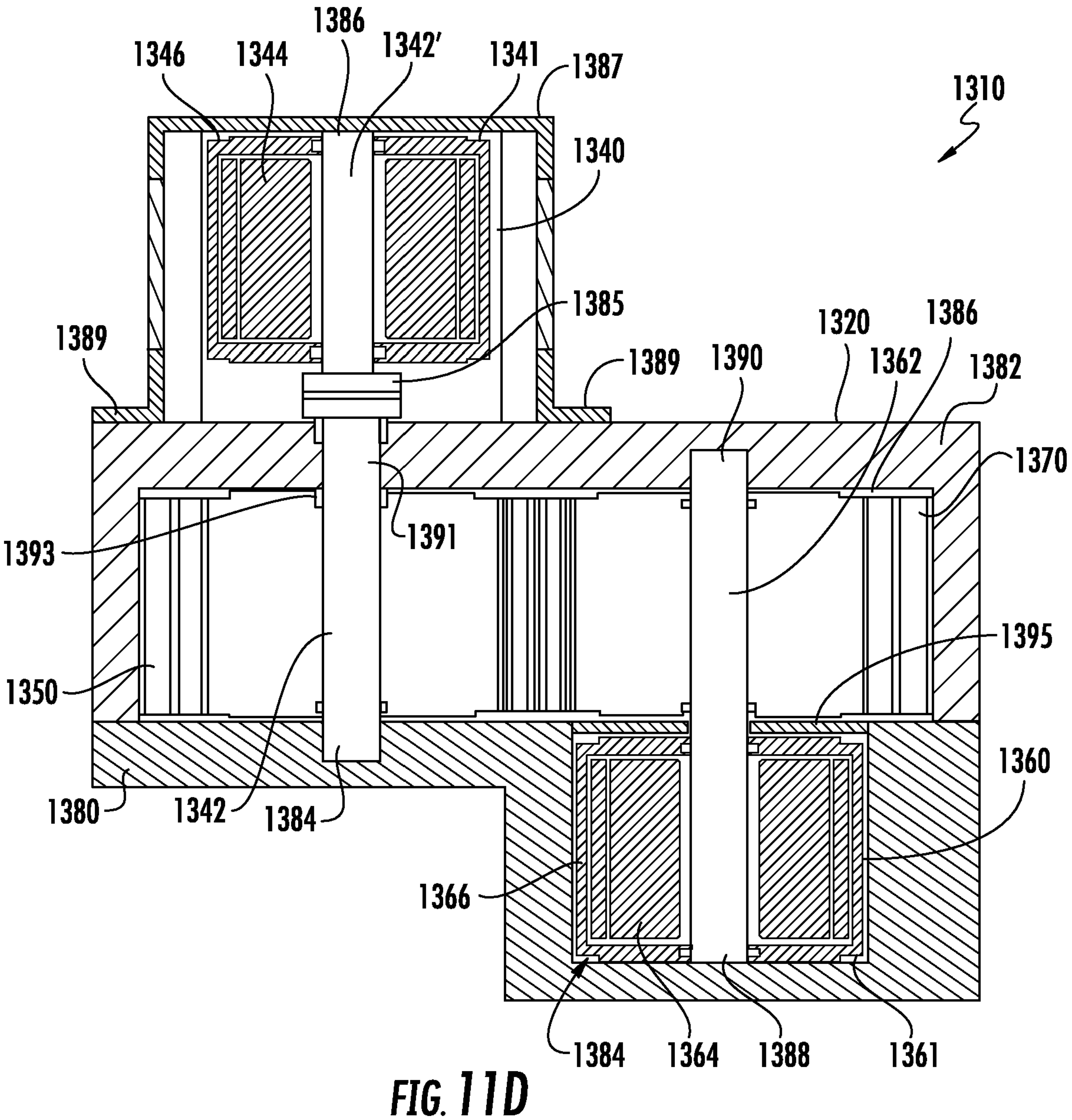

FIG. 11D shows a side cross-sectional view of another exemplary embodiment of an external gear pump 1310. The embodiment of the pump 1310 shown in FIG. 11D differs from pump 10 in that the two motors are disposed external to the gear body with one motor still being disposed inside the pump casing while the other motor is disposed outside the pump casing. In addition, like pump 10', the storage device 170 is not integral to the pump assembly and neither shaft 1342 of fluid drivers 1340 nor shaft 1362 of fluid driver 1360 has a flow-through shaft configuration. The pump 1310 includes a casing 1320, a fluid driver 1340, and a fluid driver 1360. The inner surface of the casing 1320 defines an internal volume that includes a motor cavity 1384 and a gear cavity 1386. The casing 1320 can include end plates 1380, 1382. These two plates 1380, 1382 can be connected to a body of the casing 1320 by a plurality of bolts.

The fluid driver 1340 includes a motor 1341 and a gear 1350. In this embodiment, motor 1341 is an inner-rotor motor design and, as seen in FIG. 11D, the motor 1341 is disposed outside the casing 1320. The rotor 1344 of motor 1341 is disposed radially between the motor shaft 1342' and the stator 1346. The stator 1346 is disposed radially outward of the rotor 1344 and surrounds the rotor 1344. The inner rotor design means that the shaft 1342', which is connected to rotor 1344, rotates while the stator 1346 is fixedly connected to the pump casing 1320 either directly or indirectly via, e.g., motor housing 1387. The gear 1350 includes a shaft 1342 that can be supported by the lower plate 1382 at one end 1390 and the upper plate 1380 at the other end 1391. The gear shaft 1342, which extends outside casing 1320, can be coupled to motor shaft 1342' via, e.g., a coupling 1385 such as a shaft hub to form a shaft extending from point 1384 to point 1386. One or more seals 1393 can be disposed to provide necessary sealing of the fluid. Design of the shafts 1342, 1342' and the means to couple the motor 1341 to gear 1350 can be varied without departing from the spirit of the present invention. It should be understood that those skilled in the art will recognize that fluid driver 1340 is similar to fluid driver 1260 and that the configurations and functions of fluid driver 1260, as discussed above, can be incorporated into fluid driver 1340. Accordingly, for brevity, fluid driver 1340 will not be discussed in detail except as necessary to describe this embodiment.

In addition, the gear 1350 and motor 1341 can be positioned side-by-side, on top of each other, or offset from each other. Thus, the present disclosure covers all of the above-discussed positional relationships and any other variations of a relatively proximate positional relationship between a gear and a motor outside the casing 1320. Also, in some exemplary embodiments, motor 1341 can be an outer-rotor motor design that are appropriately configured to rotate the gear 1350. Further, the means for transmitting torque (or power) from a motor to a gear is not limited to shafts. Instead, any combination of power transmission devices, e.g., shafts, sub-shafts, belts, chains, couplings, gears, connection rods, cams, or other power transmission devices, can be used without departing from the spirit of the present disclosure. In addition, the motor housing 1387 can include a vibration isolator (not shown) between the casing 1320 and the motor housing 1387. Further, the motor housing 1387 mounting is not limited to that illustrated in FIG. 11D and the motor housing can be mounted at any appropriate location on the casing 1320 or can even be separate from the casing 1320.

The fluid driver 1360 includes a motor 1361 and a gear 1370. The fluid driver 1360 is disposed next to fluid driver 1340 such that the respective gear teeth 1372, 1352 contact each other in a manner similar to the contact of gear teeth 52, 72 in contact area 128 discussed above with respect to pump 10. In this embodiment, motor 1361 is an inner-rotor motor design and is disposed in the motor cavity 1384. In this embodiment, the motor 1361 and the gear 1370 have a common shaft 1362. The rotor 1364 of motor 1361 is disposed radially between the shaft 1362 and the stator 1366. The stator 1366 is disposed radially outward of the rotor 1364 and surrounds the rotor 1364. Bearing 1395 can be disposed between motor 1361 and gear 1370. The bearing 1395 is similar in design and function to bearing 1095 discussed above. The inner-rotor design means that the shaft 1362, which is connected to rotor 1364, rotates while the stator 1366 is fixedly connected to the casing 1320. In addition, gear 1370 is also connected to the shaft 1362. It should be understood that those skilled in the art will recognize that the fluid driver 1360 is similar to fluid driver 1060 and that the configurations and functions of fluid driver 1060, as discussed above, can be incorporated into fluid driver 1360. Accordingly, for brevity, fluid driver 1360 will not be discussed in detail except as necessary to describe this embodiment. Also, in some exemplary embodiments, motor 1361 can be an outer-rotor motor design that is appropriately configured to rotate the gear 1370. In addition, it should be understood that those skilled in the art will recognize that the operation of pump 1310, including fluid drivers 1340, 1360, will be similar to that of pump 10 and thus, for brevity, will not be further discussed. In addition, the means for transmitting torque (or power) from the motor to the gear is not limited to a shaft. Instead, any combination of power transmission devices, for example, shafts, sub-shafts, belts, chains, couplings, gears, connection rods, cams, or other power transmission devices can be used without departing from the spirit of the present disclosure.

Figure 11E:
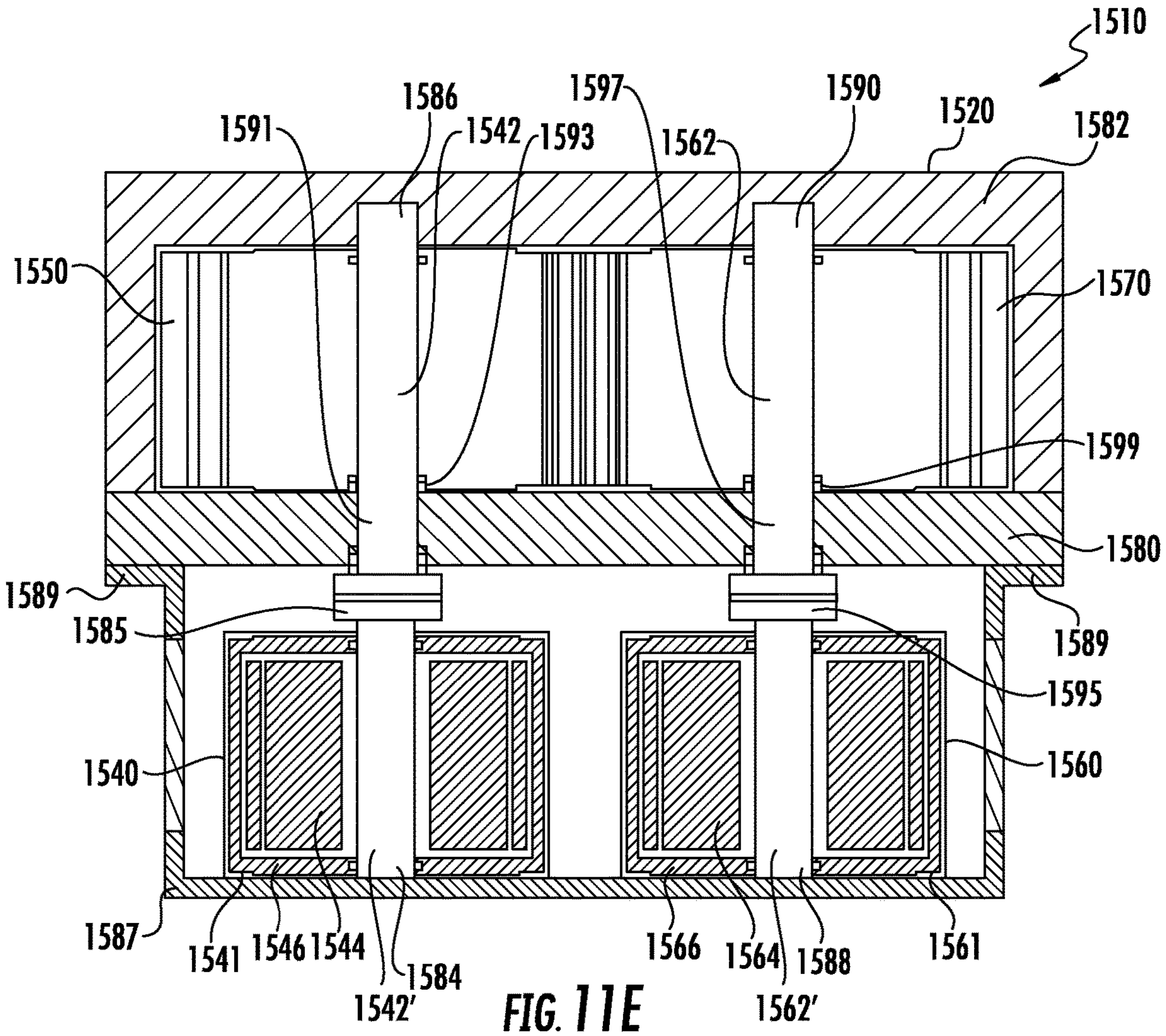

FIG. 11E shows a side cross-sectional view of another exemplary embodiment of an external gear pump 1510. The embodiment of the pump 1510 shown in FIG. 11E differs from pump 10 in that both motors are disposed outside a pump casing. In addition, like pump 10', the storage device 170 is not integral to the pump assembly and neither shaft 1542 of fluid drivers 1540 nor shaft 1562 of fluid driver 1560 has a flow-through shaft configuration. The pump 1510 includes a casing 1520, a fluid driver 1540, and a fluid driver 1560. The inner surface of the casing 1520 defines an internal volume. The casing 1520 can include end plates 1580, 1582. These two plates 1580, 1582 can be connected to a body of the casing 1520 by a plurality of bolts.

The fluid drivers 1540, 1560 respectively include motors 1541, 1561 and gears 1550, 1570. The fluid driver 1540 is disposed next to fluid driver 1560 such that the respective gear teeth 1552, 1572 contact each other in a manner similar to the contact of gear teeth 52, 72 in contact area 78 discussed above with respect to pump 10. In this embodiment, motors 1541, 1561 are of an inner-rotor motor design and, as seen in FIG. 11E, the motors 1541, 1561 are disposed outside the casing 1520. Each of the rotors 1544, 1564 of motors 1541, 1561 are disposed radially between the respective motor shafts 1542', 1562' and the stators 1546, 1566. The stators 1546, 1566 are disposed radially outward of the respective rotors 1544, 1564 and surround the rotors 1544, 1564. The inner-rotor designs mean that the shafts 1542', 1562', which are respectively coupled to rotors 1544, 1564, rotate while the stators 1546, 1566 are fixedly connected to the pump casing 1220 either directly or indirectly via, e.g., motor housing 1587. The gears 1550, 1570 respectively include shafts 1542, 1562 that can be supported by the plate 1582 at ends 1586, 1590 and the plate 1580 at ends 1591, 1597. The gear shafts 1542, 1562, which extend outside casing 1520, can be respectively coupled to motor shafts 1542', 1562' via, e.g., couplings 1585, 1595 such as shaft hubs to respectively form shafts extending from points 1591, 1590 to points 1584, 1588. One or more seals 1593 can be disposed to provide necessary sealing of the fluid. Design of the shafts 1542, 1542', 1562, 1562' and the means to couple the motors 1541, 1561 to respective gears 1550, 1570 can be varied without departing from the spirit of the present disclosure. It should be understood that those skilled in the art will recognize that the fluid drivers 1540, 1560 are similar to fluid driver 1260 and that the configurations and functions of fluid driver 1260, as discussed above, can be incorporated into fluid drivers 1540, 1560. Accordingly, for brevity, fluid drivers 1540, 1560 will not be discussed in detail except as necessary to describe this embodiment. In addition, it should be understood that those skilled in the art will also recognize that the operation of pump 1510, including fluid drivers 1540, 1560, will be similar to that of pump 10 and thus, for brevity, will not be further discussed. In addition, the means for transmitting torque (or power) from the motor to the gear is not limited to a shaft. Instead, any combination of power transmission devices, for example, shafts, sub-shafts, belts, chains, couplings, gears, connection rods, cams, or other power transmission devices can be used without departing from the spirit of the present disclosure. Also, in some exemplary embodiments, motors 1541, 1561 can be of an outer rotor motor design that are appropriately configured to respectively rotate the gears 1550, 1570.

In an exemplary embodiment, the motor housing 1587 can include a vibration isolator (not shown) between the plate 1580 and the motor housing 1587. In the exemplary embodiment above, the motor 1541 and the motor 1561 are disposed in the same motor housing 1587. However, in other embodiments, the motor 1541 and the motor 1561 can be disposed in separate housings. Further, the motor housing 1587 mounting and motor locations are not limited to that illustrated in FIG. 11E, and the motors and motor housing or housings can be mounted at any appropriate location on the casing 1520 or can even be separate from the casing 1520. A detailed description of the various dual fluid driver pump configurations of FIGS. 11-11Ecan be found in U.S. patent application Ser. No. 14/637,064, which is incorporated herein by reference in its entirety.

Figure 12:
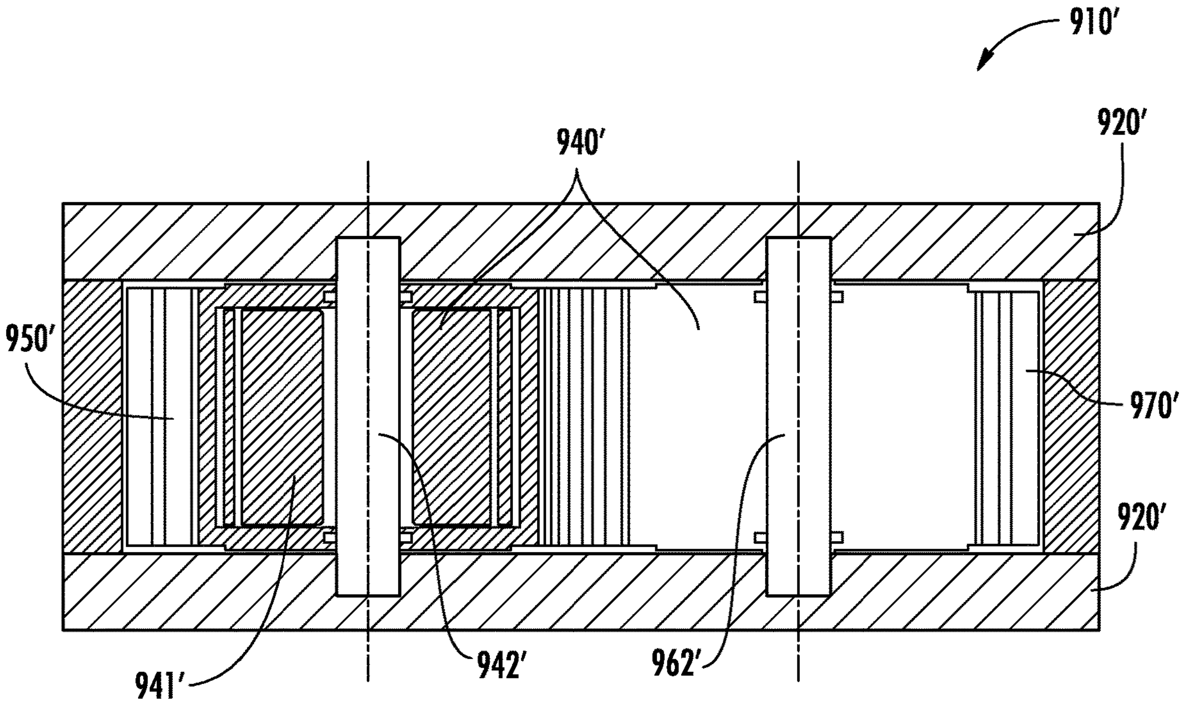
FIGS. 12 and 12A show cross-sectional views of exemplary embodiments of a pump with a driver-driven configuration.

In addition to the non-flow through shaft drive-drive configurations of FIGS. 11-11E, exemplary embodiments of the present disclosure can also include non-flow shaft driver-driven configurations. FIG. 12 shows a side cross-sectional view of an exemplary embodiment of an external gear pump 910'. The pump 910' includes a casing 920' and a fluid driver 940' with gears 950' and 970' and motor 941'. The embodiment of the pump 910' differs from pump 910 of FIG. 8 in that because the storage device 1070 is not integral to the pump assembly, neither shaft 942' of nor shaft 962' of fluid driver 940' has a flow-through shaft configuration. In all other respects, the pump 910' is the same as pump 910. Thus, for brevity, the pump 910' will not be further discussed.

Figure 12A:
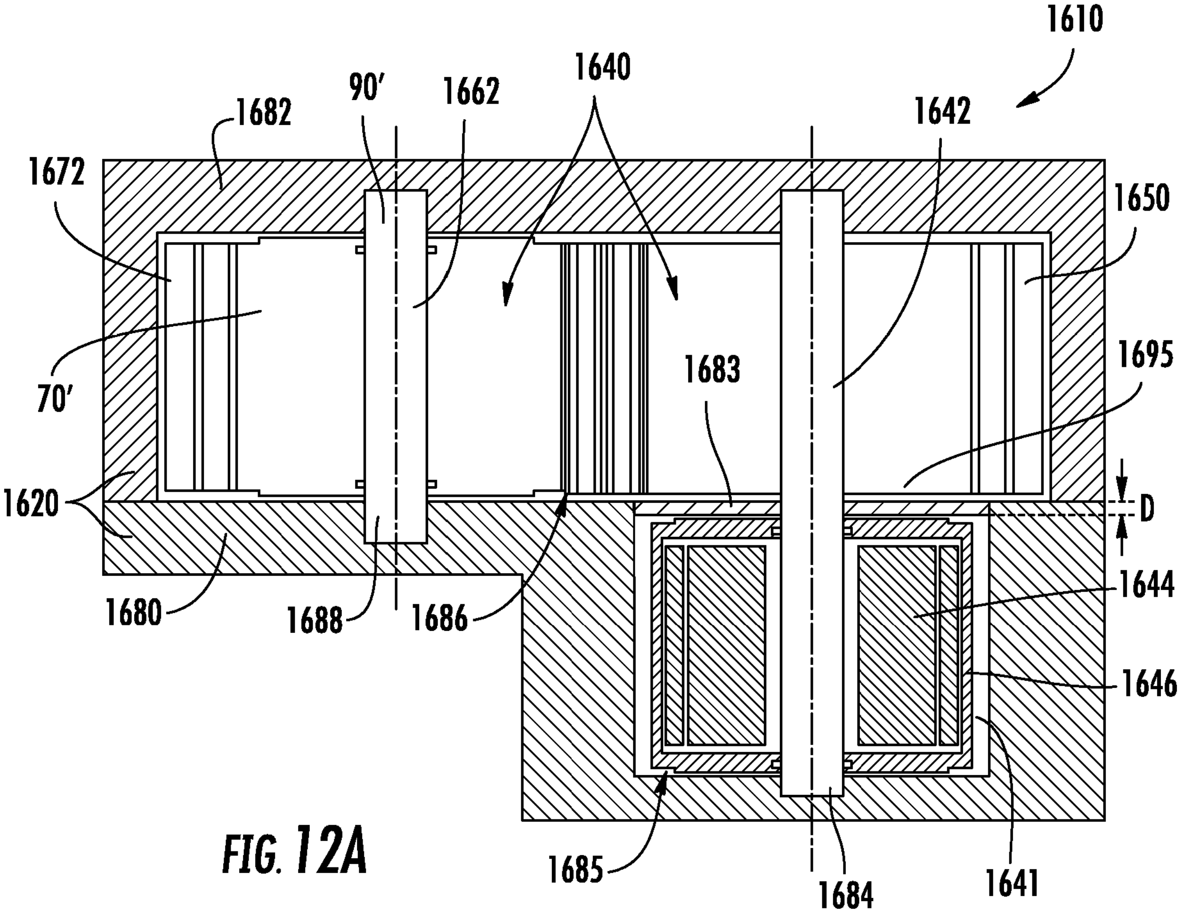

FIG. 12A shows a side cross-sectional view of an exemplary embodiment of an external gear pump 1610. The pump 1610 includes a casing 1620 with a fluid driver 1640. The embodiment of the pump 1610 differs from pump assembly of FIG. 8 in that the gear 1650 is disposed adjacent to the motor 1641 in the casing 1620. That is, unlike motor 941, the motor 1641 is not disposed in the gear body of the gear. In additional, the storage device 1070 is not integral to the pump assembly and neither shaft 1642 of nor shaft 1662 of fluid driver 1640 has a flow-through shaft configuration. The gear 1650 is spaced apart from the motor 1641 in an axial direction on the shaft 1642. For example, in the embodiment shown in FIG. 12A, the gear 1650 is spaced apart from the motor 1641 by a distance D in the axial direction of the support shaft 1642. The rotor 1644 is fixedly connected to the shaft 1642 on one side 1684 of the shaft 1642, and the gear 1650 is fixedly connected to the shaft 1642 on the other side 1686 of the shaft 1642 such that torque generated by the motor 1641 is transmitted to the gear 1650 via the shaft 1642.

The motor 1641 is designed to fit into its cavity 1685 with sufficient tolerance between the motor casing and the pump casing 1620 so that fluid is prevented (or substantially prevented) from entering the cavity 1685 during operation. In addition, there is sufficient clearance between the motor casing and the gear 1650 for the gear 1650 to rotate freely but the clearance is such that the fluid can still be pumped efficiently. Thus, with respect to the fluid, in this embodiment, the motor casing is designed to perform the function of the appropriate portion of the pump casing walls of the embodiment of FIG. 8. In some embodiments, the diameter of the cavity 1685 opening and thus the outer diameter of the motor 1641 is equal to or less than the root diameter for the gear teeth 1652. Thus, in these embodiments, even the motor side of the gear teeth 1652 will be adjacent to a wall of the pump casing 1620 as they rotate. In some embodiments, a bearing 1695 can be inserted between the gear 1650 and the motor 1641. The bearing 1695, which can be, e.g., a washer-type bearing, decreases friction between the gear 1650 and the casing of motor 1641 as the gear 1650 rotates. Depending on the fluid being pumped and the type of application, the bearing can be metallic, a non-metallic or a composite. Metallic material can include, but is not limited to, steel, stainless steel, anodized aluminum, aluminum, titanium, magnesium, brass, and their respective alloys. Non-metallic material can include, but is not limited to, ceramic, plastic, composite, carbon fiber, and nano-composite material. In addition, the bearing 1695 can be sized to fit the motor cavity 1685 opening to help seal the motor cavity 1685 from the gear cavity 1686, and the gears 1650, 1670 will be able to pump the fluid more efficiently. It should be understood that those skilled in the art will recognize that, in operation, the fluid driver 1640 will operate in a manner similar to that disclosed above with respect to pump 910. Accordingly, for brevity, pump 1610 operating details will not be further discussed.

In the above exemplary embodiment, the gear 1650 is shown as being spaced apart from the motor 1641 along the axial direction of the shaft 1642. However, other configurations fall within the scope of the present disclosure. For example, the gear 1650 and motor 1641 can be completely separated from each other (e.g., without a common shaft), partially overlapping with each other, positioned side-by-side, on top of each other, or offset from each other. Thus, the present disclosure covers all of the above-discussed positional relationships and any other variations of a relatively proximate positional relationship between a gear and a motor inside the casing 1620. In addition, in some exemplary embodiments, motor 1641 can be an outer-rotor motor design that is appropriately configured to rotate the gear 1650.

Further, in the exemplary embodiment described above, the torque of the motor 1641 is transmitted to the gear 1650 via the shaft 1642. However, the means for transmitting torque (or power) from a motor to a gear is not limited to a shaft, e.g., the shaft 1642 in the above-described exemplary embodiment. Instead, any combination of power transmission devices, e.g., shafts, sub-shafts, belts, chains, couplings, gears, connection rods, cams, or other power transmission devices, can be used without departing from the spirit of the present disclosure. As discussed above, although the exemplary embodiments of FIGS. 11-12A are shown with a non-flow-through shaft configuration, the exemplary embodiments of FIGS. 11-12A can include a flow-through shaft and/or an integrated storage device if desired.

Figure 13:
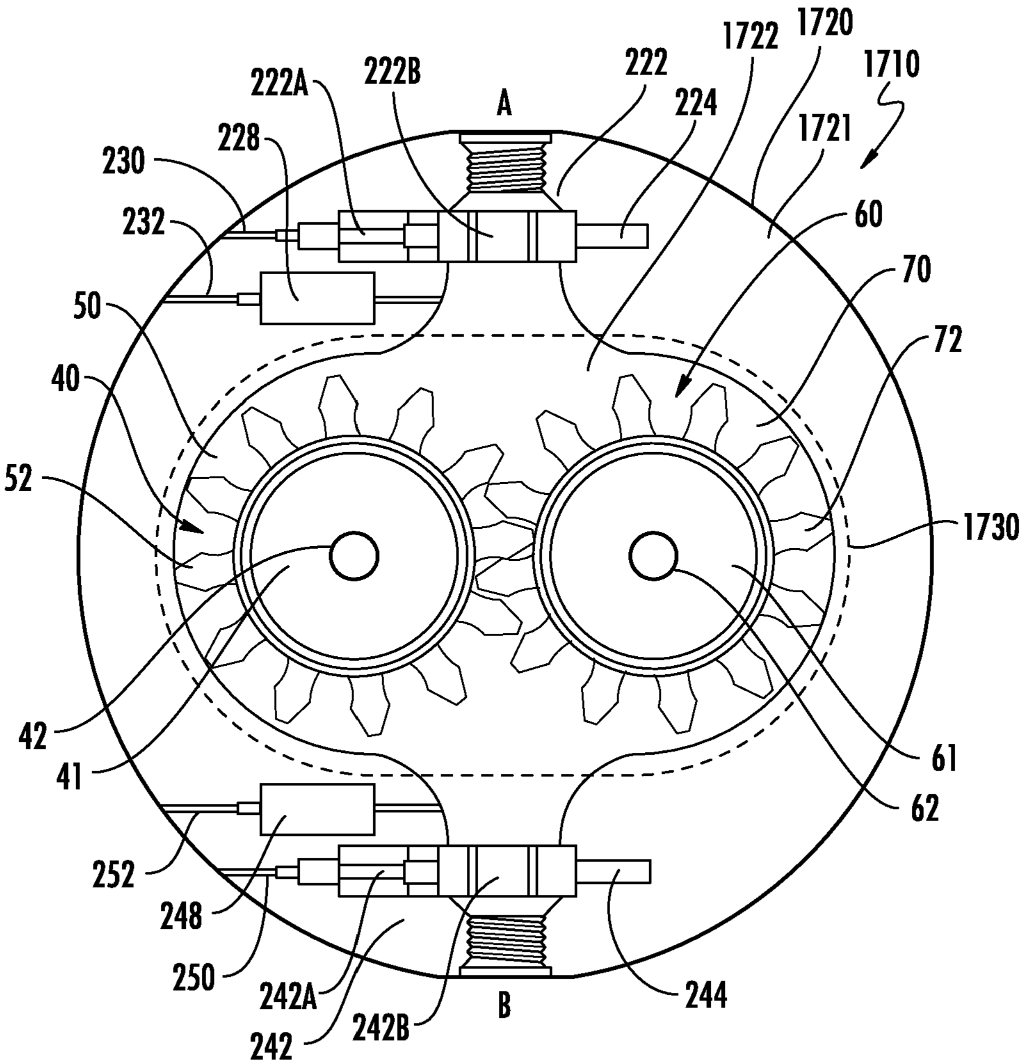
FIG. 13 shows a top-sectional view of an exemplary embodiment of a pump assembly.

FIG. 13 shows an exemplary embodiment of a pump assembly 1710. The pump assembly includes a casing 1720 with a casing wall 1721 that defines an internal volume 1722. The pump assembly 1710 includes a fluid driver assembly 1730 that includes fluid drivers 40 and 60 with motors 41 and 61. The motors 41 and 61 drive respective gear assemblies 50 and 70 and corresponding teeth 52 and 72 to pump fluid through the pump assembly 1710. The operation of fluid driver assembly 1730 is similar to fluid drivers 40 and 60 in pump 10 discussed above and thus, for brevity, will not be discussed further. Although fluid driver assembly 1730 is illustrated with fluid drivers 40 and 60, the configuration of fluid driver 1730 can be any one of the drive-drive and driver driven configurations discussed above. However, the maximum compact configuration is achieved when both motors of a drive-drive configuration are disposed within the respective gear cylinders or the single motor of a driver-driven configuration is disposed within a gear cylinder, as discussed above. A storage device 1770 (not shown in FIG. 13) can be part of pump assembly 1710 if desired. The configuration and operation of the pump assembly 1710, which includes storage device 1770, will be similar to that discussed above with respect to pump assembly 2. According, for brevity, storage device 1770 portion of pump assembly 1710 will not be further discussed.

One difference between pump assembly 1710 and pump assembly 2 is that, in pump assembly 1710, the valve assemblies that isolate the pump assembly 1710 are disposed internal to the casing 1720 of the pump assembly 1710. In addition, in some exemplary embodiments, sensor assemblies that measure pump and system parameters can also be disposed internal to the casing of the pump assembly 1710. For example, as seen in FIG. 13, valve assemblies 222, 242 are disposed partially in the casing wall 1721 and partially in the interior volume 1722. However, in some exemplary embodiments, the entirety of the valve assemblies 222, 242 can be disposed in the internal volume 1722 of the pump assembly 1710. Valve assemblies 222 and 242, which can be, e.g., lock valves (or shut off valves) are preferably disposed in the fluid flow path of the pump assembly 1710 in the vicinity of ports A and B, respectively. In the exemplary embodiment of the FIG. 13, valve assemblies 222, 242 include lock valves 222B and 242B, which are operated by solenoids 222A and 242A, respectively, to selectively provide fluid communication or fluid isolation between the interior volume and the respective ports A and B. Operation of solenoid operated valves is known and thus, for brevity will not be discussed except as necessary to describe the present embodiment.

The valve assemblies 222 and 242 are disposed in the fluid path of pump assembly 1710 such that the valves 222B and 242B, when operated, fluidly isolate pump assembly 1710 from the fluid system or permit fluid communication with the fluid system. In the exemplary embodiment of FIG. 13, respective spools of the valves 222 and 242 move along spool guides 224 and 244 to open and close the respective fluid paths based on the operation of solenoids 222A and 222B. Communication connectors 302 and 303 permit communications with a controller that can be disposed in the pump assembly 1710 and/or an external controller. The connectors 302 and 303 can also provide power to operate the valve assemblies 222, 242.

The pump assembly 1710 can also include sensor assemblies 228 and 248 disposed within the casing wall 1721 of the pump assembly 1710. However, at least a portion of or the entirety of the sensor assemblies 228 and 248 can be disposed the internal volume 1722. The sensor assemblies 228 and 248 can monitor pump and/or system parameters (e.g., measured pressure, temperature, flow rate or other system parameters). For example, as shown in FIG. 13, sensor assemblies 228 and 248 can be disposed adjacent to and be in fluid communication with the ports A and B, respectively, of pump assembly 1710 to monitor, e.g., the pump's mechanical performance and/or system parameters. The sensor assemblies 228 and 248 can communicate via communication connectors 232 and 252 with a controller in pump assembly 1710 and/or with an external controller.

In some embodiments, the lock valves 222, 242 are normally closed solenoid controlled valves which return to a closed position when the solenoid is de-energized. Thus, these valves can return to a closed position in the event of abnormal or emergent operations, for example, detection of excessive pressure, power outage, failure of an operating system, failure of a motor, failure of a pressure transducer, or activation of an emergency button. Accordingly, the flow of fluid is prevented from entering or exiting the pump assembly 1710, thereby ensuring safety during emergent events. Because the valve assemblies 222, 242, sensor assemblies 228, 248, and corresponding connectors are all contained in the casing and/or the internal volume of the pump 1710, the pump assembly 1710 makes for a compact configuration and reduces potential sources of contamination in the fluid system.

Figure 14:
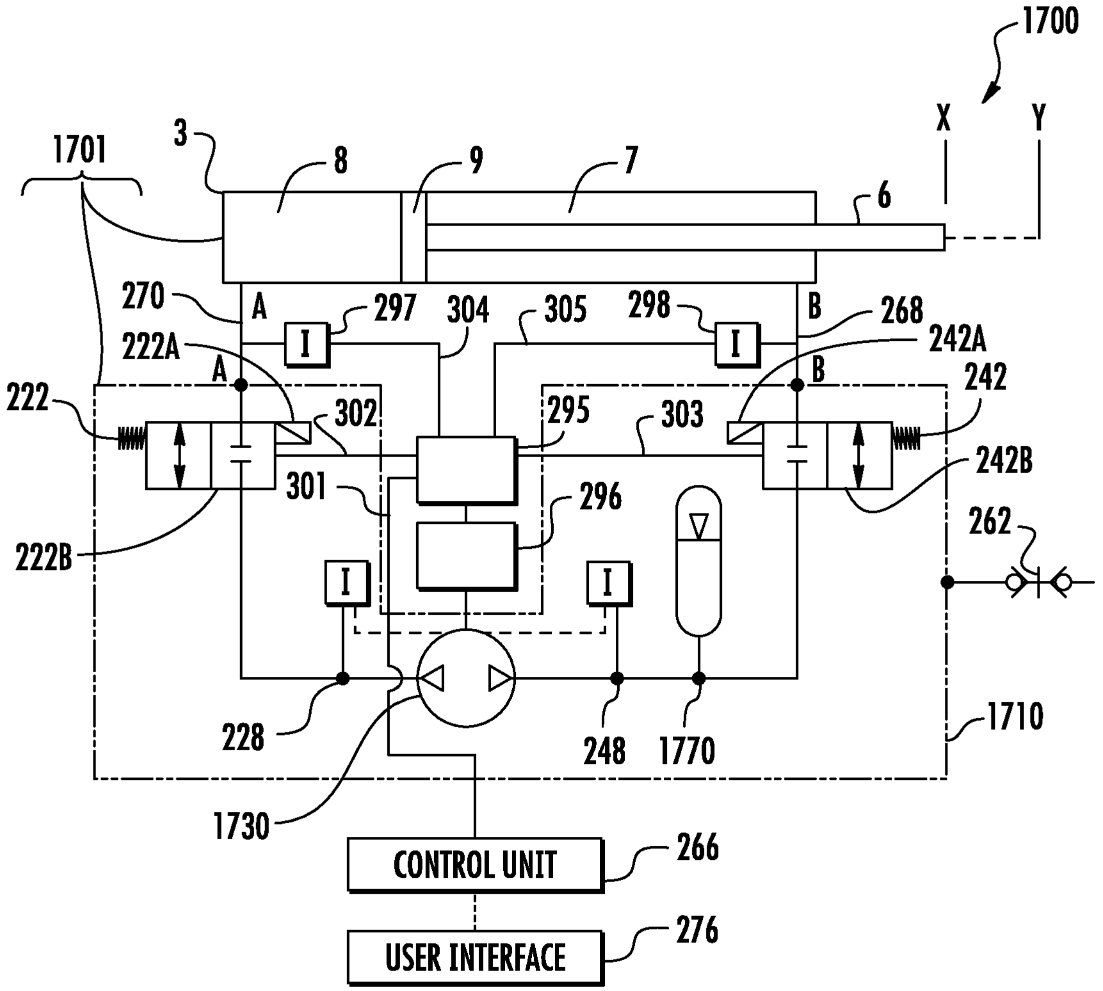
FIG. 14 is a schematic diagram illustrating an exemplary embodiment of a fluid system in a linear actuator application.

FIG. 14 illustrates an exemplary schematic of a linear system 1700 that includes liner actuator assembly 1701 having the pump assembly 1710 and hydraulic cylinder 3. The pump assembly 1710 includes fluid driver assembly 1730, valve assemblies 222 and 242, sensor assemblies 228 and 248 and storage device 1770, as discussed above. The linear system 1700 can also include additional sensors such as sensor assemblies 297, 298. In the exemplary embodiment of FIG. 14, the hydraulic cylinder assembly 3 and the pump assembly 1710 can be integrated into an integrated liner actuator assembly 1701. However, the components that make up linear actuator assembly 1701, including the components that make up pump assembly 1710, can be disposed separately if desired, using hoses and pipes to provide the interconnections.

As discussed above, in some embodiments, the valves 222B, 242B can be lock valves (or shutoff valves) that are either fully open or fully closed (i.e. switchable between a fully open state and a fully closed state) and actuated by the respective solenoids 222A and 242A. In other embodiments, the valves 222B, 242B can be set to intermediate positions between 0% and 100%. It should be understood however that, while the valves 222B, 242B can be set to a desired position at the start and end of a given hydraulic system operation, the valves are not used to control the flow or pressure during the operation. That is, during normal operation, the valves 222B, 242B will remain at the set position during a given operation, e.g., at full open or another desired positon at the start of the operation. During the hydraulic system operation, in some embodiments, the control unit 266 will control the speed and/or torque of the motor or motors in fluid driver assembly 1730 to exclusively adjust the flow and/or pressure in the hydraulic system. In this way, the complexity of conventional systems that use, e.g., directional flow valves and variable-flow piston pumps can be eliminated, which will also provide a more reliable system in terms of maintenance and control.

In the system of FIG. 14, the valve assembly 242 of the hydraulic pump assembly 1710 is in fluid communication with the retraction chamber 7 of the hydraulic cylinder 3 and the valve assembly 222 is in fluid communication with the extraction chamber 8 of the hydraulic cylinder 3. The valve assemblies 222, 242 and fluid driver assembly 1730 are powered by a common power supply 296. In some embodiments, the fluid driver assembly 1730 and the valves assemblies 222, 242 can be powered separately or each valve assembly 222, 242 and fluid driver assembly 1730 can have its own power supply.

The linear system 1700 can include one or more process sensors therein. For example, as discussed above, pump assembly 1710 can include sensor assemblies 228 and 248 and, alternatively or additionally, sensor assemblies 297 and 298 can be included in the system. Each of the sensor assemblies 228, 248, 297, 298 can include one or more sensors to monitor the system operational parameters. The sensor assemblies 228, 248, 297, 298 can communicate with the control unit 266 and/or drive unit 295. Each sensor assembly 228, 248, 297, 298 can include at least one of a pressure transducer, a temperature transducer, and a flow transducer (i.e., any combination of the transducers therein). Signals from the sensor assemblies 228, 248, 297, 298 can be used by the control unit 266 and/or drive unit 295 for monitoring and for control purposes. In some embodiments sensor assemblies 228 and 248 can be configured to monitor the performance of fluid driver assembly 1730, e.g., the mechanical performance, while sensor assemblies 297, 298 can be configured to monitor general system parameters and/or performance of the hydraulic cylinder 3. The status of each valve assembly 222, 242 (e.g., the appropriate operational status—open or closed, percent opening, or some other valve status indication) and the process data measured by the sensors in sensor assemblies 228, 248, 297, 298 (e.g., measured pressure, temperature, flow rate or other system parameters) may be communicated to the drive unit 295 via the respective communication connections 302-305.

As discussed above, the fluid driver assembly 1730 includes one or more motors depending on the configuration of the fluid driver assembly 1730. The motor or motors are controlled by the control unit 266 via the drive unit 295 using communication connection 301. In some embodiments, the functions of drive unit 295 can be incorporated into one or both motors (if the pump has two motors) and/or the control unit 266 such that the control unit 266 communicates directly with one or both motors. In addition, the valve assemblies 222, 242 can also be controlled (e.g., open/close) by the control unit 266 via the drive unit 295 using communication connections 301, 302, and 303. In some embodiments, the functions of drive unit 295 can be incorporated into the valve assemblies 222, 242 and/or control unit 266 such that the control unit 266 communicates directly with valve assemblies 222, 242. The drive unit 295 can also process the communications between the control unit 266 and the sensor assemblies 228, 248, 297, 298 using communication connections 232, 252, 304 and 305. In some embodiment, the control unit 266 can be set up to communicate directly with the sensor assemblies 228, 248, 297 and/or 298. The data from the sensors can be used by the control unit 266 and/or drive unit 295 to control the motor(s) and/or the valve assemblies 222, 242. For example, based on the process data measured by the sensors in sensor assemblies 228, 248, 297, 298, the control unit 266 can provide command signals to the valve assemblies to, e.g., open/close lock valves in the valve assemblies 222, 242 (or move the valves to an intermediate opening) in addition to controlling a speed and/or torque of the motor(s).

The drive unit 295 includes hardware and/or software that interprets the command signals from the control unit 266 and sends the appropriate demand signals to the motor(s) and/or valve assemblies 222, 242. For example, the drive unit 295 can include pump and/or motor curves that are specific to the fluid driver assembly 1730 such that command signals from the control unit 266 will be converted to appropriate speed/torque demand signals to the fluid driver assembly 1730 based on the design of the fluid driver assembly 1730. Similarly, the drive unit 295 can include valve and/or actuator curves that are specific to the valve assemblies 222, 242 and the command signals from the control unit 266 will be converted to the appropriate demand signals based on the type of valve. The pump/motor and/or the valve curves can be implemented in hardware and/or software, e.g., in the form of hardwire circuits, software algorithms and formulas, or some other hardware and/or software system that appropriately converts the demand signals to control the pump/motor and/or the valve. In some embodiments, the drive unit 295 can include application specific hardware circuits and/or software (e.g., algorithms) to control the motor(s) and/or valve assemblies 222, 242.

The control unit 266 can receive feedback data from one or both motors (if the pump has two motors). For example, the control unit 266 can receive speed or frequency values, torque values, current and voltage values, or other values related to the operation of the motor(s). In addition, the control unit 266 can receive feedback data from the valve assemblies 222, 242. For example, the control unit 266 can receive the open and close status of the lock valves 222B, 242B. In some embodiments, the lock valves 222B, 242B can have a percent opening indication instead of or in addition to an open/close indication to e.g., provide status of a partially open valve. Further, the control unit 266 can receive feedback of process parameters such as pressure, temperature, flow, or some other process parameter. As discussed above, each sensor assembly 228, 248, 297, 298 can have one or more sensors to measure process parameters such as pressure, temperature, and flow rate of the hydraulic fluid. The illustrated sensor assemblies 297, 298 are shown disposed next to the hydraulic cylinder 3. However, the sensor assemblies 297 and 298 are not limited to these locations. Alternatively, or in addition to sensor assemblies 297, 298, the system 1700 can have other sensors throughout the system to measure process parameters such as, e.g., pressure, temperature, flow, or some other process parameter. While the range and accuracy of the sensors will be determined by the specific application, it is contemplated that hydraulic system application with have pressure transducers that range from 0 to 5000 psi with the accuracy of +/−0.5%. These transducers can convert the measured pressure to an electrical output, e.g., a voltage ranging from 1 to 5 DC voltages. Similarly, temperature transducers can range from −4 deg. F to 300 deg. F, and flow transducers can range from 0 gallons per minute (gpm) to 160 gpm with an accuracy of +/−1% of reading. However, the type, range and accuracy of the transducers in the present disclosure are not limited to the transducers discussed above, and the type, range and/or the accuracy of the transducers can vary without departing from the scope of the present disclosure.

Although the drive unit 295 and control unit 266 are shown as separate controllers in FIG. 14, the functions of these units can be incorporated into a single controller or further separated into multiple controllers (e.g., the motor(s) in fluid driver assembly 1730 and valve assemblies 222, 242 can have a common controller or each component can have its own controller). The controllers (e.g., control unit 266, drive unit 295 and/or other controllers) can communicate with each other to coordinate the operation of the valve assemblies 222, 242 and the fluid driver assembly 1730. For example, as illustrated in FIG. 14, the control unit 266 communicates with the drive unit 295 via a communication connection 301. The communications can be digital based or analog based (or a combination thereof) and can be wired or wireless (or a combination thereof). In some embodiments, the control system can be a "fly-by-wire" operation in that the control and sensor signals between the control unit 266, the drive unit 295, the valve assemblies 222, 242, fluid driver assembly 1730, sensor assemblies 228, 248, 297, 298 are entirely electronic or nearly all electronic. That is, the control system does not use hydraulic signal lines or hydraulic feedback lines for control, e.g., the actuators in valve assemblies 222, 242 do not have hydraulic connections for pilot valves. In some exemplary embodiments, a combination of electronic and hydraulic controls can be used.

The control unit 266 may receive inputs from an operator's input unit 276. Using the input unit 276, the operator can manually control the system or select pre-programmed routines. For example, the operator can select a mode of operation for the system such as flow (or speed) mode, pressure (or torque) mode, or a balanced mode. Flow or speed mode may be utilized for an operation where relatively fast retraction or extraction of the piston rod 6 is requested with relatively low torque requirement. Conversely, a pressure or torque mode may be utilized for an operation where relatively slow retraction or extraction of the piston rod 6 is requested with a relatively high torque requirement. Based on the mode of operation selected, the control scheme for controlling the motor(s) can be different.

As discussed above, in some embodiments, the valve assemblies 222, 242 can include lock valves that are designed to be either fully open or fully closed. In such systems, the control unit 266/drive unit 295 will fully open the valves and, in some embodiments, check for the open feedback prior to starting the motor(s). During normal operation, the valves 222B, 242B can be at 100% open or some other desired positon by, e.g., energizing the respective solenoids 222A and 242A, and the control unit 266/drive unit 295 controls the operation of the motor(s) to maintain the flow and/or pressure at the operational set point. The operational set point can be determined or calculated based on a desired and/or an appropriate set point for a given mode of operation. Upon shutdown or abnormal operation, the motor(s) are shut down and the valves 222B, 242B are closed or moved to some other desired positon, e.g., by de-energizing the respective solenoids 222A and 242A. During a normal shut down, the hydraulic pressure in the system may be allowed to drop before the valves are closed. However, in some abnormal operating conditions, based on safety protocol routines, the valves may be closed immediately after or substantially simultaneously with the motor(s) being turned off in order to trap the pressure in the system. For example, in some abnormal conditions, it might be safer to lock the hydraulic cylinder 3 in place by trapping the pressure on the extraction chamber 8 and the retraction chamber 7.

In the exemplary system of FIG. 14, when the control unit 266 receives a command to extract the cylinder rod 6, for example in response to an operator's command, the control unit 266 controls the speed and/or torque of the motor(s) fluid driver assembly 1730 to transfer pressurized fluid from the retraction chamber 7 to the extraction chamber 8. That is, fluid driver assembly 1730 pumps fluid from port B to port A. In this way, the pressurized fluid in the retraction chamber 7 is drawn, via the hydraulic line 268, into port B of the pump assembly 1710 and carried to the port A and further to the extraction chamber 8 via the hydraulic line 270. By transferring fluid and increasing the pressure in the extraction chamber 8, the piston rod 6 is extended. During this operation of the fluid driver assembly 1730, the pressure in the port B side of the pump assembly 1710 can become lower than that of the storage device (i.e. pressurized vessel) 1770. When this happens, the pressurized fluid stored in the storage device 1770 is released to the port B side of the system so that the pump does not experience cavitation. The amount of the pressurized fluid released from the storage device 1770 can correspond to a difference in volume between the retraction and extraction chambers 7, 8 due to, e.g., the volume the piston rod occupies in the retraction chamber 7 or for some other reason.

When the control unit 266 receives a command to retract the cylinder rod 6, for example in response to an operator's command, the control unit 266 controls the speed and/or torque of the pump 10 to transfer pressurized fluid from the extraction chamber 8 to the retraction chamber 7. That is, fluid driver assembly 1730 pumps fluid from port A to port B. In this way, the pressurized fluid in the extraction chamber 8 is drawn, via the hydraulic line 268, into the port A of the pump assembly 1710 and carried to the port B and further to the retraction chamber 7 via the hydraulic line 268. By transferring fluid and increasing the pressure in the retraction chamber 7, the piston rod 6 is retracted. During this operation of the pump 1710, the pressure in the port B side of the pump 1710 can become higher than that of the storage device (e.g., pressurized vessel) 1770. Thus, a portion of the fluid carried from the extraction chamber 8 is replenished back to the storage device 1770.

The control unit 266 that controls the linear system 1700 can have multiple operational modes. For example, a speed/flow mode, a torque/pressure mode, or a combination of both. A speed/flow mode may be utilized for an operation where relatively fast retraction or extraction of the piston rod 6 is requested with relatively low torque requirement. Conversely, a torque/pressure mode may be utilized for an operation where relatively slow retraction or extraction of the piston rod 6 is requested with a relatively high torque requirement. Operation of the linear system 1700 will be discussed further below.

Preferably, the motor(s) of fluid driver assembly 1730 are variable speed/variable torque and bi-directional. Depending on the mode of operation, e.g. as set by the operator or as determined by the system based on the application (e.g., boom application), the flow and/or pressure of the system can be controlled to an operational set-point value by controlling either the speed or torque of the motor. For example, in flow (or speed) mode operation, the control unit 266/drive unit 295 controls the flow in the system by controlling the speed of the motor(s). When the system is in pressure (or torque) mode operation, the control unit 266/drive unit 295 controls the pressure at a desired point in the system, e.g., at the chambers 7, 8, by adjusting the torque of the hydraulic pump motor(s). When the system is in a balanced mode of operation, the control unit 266/drive unit 295 takes both the system's pressure and hydraulic flow rate into account when controlling the motor(s). Because the pump is not run continuously at a high rpm as in conventional systems, the temperature of the fluid remains relatively low thereby eliminating the need for a large fluid reservoir. In some embodiments, in each of these modes, the speed and/or torque of the fluid driver assembly 1730 can be controlled to exclusively adjust the flow and/or pressure in the system, i.e., without the aid of another flow control device, to the operational set point.

The pressure/torque mode operation can be used to ensure that either the extraction chamber 8 or retraction chamber 7 of the hydraulic cylinder 3 is maintained at a desired pressure (or any other point in the hydraulic system). In pressure/torque mode operation, the power to the hydraulic pump motor(s) is determined based on the system application requirements using criteria such as maximizing the torque of the motors. If the hydraulic pressure is less than a predetermined set-point at the extraction chamber 8 side (e.g., at the location of sensor assembly 248 and/or 297) of the hydraulic pump assembly 1710, the control unit 266/drive unit 295 will increase the hydraulic pump's motor current (and thus the torque of the hydraulic motor(s)) to increase the hydraulic pressure. If the pressure at sensor assembly 297 is less than the required pressure based on the operational set point, the control unit 266/drive unit 295 will decrease the current of motor(s) (and thus the torque) to reduce the hydraulic pressure. While the pressure at sensor assembly 297 is used in the above-discussed exemplary embodiment, pressure mode operation is not limited to measuring the pressure at a single location. Instead, the control unit 266/drive unit 295 can receive pressure feedback signals from multiple locations in the system for control.

In flow/speed mode operation, the power to the motor(s) is determined based on the system application requirements using criteria such as how fast the motor(s) ramp to the desired speed and how precisely the motor speeds can be controlled. Because the fluid flow rate is proportional to the motor speed and the fluid flow rate determines the travel speed of the hydraulic cylinder 3, the control unit 266 can be configured to control the travel speed of the hydraulic cylinder 3 based on a control scheme that uses the motor speed, the flow rate, or some combination of the two. That is, when a specific response time of the hydraulic cylinder 3 is required, the control unit 266/drive unit 295 can control the motor(s) to achieve a predetermined speed and/or a predetermined hydraulic flow rate that corresponds to the desired response time for the hydraulic cylinder 3. For example, the control unit 266/drive unit 295 can be set up with algorithms, look-up tables, or some other type of hardware and/or software functions to correlate the speed of the hydraulic cylinder 3 to the speed of the fluid driver assembly 1730 and/or the flow of the hydraulic fluid. Thus, if the system requires that the hydraulic cylinder 3 move from position X to position Y (see FIG. 14) in a predetermined time period, i.e., at a desired speed, the control unit 266/drive unit 295 can be set up to control either the speed of the motor(s) or the hydraulic flow rate in the system to achieve the desired travel speed of the hydraulic cylinder 3.

If the control scheme uses the flow rate, the control unit 266/drive unit 295 can receive a feedback signal from a flow sensor, e.g., a flow sensor in one or all of sensor assemblies 228, 248, 297, 298, to determine the actual flow in the system. The flow in the system may be determined by measuring, e.g., the differential pressure across two points in the system, the signals from an ultrasonic flow meter, the frequency signal from a turbine flow meter, or by using some other type of flow sensor or instrument. Thus, in systems where the control scheme uses the flow rate, the control unit 266/drive unit 295 can control the flow output of the fluid driver assembly 1730 to a predetermined flow set-point value that corresponds to the desired travel speed of the hydraulic cylinder 3.

Similarly, if the control scheme uses the motor speed, the control unit 266/drive unit 295 can receive speed feedback signals from the fluid driver(s) of the fluid driver assembly 1730. For example, the actual speed of the motor(s) can be measured by sensing the rotation of the pump gears. For example, the fluid driver assembly 1730 can include a magnetic sensor (not shown) that senses the gear teeth as they rotate. Alternatively, or in addition to the magnetic sensor (not shown), one or more teeth can include magnets that are sensed by a pickup located either internal or external to the hydraulic pump casing. Thus, in systems where the control scheme uses the flow rate, the control unit 266/drive unit 295 can control the actual speed of the fluid driver assembly 1730 to a predetermined speed set-point that corresponds to the desired travel speed of the hydraulic cylinder 3.

Alternatively, or in addition to the controls described above, the speed of the hydraulic cylinder 3 can be measured directly and compared to a desired travel speed set-point to control the speed of motor(s).

In some embodiments, for drive-drive configurations, the control unit 266/drive unit 295 (or some other controller) can be configured such that when one of prime movers fails, the pump will operate in a driver-driven configuration to operate the system, e.g., operate the system for a limited time period to safely shutdown the system. That is, the system will go from a configuration where the fluid drivers are independently driven with synchronous contact between the fluid drivers to a configuration where the remaining operative motor drives the corresponding fluid driver (e.g., gear), which in turn meshes with the other fluid driver (e.g., gear). Thus, the control unit 266/drive unit 295 can have a normal mode of operation where the fluid drivers 40, 60 of the fluid driver assembly 1730 are independently driven by the motors 41 and 61 so as to synchronize contact between the respective gears of fluid drivers 40 and 60, and a fail-safe mode where the fluid driver assembly 1730 is operated in a driver-driven configuration using the operative motor and shutting down the non-operational motor. "Non-operational" means that the motor is inoperative or operating outside of established safety and/or operational guidelines and/or procedures. The guidelines and procedures can be established, e.g., by the motor manufacturer based on current and/or power limits, temperature limits, vibration limits or some other performance limit of the motor. Alternatively, or in addition to the manufacturer's guidelines and/or procedures, other guidelines and procedures can be established based on limits specific to the particular application, e.g., limits based on pump flow and pressure curves. The fail-safe mode operation may eliminate or reduce the hydraulic system's downtime caused by failure of one of the electric motors 41, 61 until the non-operational motor is repaired or replaced.

Inoperativeness of a motor (or failure of a motor) may be detected in various ways. For example, if there are abnormal current readings by one or both of the motors or if there is a difference in current readings between the two motors, it can be a sign of motor problems. Similarly, a difference in speed feedback (or no feedback—zero value) of a motor compared to the demand signal and/or a difference in rpm readings between the two motors can also be a sign of motor problems. Of course, other indications such as responsiveness of a motor in comparison to a predetermined limit or limits (e.g., comparison to a desired set point, an upper and/or a lower limit), temperature of a motor, vibration of a motor or some other performance criteria of the motor can also be used to determine if a motor is failing and whether to switch the system from normal mode of operation to a fail-safe mode of operation. The switch from normal mode to fail-safe mode can be done manually by the operator based on indications provided to the operator by the control unit 266. Alternatively or in addition to the manual option, the control unit 266 can be configured to automatically switch from normal mode to fail-safe mode based on a determination that a prime mover, e.g., a motor, is non-operational, i.e., operating abnormally, according to predetermined criteria, as discussed above. Depending on the type of operation, the control unit 266 can immediately shut down the system or let the system run at a reduced load limit for a predetermined period of time. For example, if a motor fails when the boom of an excavator is on the ground, the control unit 266 will immediately shut down the system prior to operator attempting to lift a load. However, if the boom is in the air and is carrying a load, the control unit 266, after providing an alarm to the operator, will allow operation in driver-driven mode for a predetermined amount of time for the operator to safely bring down the load. In some embodiments, the control unit 266 may allow operation in a driver-driven for an indefinite period of time but at a reduced load (e.g., 50-75% of full load power as compared to the normal mode of operation).

As discussed above, the control unit 266/drive unit 295 can include motor and/or valve curves. In addition, the hydraulic cylinder 3 can also have characteristic curves that describe the operational characteristics of the cylinder, e.g., curves that correlate pressure/flow with travel speed/position. The characteristic curves of the motor(s) of fluid driver assembly 1730, valve assemblies 222, 242, and the hydraulic cylinder 3 can be stored in memory, e.g. RAM, ROM, EPROM, or some other type of storage device in the form of look-up tables, formulas, algorithms, or some other type of software implementation in the control unit 266, drive unit 295, or some other storage that is accessible to the control unit 266/drive unit 295 (e.g., in the fluid driver(s) of fluid driver assembly 1730, valve assemblies 222, 242, and/or the hydraulic cylinder 3). The control unit 266/drive unit 295 can then use the characteristic curves to precisely control the motor(s).

Figure 15:
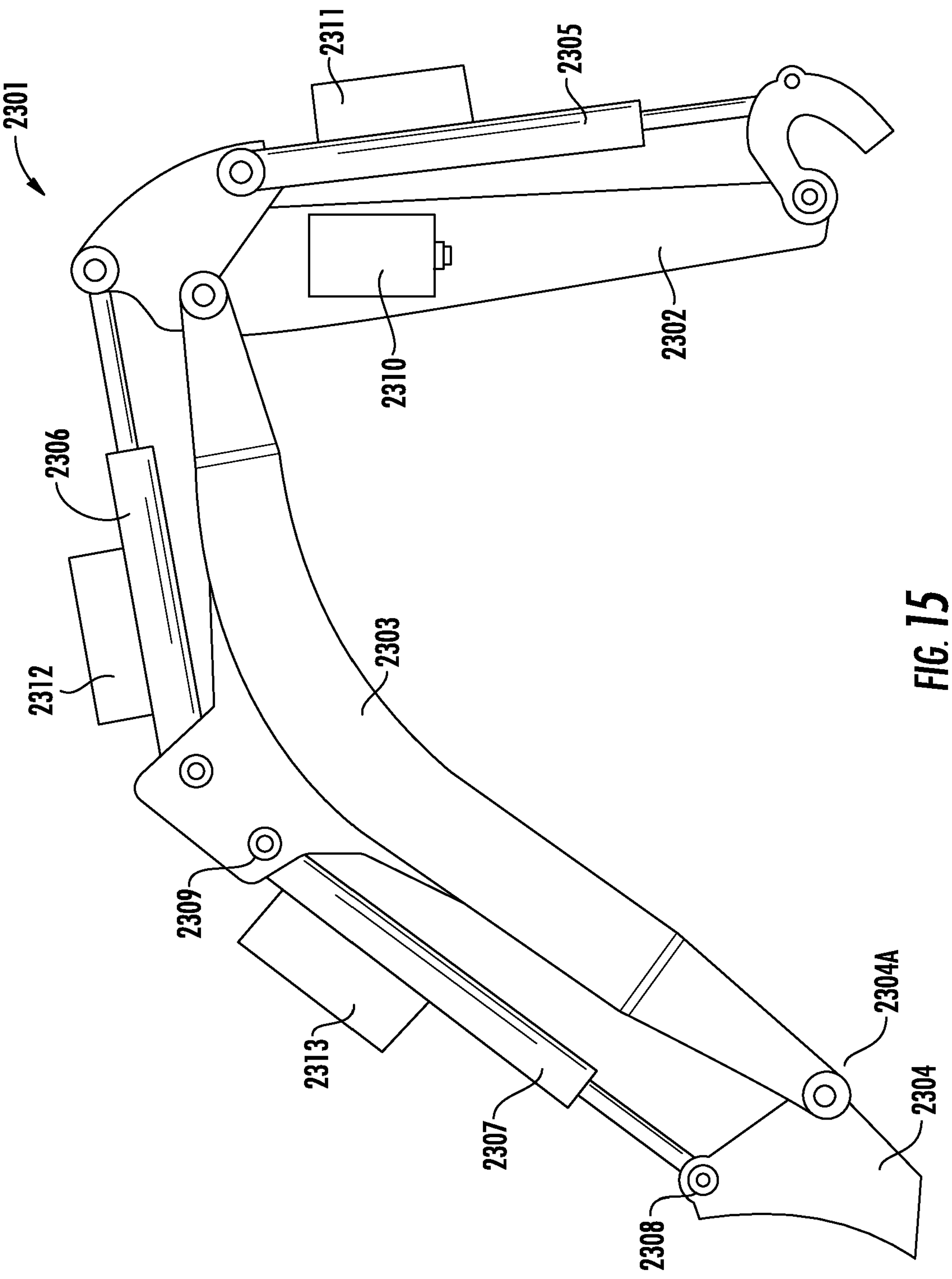
FIG. 15 shows an illustrative configuration of an articulated boom structure of an excavator when a plurality of linear actuator assemblies of the present disclosure are installed on the boom structure.

The linear actuator assemblies discussed above can be a component in systems, e.g., industrial machines, in which one structural element is moved or translated relative to another structural element. In some embodiment, the extraction and retraction of the linear actuator, e.g., hydraulic cylinder, will provide a linear or telescoping movement between the two structural elements, e.g., a hydraulic car lift. In other embodiments, where the two structures are pivotally attached, the linear actuator can provide a rotational or turning movement of one structure relative to the other structure. For example, FIG. 15 shows an exemplary configuration of an articulated boom structure 2301 of an excavator when a plurality of any of the linear actuator assemblies of the present disclosure are installed on the boom structure 2301. The boom structure 2301 may include an arm 2302, a boom 2303, and a bucket 2304. As shown in FIG. 15, the arm 2302, boom 2303, and bucket 2304 are driven by an arm actuator 2305, a boom actuator 2306, and a bucket actuator 2307, respectively. The dimensions of each linear actuator assembly 2305, 2306, 2307 can vary depending on the geometry of the boom structure 2301. For example, the axial length of the bucket actuator assembly 2307 may be larger than that of the boom actuator assembly 2306. Each actuator assembly 2305, 2306, 2307 can be mounted on the boom structure 2301 at respective mounting structures.

In the boom structure of 2301, each of the linear actuator assemblies is mounted between two structural elements such that operation of the linear actuator assembly will rotate one of the structural element relative to the other around a pivot point. For example, one end of the bucket actuator assembly 2307 can be mounted at a boom mounting structure 2309 on the boom 2303 and the other end can be mounted at a bucket mounting structure 2308 on the bucket 2304. The attachment to each mounting structure 2309 and 2303 is such that the ends of the bucket actuator assembly 2307 are free to move rotationally. The bucket 2304 and the boom 2303 are pivotally attached at pivot point 2304A. Thus, extraction and retraction of bucket actuator assembly 2307 will rotate bucket 2304 relative to boom 2303 around pivot point 2304A. Various mounting structures for linear actuators (e.g., other types of mounting structures providing relative rotational movement, mounting structures providing linear movement, and mounting structure providing combinations of rotational and linear movements) are known in the art, and thus a detailed explanation other types of mounting structures is omitted here.

Each actuator assembly 2305, 2306, 2307 may include a hydraulic pump assembly and a hydraulic cylinder and can be any of the drive-drive or driver-driven linear actuator assemblies discussed above. In the exemplary embodiment of the boom structure 2301, the respective hydraulic pump assemblies 2311, 2312, 2313 for actuator assemblies 2305, 2306, 2307 are mounted on the top of the corresponding hydraulic cylinder housings. However, in other embodiments, the hydraulic pump assemblies may be mounted on a different location, for example at the rear end of the cylinder housing 4 as illustrated in FIG. 1A.

In addition to linear actuator assemblies, the boom structure 2301 can also include an auxiliary pump assembly 2310 to provide hydraulic fluid to other hydraulic device such as, e.g., portable tools, i.e., for operations other than boom operation. For example, a work tool such as a jackhammer may be connected to the auxiliary pump assembly 2310 for drilling operation. The configuration of auxiliary pump assembly 2310 can be any of the drive-drive or driver-driven pump assemblies discussed above. Each actuator assembly 2305, 2306, 2307 and the auxiliary pump 2310 can be connected, via wires (not shown), to a generator (not shown) mounted on the excavator such that the electric motor(s) of each actuator and the auxiliary pump can be powered by the generator. In addition, the actuators 2305, 2306, 2307 and the auxiliary pump 2310 can be connected, via wires (not shown), to a controller (not shown) to control operations as described above with respect to control unit 266/drive unit 295. Because each of the linear actuator assemblies are closed-loop hydraulic systems, the excavator using the boom structure 2301 does not require a central hydraulic storage tank or a large central hydraulic pump, including associated flow control devices such as a variable displacement pump or directional flow control valves. In addition, hydraulic hoses and pipes do not have to be run to each actuator as in conventional systems. Accordingly, an excavator or other industrial machine using the linear actuator assemblies of the present disclosure will not only be less complex and lighter, but the potential sources of contamination into the hydraulic system will be greatly reduced.

The articulated boom structure 301 with the linear actuators 305, 306, 307 of an excavator described above is only for illustrative purpose and application of the linear actuator 1 of the present disclosure is not limited to operating the boom structure of an excavator. For example, the linear actuator 1 of the present disclosure can be applied to various other machinery such as backhoes, cranes, skid-steer loaders, and wheel loaders.

Although the above drive-drive and driver-driven embodiments were described with respect to an external gear pump arrangement with spur gears having gear teeth, it should be understood that those skilled in the art will readily recognize that the concepts, functions, and features described below can be readily adapted to external gear pumps with other gear configurations (helical gears, herringbone gears, or other gear teeth configurations that can be adapted to drive fluid), internal gear pumps with various gear configurations, to pumps having more than two prime movers, to prime movers other than electric motors, e.g., hydraulic motors or other fluid-driven motors, inter-combustion, gas or other type of engines or other similar devices that can drive a fluid displacement member, and to fluid displacement members other than an external gear with gear teeth, e.g., internal gear with gear teeth, a hub (e.g. a disk, cylinder, other similar component) with projections (e.g. bumps, extensions, bulges, protrusions, other similar structures or combinations thereof), a hub (e.g. a disk, cylinder, or other similar component) with indents (e.g., cavities, depressions, voids or other similar structures), a gear body with lobes, or other similar structures that can displace fluid when driven. Accordingly, for brevity, detailed description of the various pump configurations are omitted. In addition, those skilled in the art will recognize that, depending on the type of pump, the synchronizing contact (drive-drive) or meshing (driver-driven) can aid in the pumping of the fluid instead of or in addition to sealing a reverse flow path. For example, in certain internal-gear georotor configurations, the synchronized contact or meshing between the two fluid displacement members also aids in pumping the fluid, which is trapped between teeth of opposing gears. Further, while the above embodiments have fluid displacement members with an external gear configuration, those skilled in the art will recognize that, depending on the type of fluid displacement member, the synchronized contact or meshing is not limited to a side-face to side-face contact and can be between any surface of at least one projection (e.g. bump, extension, bulge, protrusion, other similar structure, or combinations thereof) on one fluid displacement member and any surface of at least one projection(e.g. bump, extension, bulge, protrusion, other similar structure, or combinations thereof) or indent (e.g., cavity, depression, void or other similar structure) on another fluid displacement member. Further, with respect to the drive-drive configurations, while two prime movers are used to independently and respectively drive two fluid displacement members in the above embodiments, it should be understood that those skilled in the art will recognize that some advantages (e.g., reduced contamination as compared to the driver-driven configuration) of the above-described embodiments can be achieved by using a single prime mover to independently drive two fluid displacement members. For example, in some embodiments, a single prime mover can independently drive the two fluid displacement members by the use of, e.g., timing gears, timing chains, or any device or combination of devices that independently drives two fluid displacement members while maintaining synchronization with respect to each other during operation.

The fluid displacement members, e.g., gears in the above embodiments, can be made entirely of any one of a metallic material or a non-metallic material. Metallic material can include, but is not limited to, steel, stainless steel, anodized aluminum, aluminum, titanium, magnesium, brass, and their respective alloys. Non-metallic material can include, but is not limited to, ceramic, plastic, composite, carbon fiber, and nano-composite material. Metallic material can be used for a pump that requires robustness to endure high pressure, for example. However, for a pump to be used in a low pressure application, non-metallic material can be used. In some embodiments, the fluid displacement members can be made of a resilient material, e.g., rubber, elastomeric material, to, for example, further enhance the sealing area.

Alternatively, the fluid displacement member, e.g., gears in the above embodiments, can be made of a combination of different materials. For example, the body can be made of aluminum and the portion that makes contact with another fluid displacement member, e.g., gear teeth in the above exemplary embodiments, can be made of steel for a pump that requires robustness to endure high pressure, a plastic for a pump for a low pressure application, a elastomeric material, or another appropriate material based on the type of application.

Exemplary embodiments of the fluid delivery system can displace a variety of fluids. For example, the pumps can be configured to pump hydraulic fluid, engine oil, crude oil, blood, liquid medicine (syrup), paints, inks, resins, adhesives, molten thermoplastics, bitumen, pitch, molasses, molten chocolate, water, acetone, benzene, methanol, or another fluid. As seen by the type of fluid that can be pumped, exemplary embodiments of the pump can be used in a variety of applications such as heavy and industrial machines, chemical industry, food industry, medical industry, commercial applications, residential applications, or another industry that uses pumps. Factors such as viscosity of the fluid, desired pressures and flow for the application, the configuration of the fluid displacement member, the size and power of the motors, physical space considerations, weight of the pump, or other factors that affect pump configuration will play a role in the pump arrangement. It is contemplated that, depending on the type of application, the exemplary embodiments of the fluid delivery system discussed above can have operating ranges that fall with a general range of, e.g., 1 to 5000 rpm. Of course, this range is not limiting and other ranges are possible.

The pump operating speed can be determined by taking into account factors such as viscosity of the fluid, the prime mover capacity (e.g., capacity of electric motor, hydraulic motor or other fluid-driven motor, internal-combustion, gas or other type of engine or other similar device that can drive a fluid displacement member), fluid displacement member dimensions (e.g., dimensions of the gear, hub with projections, hub with indents, or other similar structures that can displace fluid when driven), desired flow rate, desired operating pressure, and pump bearing load. In exemplary embodiments, for example, applications directed to typical industrial hydraulic system applications, the operating speed of the pump can be, e.g., in a range of 300 rpm to 900 rpm. In addition, the operating range can also be selected depending on the intended purpose of the pump. For example, in the above hydraulic pump example, a pump configured to operate within a range of 1-300 rpm can be selected as a stand-by pump that provides supplemental flow as needed in the hydraulic system. A pump configured to operate in a range of 300-600 rpm can be selected for continuous operation in the hydraulic system, while a pump configured to operate in a range of 600-900 rpm can be selected for peak flow operation. Of course, a single, general pump can be configured to provide all three types of operation.

In addition, the dimensions of the fluid displacement members can vary depending on the application of the pump. For example, when gears are used as the fluid displacement members, the circular pitch of the gears can range from less than 1 mm (e.g., a nano-composite material of nylon) to a few meters wide in industrial applications. The thickness of the gears will depend on the desired pressures and flows for the application.

In some embodiments, the speed of the prime mover, e.g., a motor, that rotates the fluid displacement members, e.g., a pair of gears, can be varied to control the flow from the pump. In addition, in some embodiments the torque of the prime mover, e.g., motor, can be varied to control the output pressure of the pump.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A hydraulic system, comprising:

a linear hydraulic actuator having first and second ports;

an integrated hydraulic pump assembly conjoined with the linear hydraulic actuator to provide hydraulic fluid to operate the linear hydraulic actuator, the integrated hydraulic pump assembly including, a casing wall defining an interior volume, the casing wall having a third port to provide fluid communication between the interior volume and the first port, and a fourth port to provide fluid communication between the interior volume and the second port, a fluid driver assembly disposed inside the interior volume, the fluid driver assembly having at least one fluid driver with each fluid driver having at least one of a variable-speed motor or a variable torque motor, at least one sensor assembly disposed in at least one of the casing wall or the interior volume and having at least one of a pressure transducer, a temperature transducer, or a flow transducer, a first valve assembly disposed in at least one of the casing wall or the interior volume and in fluid communication with the third port, and a second valve assembly disposed in at least one of the casing wall or the interior volume and in fluid communication with the fourth port; and a controller that opens the first and second valve assemblies to provide fluid communication between the interior volume and the third and fourth ports, respectively, and establishes at least one of a speed or a torque of the motor in each of the at least one fluid driver to exclusively adjust at least one of a flow or a pressure in the hydraulic system to an operational set point.

2. The system of claim 1, wherein the hydraulic system is a closed-loop system.

3. The system of claim 1, wherein the fluid driver assembly includes a first fluid driver with a first motor and a first gear, and a second fluid driver with a second motor and a second gear, wherein the first motor is disposed within the first gear and the second motor is disposed within the second gear, and wherein the first motor and the second motor are outer-rotor motors.

4. The system of claim 3, wherein the controller independently drives the first motor and the second motor so as to synchronize contact between the first gear and the second gear.

5. The system of claim 1, wherein the first and second valve assemblies each include a solenoid operated lock valve.

6. The system of claim 1, further comprising:

a storage device fluidly connected to the integrated hydraulic pump assembly.

7. The system of claim 6, wherein the storage device is one of an accumulator or a pressure vessel with a separating element.

8. The system of claim 1, wherein the controller includes one or more characteristic curves for the fluid driver assembly.

9. The system of claim 1, wherein the controller includes one or more characteristic curves for at least one of the first and second valve assemblies.

10. The system of claim 1, wherein the controller includes a plurality of operational modes including at least one of a flow mode, a pressure mode, and a balanced mode.

11. The system of claim 1, wherein the operational set point corresponds to a desired travel speed for the linear hydraulic actuator when the operational mode is set to the flow mode.

12. A method of controlling relative movement between a first structural element and a second structural element in an industrial machine using a linear actuator assembly having a linear actuator, which extracts and retracts a piston assembly, and a hydraulic pump assembly, the hydraulic pump assembly including a first valve assembly, a second valve assembly and a hydraulic pump to provide fluid to one of a first port or a second port of the linear actuator, the hydraulic pump including a casing that defines an interior volume, a motor, a first gear having a plurality of first gear teeth, and a second gear having a plurality of second gear teeth, the method comprising:

disposing the motor in the interior volume;

operating the first valve assembly to provide fluid communication between the hydraulic pump and the first port of the linear actuator;

operating the second valve assembly to provide fluid communication between the hydraulic pump and the second port of the linear actuator;

disposing the second gear in the interior volume such that a first face of at least one tooth of the plurality of first gear teeth meshes with a second face of at least one tooth of the plurality of second gear teeth when the first gear is rotated;

rotating the motor to rotate the first gear about a first axial centerline of the first gear in a first direction to transfer the fluid to the linear actuator, a meshing force from the first face rotating the second gear about a second axial centerline of the second gear in a second direction to transfer the fluid to the linear actuator;

establishing at least one of a speed or a torque of the motor to exclusively adjust at least one of a flow or a pressure to the linear actuator to an operational set point; and performing at least one of an extraction or a retraction of the piston assembly to provide relative movement between the first structural element and the second structural element.

13. The method of claim 12, wherein the relative movement is at least one of a linear movement or a rotational movement.

14. The method of claim 12, wherein the first structural element is pivotally attached to the second structural element, and wherein the extraction and retraction of the piston assembly rotates the first structural element relative to the second structural element.

15. The method of claim 14, wherein the industrial machine is an excavator and the first structural element is a bucket on the excavator and the second structural element is a boom arm of the excavator.

16. The method of claim 12, wherein the linear actuator and the hydraulic pump assembly form a closed-loop system.

17. The method of claim 12, further comprising:

fluidly connecting a storage device fluidly to the hydraulic pump assembly.

18. The method of claim 17, wherein the storage device is one of an accumulator or a pressure vessel with a separating element.

* * * * *